United States Patent
Marchildon et al.

(10) Patent No.: US 8,046,312 B2
(45) Date of Patent: Oct. 25, 2011

(54) ENHANCED POSTAL DATA MODELING FRAMEWORK

(75) Inventors: Joel Marchildon, Ottawa (CA); Lisa Fu, Ottawa (CA); Geofrey Owen Kelk, Kenata (CA); Brian Moran, Shaker Heights, OH (US); James A. Kennedy, Ottawa (CA)

(73) Assignee: Accenture Global Services Limited, Dublin (IE)

( * ) Notice: Subject to any disclaimer, the term of this patent is extended or adjusted under 35 U.S.C. 154(b) by 357 days.

(21) Appl. No.: 12/470,268

(22) Filed: May 21, 2009

(65) Prior Publication Data

US 2010/0299175 A1 Nov. 25, 2010

(51) Int. Cl.
*G06F 9/00* (2006.01)
*G06F 10/00* (2006.01)
*G06F 17/30* (2006.01)

(52) U.S. Cl. .................. 705/410; 705/7.11; 707/758

(58) Field of Classification Search .................. 235/385, 235/375; 705/401–404, 406, 407, 410, 1.1, 705/7.11, 7.22, 7.23, 7.24, 7.25, 7.26, 7.27, 705/7.36, 7.37, 330, 348; 700/223; 382/101; 707/763, 758, 760

See application file for complete search history.

(56) References Cited

U.S. PATENT DOCUMENTS

2003/0110142 A1* 6/2003 Sesek et al. ............... 705/404
2008/0291486 A1* 11/2008 Isles et al. ................. 358/1.15

OTHER PUBLICATIONS

European Search Report for Application No. 10005276.0-2221 / 2254084 dated Nov. 12, 2010, 6 pages.

* cited by examiner

*Primary Examiner* — Igor Borissov
(74) *Attorney, Agent, or Firm* — Fish & Richardson P.C.

(57) ABSTRACT

An enhanced postal data modeling framework, in which postal data which describes characteristics of a mail sortation process is accessed, and the postal data is mapped to production management data which describes characteristics of a model production management process in an initial state and which is capable of being processed by a production management application. The production management data is input for processing by the production management application to produce forecasted production management data which predicts characteristics of the model production management process in a subsequent state, the forecasted production management data is modeled to forecasted postal data which predicts characteristics of the mail sortation process, and at least a portion of the forecasted postal data is provided to a user.

20 Claims, 42 Drawing Sheets

```
┌─────────────────────────────────────────────────────────────┐
│ ⌐ Work center  Edit  Goto  Extras  System  Help    ▫ ▫ ▫   │
│ ⊘ [              ] ◁ ▯ │ ☺ ☺ ☺ │ ▯ ▯ ▯ │ ☼ ▯  ▶│          │
│ ▯▯ Display Work Center Capacity: Header                     │
│ ⟨∞ Intervals and Shifts│∞ Intervals│∞ Available Capacity Profile│∞ Reference Available Capacity│∞ │
│                                                             │
│   Plant            [TORO]      Postal Plant - Toronto       │
│   Work center      [MLOCR]     Toronto Plant MLOCR          │
│   Capacity category [001]      Machine Capacity             │
│                                                             │
│   General data                                              │
│   Capacity planner grp  [001]                               │
│   ☐ Pooled capacity           Grouping    [   ]             │
│                                                             │
│   Available capacity                                        │
│   Factory calendar ID   [CA]   Canada                       │
│   Active version        [1]    Normal available capacity    │
│   Base unit of meas.    [MIN]  Minute                       │
│                                                             │
│   Standard available capacity                               │
│   Start              [08:00:00]                             │
│   Finish             [16:00:00]  Capacity utilization [100] │
│   Length of breaks   [00:00:00]  No. of indiv. cap.  [1]    │
│   Operating time      8,00       Capacity         [500] [MIN]│
│                                                             │
│   Planning details                                          │
│   ☑ Relevant to finite scheduling    Overload [0] %         │
│   ☐ Can be used by several operations ☑ Long-term planning  │
│                                                             │
│                    ▷│ ECC (2) 201 │ TWATSECC1001 │ INS │    │
└─────────────────────────────────────────────────────────────┘
```

1034a: Plant, Work center, Capacity category section

1034b: Standard available capacity section

| Article | Description | Material Type | Planning Material |
|---|---|---|---|
| 1861 | Lettermail - Machineable S/L | MAIL | SL_RAW_MLV |
| 1863 | Lettermail - Presort Standard | MAIL | SL_TOR_MLV<br>SL_WIN_MLV<br>SL_VAN_MLV |
| 1864 | Lettermail - Machineable O/S | MAIL | OS_RAW_FSM |
| 1867 | Add Admail Machineable S/L | MAIL | SL_RAW_MLS |
| 1868 | Add Admail Machineable O/S | MAIL | OS_RAW_FSM |

| SL_RAW_MLV | | |
|---|---|---|
| Date | Element | Planned | Actual |
| 06/10/08 | Planned Order 1 | 150,000 | - |
| 06/10/08 | Planned Order 2 | 150,000 | - |
| 06/10/08 | Production Order 3 (Customer1) | 124,000 | - |
| Total | | 424,000 | |

1062

| Work Center | Available Capacity: |
|---|---|
| MLOCR(1) | Operating Time = 8am - 4pm (8 hrs) |
| | Capacity Utilization = 100% |
| | Routing 1 Machine capacity = 500 pieces/min, 30,000/pieces/hr |
| | Variables include timing for set-up, breaks, shutdown, etc |
| | - |

MLOCR Capacity Evaluation — 1063

| Run | Set-up (includes tear-down) | Total Run (min) | Total Run (hr) |
|---|---|---|---|
| PL 1 = 5.00 hrs | 4min | 304 | 5.07 |
| PL 2 = 5.00 hrs | 4min | 304 | 5.07 |
| PO 3 = 4.13 hr | 4min | 252 | 4.20 |
| | | | |
| Run time Required | | 860 min | 14.33 hr |
| Run Time Available | | 480 min | 8.00 hr |
| Remaining Capacity | | -380 min | -6.33 hr |

Switch all orders to Routing 2 that has two MLOCR machine capacities.

FIG. 10J

| SL_RAW_MLV | | | |
|---|---|---|---|
| Date | Element | Planned | Actual |
| 23/09/08 | Planned Order 1 | 150,000 | - |
| 23/09/08 | Planned Order 2 | 150,000 | - |
| 23/09/08 | Production Order 3 (Customer1) | 124,000 | - |
| Total | | 424,000 | |

1064

Work Center

MLOCR(2)

Available Capacity:
Operating Time = 8am-4pm (8 hrs) * 2 = 16hrs
Capacity Utilization = 100%
Routing 2 Machine capacity = 1000 pieces/min
(30,000 pieces/hr * 2 = 60,000 pieces/hr)
Variables Include setup, breaks, shutdown, etc.

MLOCR Capacity Evaluation ⌐1065

| Run | Set-up (Includes tear-down) | Total Run (min) | Total Run (hr) |
|---|---|---|---|
| PL 1 = 5.00 hrs | 4min | 304 | 5.07 |
| PL 2 = 5.00 hrs | 4min | 304 | 5.07 |
| PO 3 = 4.13 hrs | 4min | 252 | 4.13 |
| | | | |
| Run time Required | | 860 min | 14.14 hr |
| Run Time Available | | 960 min | 16 hr |
| Remaining Capacity | | 100 min | 1.67 hr |

FIG. 10K

| Input | Output |
|---|---|
| SL_RAW_MLV = 100 000 pieces | SL_RAW_MLV = 0 pieces |
| | SL_TOR_BCS101 = 40 000 pieces |
| | SL_TOR_BCS102 = 50 000 pieces |
| | SL_WIN_BCSCITY = 10 000 pieces |

ENHANCED POSTAL DATA MODELING FRAMEWORK

FIELD

The present disclosure generally relates to mail sortation planning.

BACKGROUND

Production management (or "production planning") applications are used to increase the efficient utilization of manufacturing capacity, parts, components and material resources, using historical production data and sales forecasts.

SUMMARY

By processing data which describes a current state of, and the capabilities and requirements associated with, a processing operation, production management applications may be used to provide insight regarding future states of the processing operation. While these applications are adept at forecasting future processing states, they have not been capable of being adapted to process data used for postal operations, such as to forecast future mail sortation states. This deficiency exists despite the abundance of available postal data, and the widespread prevalence of legacy production management applications available for use at many mail sortation facilities.

Thus, according to one general implementation of the enhanced postal data modeling framework, a postal operation is modeled as production management data which is capable of being processed by a production management application. When processed, the production management data yields predictive production management data which, in turn, may be modeled as predictive postal operation data, which can be used to forecast a future state of the postal operation. Thus, the model allows the postal data to be processed by the production management application, and further allows a result of the production management processing to be meaningfully applied to postal operations.

According to another general implementation, a computer-implemented process includes accessing postal data which describes characteristics of a mail sortation process, mapping the postal data to production management data which describes characteristics of a model production management process in an initial state and which is capable of being processed by a production management application, and inputting the production management data for processing by the production management application to produce forecasted production management data which predicts characteristics of the model production management process in a subsequent state. The process also includes mapping the forecasted production management data to forecasted postal data which predicts characteristics of the mail sortation process, and providing at least a portion of the forecasted postal data to a user.

Implementations may include one or more of the following features. For instance, the characteristics of the mail sortation process may further include forecast deposits and collections of mail, mapped to planned work orders of the model production management process, actual deposits and collections of mail, mapped to pending work orders of the model production management process, mail sortation area characteristics, mapped to work center characteristics of the model production management process, a forecast allocation matrix, mapped to a bill of materials of the model production management process, characteristics of raw, semi-sorted, and fully sorted mail inducted in the mail sortation process, mapped to characteristics of raw, semi-finished, and fully finished processing materials of the model production management process, labor requirements, mapped to resource levels of the model production management process, and mechanized sortation capabilities, mapped to machine capabilities of the model production process.

In other examples, mapping the postal data may further include mapping a type and a volume of mail expected to be processed at one or more sorting stations of a mail sortation facility, to a planned work order which specifies a type and a volume of processing materials expected to be processed at one or more machines of a production facility, and mapping mechanized sortation capabilities of the one or more sorting stations to capabilities of the one or more machines. Inputting the production management data may further include inputting the type and the volume of the processing materials and the capabilities of the one or more machines, for processing by the production management application to predict whether the one or more machines are over-utilized or under-utilized, and mapping the forecasted production management data may further include determining the one or more sorting stations are over-utilized or under-utilized when the one or more machines are predicted to be over-utilized or under-utilized, respectively. The process may also include altering a routing between the one or more sorting stations based on determining that the one or more sorting stations are over-utilized or under-utilized, or reassigning mail actually received at the mail sortation facility to a different one or more sorting stations or to a different mail sortation facility based on determining that the one or more sorting stations are over-utilized or under-utilized. The postal data may include a forecast allocation matrix for one or more sorting stations of a mail sortation facility, generated based on a historic distribution of mail previously processed by the one or more sorting stations.

In further examples, mapping the postal data may include mapping a type and a volume of mail actually received at the sorting stations of the mail sortation facility, to a work order which specifies a type and volume of processing materials ready to be processed at one or more machines of a production facility, and mapping the forecast allocation matrix as a bill of materials for each of the one or more machines. Inputting the production management data may include inputting the work order and the bill of materials for processing by the production management application to predict a type and a quantity of end items produced by the one or more machines. Mapping the forecasted production management data may further include identifying one or more customers of the mail sortation facility expected to receive the mail, and a volume of the mail expected to be delivered to each of the one or more customers, a based on the predicted type and quantity of the end items, respectively.

In other examples, the process may also include notifying the one or more customers of the type and the volume of mail expected to be delivered to each of the one or more customers, scheduling resources to transport the expected volume of mail to each of the one or more customers, or updating the forecast allocation matrix based on the type and the volume of the mail actually received at the sorting stations of the mail sortation facility. Inputting the work order and the bill of materials for processing by the production management application to predict a type and a quantity of end items produced by the one or more machines may further include inputting the work order and the bill of materials for processing by the production management application to predict a first type and a first quantity of first end items produced by a first machine, inputting at least a portion of the first type and the first quantity of the end items produced by the first machine for processing by the production management application to predict a second type and a second quantity of second end items produced by a second machine, and outputting the second type and the second quantity of the second end items as the predicted type and quantity of the end items.

In further examples, mapping the postal data may further include mapping a type and a volume of mail expected to be processed at one or more sorting stations of a mail sortation facility, to a planned work order which specifies a type and a volume of processing materials expected to be processed at one or more machines of a production facility, and mapping labor requirements associated with the one or more sorting stations of the mail sortation facility to work center resource levels. Inputting the production management data further may further include inputting the type and the volume of the processing materials and the work center resource levels, for processing by the production management application to predict whether the one or more machines do or do not possess sufficient resources to process the type and the volume of the processing materials. Mapping the forecasted production management data may further include determining that the labor requirements of the one or more sorting stations are met or are not met when the one or more machines are predicted to possess or not possess sufficient resources, respectively.

In additional examples, the process may also include reassigning staffing of the mail sortation facility based on determining that the one are more sorting stations are predicted to not possess sufficient resources. The production management application may be an SAP Enterprise Resource Planning Production Planning application. Mapping the postal data to the production management data may include mapping each class of mail to a processing material of type MAIL, identified by an identifier having at least first through third character strings that each identify different characteristics of the class, where the first character string identifies a type of mail, selected from the group consisting of short/long lettermail, oversized lettermail, and unknown lettermail, the second character string identifies a location to which the particular class of mail has been sorted to, if any, and the third character string identifies a next mail process. The processing material may be identified by a fourth character string identifying whether the particular class of mail is delivery points sequenced or non-sequenced.

In further examples, the next mail process may be selected from the group including a culler facer canceller process, a multi-line cancellation and optical character recognition (OCR) process, a multi-line optical character recognition process, a multi-line sort process, a manual sort process, a manual final sort to a delivery depot process, a flat sorting machine process, a barcode sort machine process which identifies a forecast allocation matrix, a barcode sort machine process which identifies a city, a barcode sort machine process which identifies a forward area, a sorting process which identifies sequenced delivery points, and a sorting process which identifies a letter carrier route.

In other examples, mapping the postal data to the production management may further include mapping raw or semi-sorted mail to the processing material of type MAIL, identified by a first identifier having at least one character string that identifies the processing material as a raw or semi-finished processing material, respectively. Mapping the forecasted production management data to the forecasted postal data may further include mapping the processing material of type MAIL, identified by a different, second identifier having at least one character string that identifies the processing material as a semi-finished or a fully finished processing material to semi-sorted or fully sorted mail, respectively. The postal data may be incapable of being processed by the production management application.

According to another general implementation, a system includes one or more computers, and a computer-readable medium coupled to the one or more computers. The computer-readable medium has instructions stored thereon which, when executed by the one or more computers, cause the one or more computers to perform operations including accessing postal data which describes characteristics of a mail sortation process, mapping the postal data to production management data which describes characteristics of a model production management process in the initial state and which is capable of being processed by a production management application, inputting the production management data for processing by the production management application to produce forecasted production management data which predicts characteristics of the model production management process in a subsequent state, mapping the forecasted production management data to forecasted postal data which predicts characteristics of the mail sortation process, and providing a least a portion of the forecasted postal data to a user.

According to another general implementation, a computer storage medium is encoded with a computer program. The program includes instructions that when executed by data processing apparatus cause the data processing apparatus to perform operations including accessing postal data which describes characteristics of a mail sortation process, mapping the postal data to production management data which describes characteristics of a model production management process in the initial state and which is capable of being processed by a production management application, inputting the production management data for processing by the production management application to produce forecasted production management data which predicts characteristics of the model production management process in a subsequent state, mapping the forecasted production management data to forecasted postal data which predicts characteristics of the mail sortation process, and providing a least a portion of the forecasted postal data to a user.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 9C illustrates an example user interface for creating a sales order.

FIG. 10D illustrates an example user interface for configuring a work center.

FIG. 10E illustrates an example user interface for configuring a routing.

FIG. 10H illustrates a mapping table which maps articles to one or more planning materials.

FIGS. 10I-L illustrate capacity planning scenarios.

FIG. 10M illustrates an example bill of materials.

FIG. 10N illustrates an example user interface for configuring a bill of materials.

FIG. 10O illustrates an example user interface for configuring a production order.

Like reference numbers represent corresponding parts throughout.

DETAILED DESCRIPTION

Figure 1:
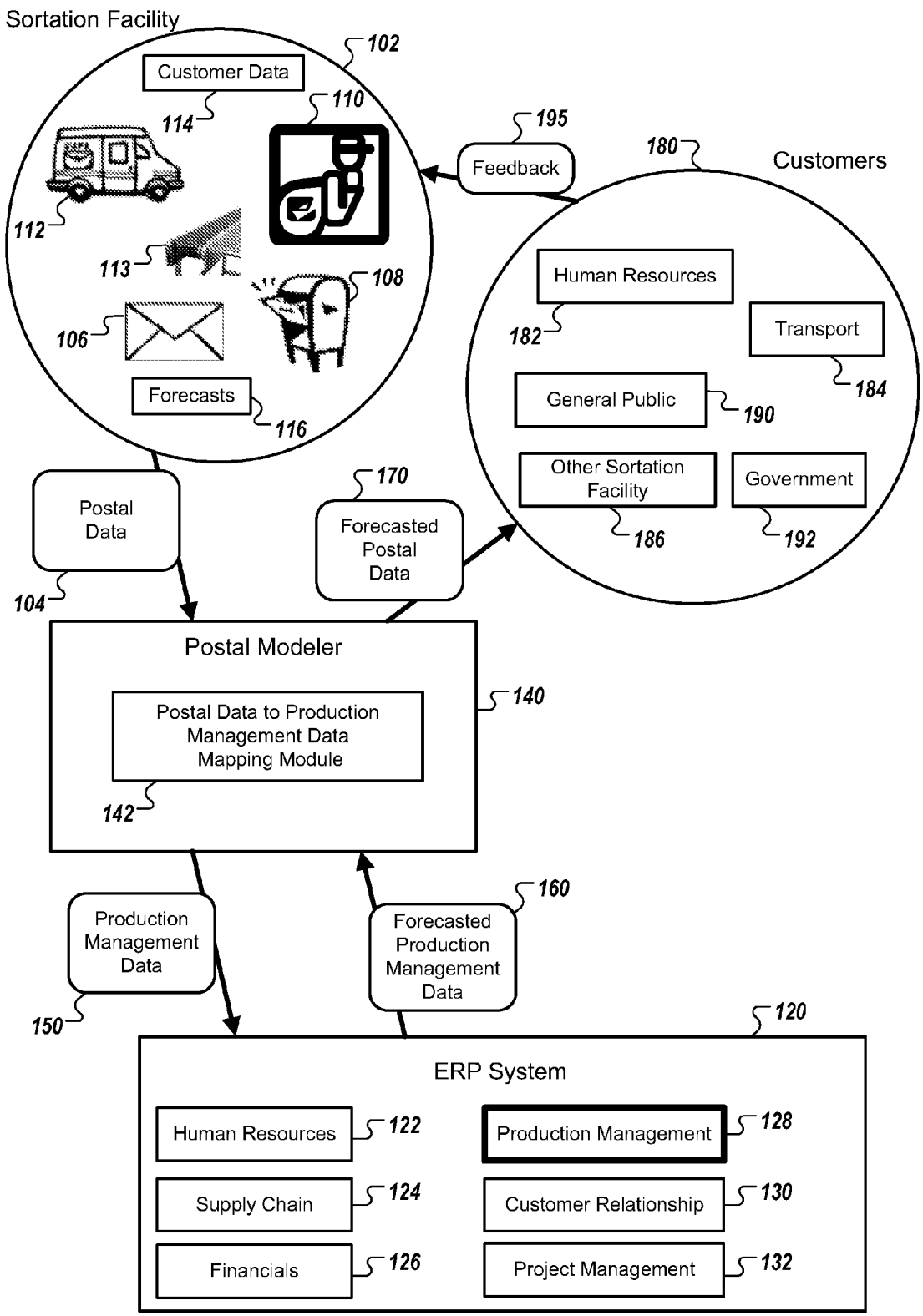
FIG. 1 is a contextual diagram which demonstrates the forecasting of postal operations using a production management application, according to one example implementation.

According to one general implementation of the enhanced postal data modeling framework, a postal operation is modeled as production management data which is capable of being processed by a production management application. When processed, the production management data yields predictive production management data which, in turn, may be modeled as predictive postal operation data that can be used to forecast a future state of the postal operation. Thus, the model allows the postal data to be processed by the production management application, and further allows a result of the production management processing to be meaningfully applied to postal operations FIG. 1 is a contextual diagram which demonstrates the forecasting of postal operations using a production management application, according to one example implementation. A sortation facility 102 may use one or more sorting stations to sort mail. For example, the sortation facility 102 may be a postal facility used to sort incoming raw or semi-sorted mail. Postal data 104 describes characteristics of a mail sortation process and may include, for example: information describing a volume of expected or received mail 106 at various collection locations 108; other characteristics of raw, semi-sorted, and fully sorted mail 106; quantity and skills of mail carriers 110, sortation machine operators or other sortation facility workers; number, capacity, and locations of various mail vehicles 112; number, capacity, and condition of various sorting machines 113; or other mail sortation area characteristics. Postal data 104 may also include, for example, customer data 114 or forecast data 116 managed by the sortation facility 102. The forecast data 116 may include a forecast allocation matrix which may be generated based on a historic distribution of mail previously processed by the sortation facility 102.

The sortation facility 102 may use an ERP (Enterprise Resource Planning) system 120 to manage various business functions and processes. For example, various hardware or software modules may be used, such as a human resources module 122, a supply chain module 124, a financials module 126, a production management module 128, a customer relationship module 130, and a project management module 132.

The production management module 128 manages a modeled production process, such as a production process in which multiple physical materials are inputted and processed according to a plan to produce a single end product. The production management module 128 may not be capable of processing the postal data 104, due, in part, to the fact that a mail sortation process may take a single input (e.g., a bag of unsorted or semi-sorted mail) and produce multiple outputs of sorted mail destined for numerous locations.

A postal modeler 140 is used to map the postal data 104 to production management data 150 which is capable of being processed by the production management module 128. The postal modeler 140 may access the postal data 104 and may map it to the production management data 150 using a postal-data-to-production-management-data mapping module 142. Examples of mapping postal data to production management data may include mapping forecast deposits and collections of mail to planned work orders of a model production management process; mapping actual deposits and collections of mail to pending work orders of the model production management process; mapping mail sortation area characteristics to work center characteristics of the model production management process; mapping a forecast allocation matrix to a bill of materials (BOM) of the model production management process; mapping characteristics of raw, semi-sorted, and fully sorted mail inducted in the mail sortation process to characteristics of raw, semi-finished, and fully finished processing materials of the model production management process, mapping labor requirements to resource levels of the model production management process; and mapping mechanized sortation capabilities mapped to machine capabilities of the model production process.

The production management data 150 describes characteristics of a model production management process in an initial state, such as a current state or a baseline past state. The production management data 150 is inputted into the production management module 128 and is processed to produce forecasted production management data 160 which predicts characteristics of the model production management process in a subsequent state. For example, the type and the volume of processing materials and the capabilities of one or more production machines may be inputted for processing by the production management module 128 to predict whether one or more production machines are over-utilized or under-utilized.

The forecasted production management data 160 is mapped by the postal modeler 140 to forecasted postal data 170 which predicts characteristics of one or more mail sortation processes. For example, it may be determined that one or more sorting stations are over-utilized or under-utilized when one or more production machines are predicted to be over-utilized or under-utilized, respectively. Put another way, the postal modeler 140 makes the otherwise meaningless or incompatible forecasted management data 160 meaningful to the postal operation.

The forecasted postal data 170 is provided to one or more customers 180. For example, the customers 180 may include internal customers, such as the postal facility's human resources 182, postal transport services 184, or other mail sortation facilities 186. The customers 180 may also include external customers, such as the general public 190 (e.g., mail recipients), or other government agencies 192. In response to receiving the forecasted postal data 170, feedback 195 may be provided to the sortation facility 102. The feedback 195 may be informational, or it may indicate an action which, when automatically or manually implemented, may affect future postal operations. For example, a routing between one or more sorting stations may be altered based on determining that one or more sorting stations are over-utilized or under-utilized.

Figure 2:
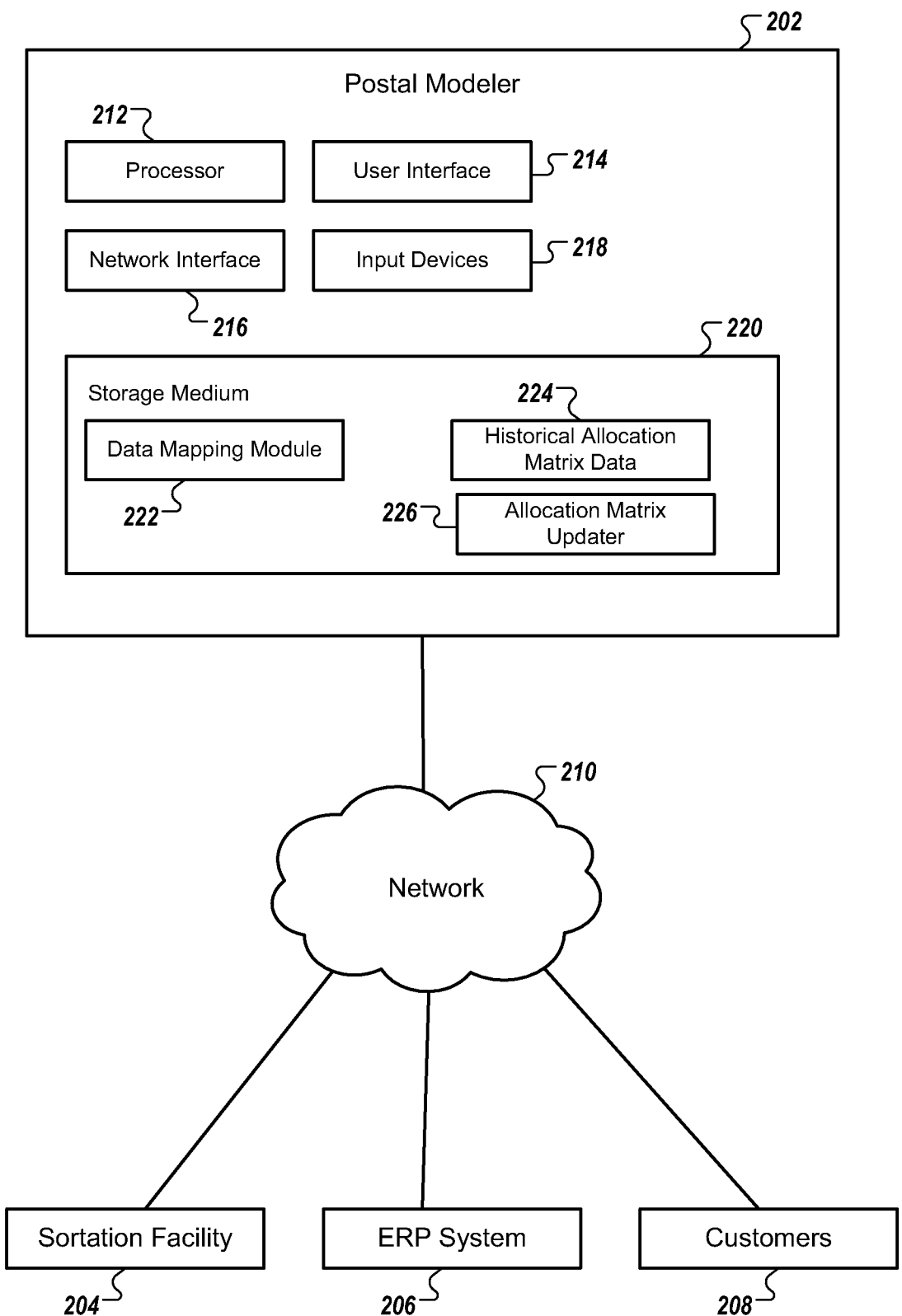
FIG. 2 is a block diagram of an example system for forecasting postal operations.

FIG. 2 is a block diagram of an example system 200 for forecasting postal processes. The system 200 includes a postal modeler 202 connected to one or more sortation facilities 204, an ERP system 206, and one or more customers 208 over a network 210. The ERP system 206 manages various types of resources, information, and processes of a business using one or more central data stores. For example, the ERP system 206 may include a production management module for managing production processes. The sortation facility 204 is a postal facility used for processing unsorted or semi-sorted mail into semi-sorted or fully-sorted mail. The customers 208 include entities which use postal data or interface with postal processes. For example, the customers 208 may include external customers such as consumers or the government, or may include internal postal customers such as human resources, shipping, or another sortation facility.

The postal modeler 202 maps postal data to production management data capable of being processed by the ERP system 206. The postal modeler 202 includes a processor 212, a user interface 214, a network interface 216, one or more input devices 218, and a storage medium 220. The storage medium 220 includes a data mapping module 222, historical allocation matrix data 224, and an allocation matrix updater 226.

The storage medium 220 stores and records information or data, and may be an optical storage medium, magnetic storage medium, flash memory, or any other storage medium type. The data mapping module 222 maps postal data to production management data. The historical allocation matrix data 224 may be generated based on a historic distribution of mail previously processed by one or more sorting stations of the sortation facility 204 and may be used to predict the volumes expected at sort destinations for future incoming mail. The allocation matrix updater 226 updates the historical allocation matrix data 224 based on current, real-time data. For example, the historical allocation matrix data 224 may be updated periodically, or the historical allocation matrix data 224 may be updated in real time as incoming mail is sorted.

The processor 212 may be a processor suitable for the execution of a computer program such as a general or special purpose microprocessor, and any one or more processors of any kind of digital computer. In some implementations, the postal modeler 202 includes more than one processor 212. The input devices 218 are configured to provide input to the postal modeler 202. For example, the input devices 218 may include a mouse, a keyboard, a stylus, or any other device that allows the input of data into the postal modeler 202.

The user interface 214 may be configured to render a visual display image. For example, the user interface 214 may be a monitor, a television, a liquid crystal display (LCD), a plasma display device, a projector with a projector screen, an autostereoscopic display, a cathode ray tube (CRT) display, a digital light processing (DLP) display, or any other type of display device configured to render a display image. The user interface 214 may include one or more display devices. In some configurations, the user interface 214 may be configured to display images associated with an application, such as user interfaces generated by an ERP or postal modeling application.

The postal modeler 202 is connected to the network 210 and possibly to one or more other networks over the network interface 216. The network 210 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. Networks may include multiple networks or subnetworks, each of which may include, for example, a wired or wireless data pathway.

Figure 3:
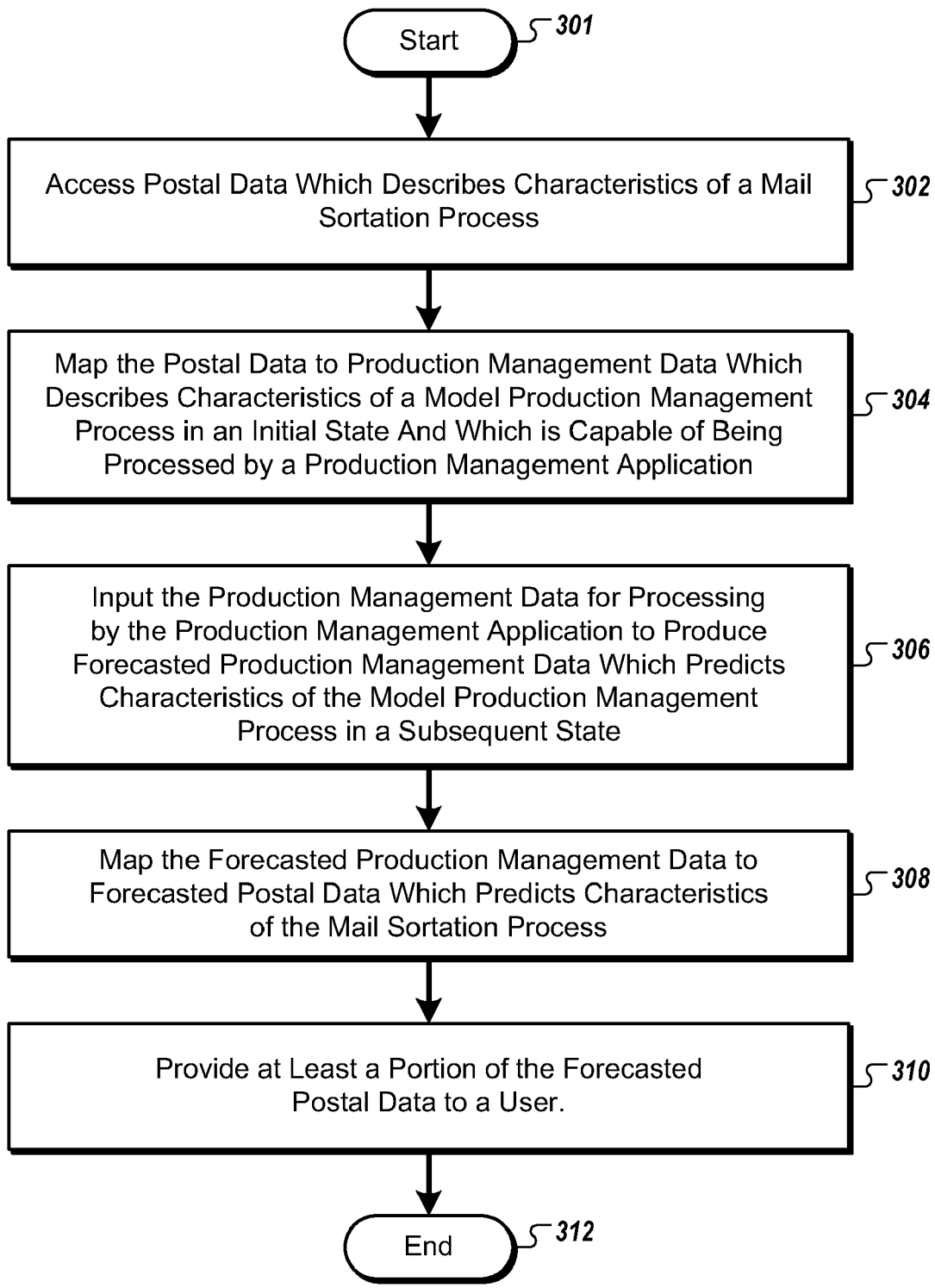
FIGS. 3, 8, 9A-B, 9D-E, 10A-B, 10F, 10P-Q, 11A-D, 12A-E, and 13 are flowcharts of example processes.

FIG. 3 is a flowchart illustrating a computer-implemented process 300 for providing forecasted postal data. Briefly, the process 300 includes accessing postal data which describes characteristics of a mail sortation process, mapping the postal data to production management data which describes characteristics of a model production management process in an initial state and which is capable of being processed by a production management application, inputting the production management data for processing by the production management application to produce forecasted production management data which predicts characteristics of the model production management process in a subsequent state, mapping the forecasted production management data to forecasted postal data which predicts characteristics of the mail sortation process, and providing at least a portion of the forecasted postal data to a user.

In further detail, when the process 300 begins (S301), postal data which describes characteristics of a mail sortation process is accessed (S302). The postal data may be accessed from a mail sortation facility and may include, for example, forecast deposits and collections of mail, actual deposits of mail, mail sortation area characteristics, a forecast allocation matrix, characteristics of raw, semi-sorted, and fully sorted mail inducted in the mail sortation process, labor requirements, and mechanized sortation capabilities.

Figure 4:
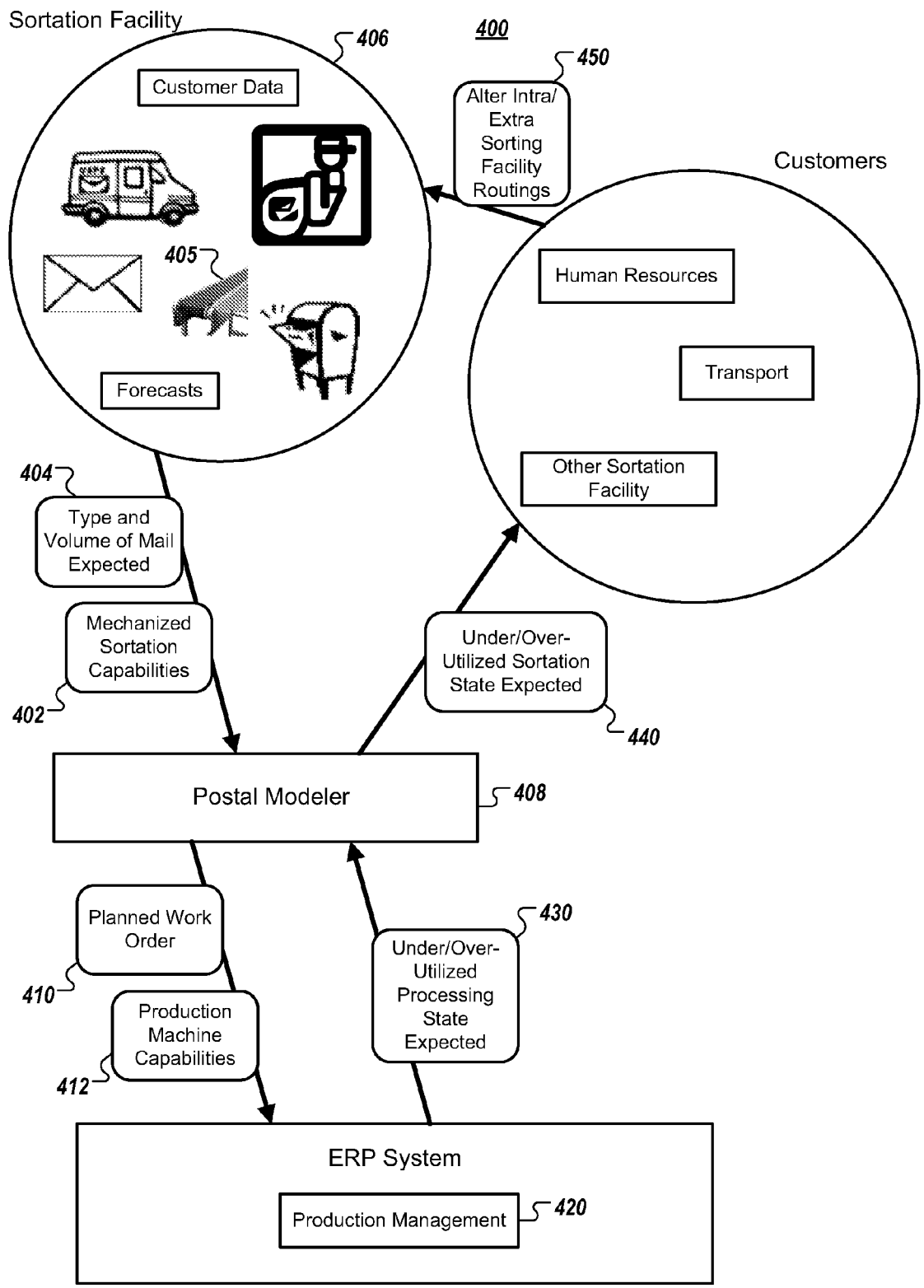
FIGS. 4-6 illustrate example environments for accessing postal data.
Figure 5:
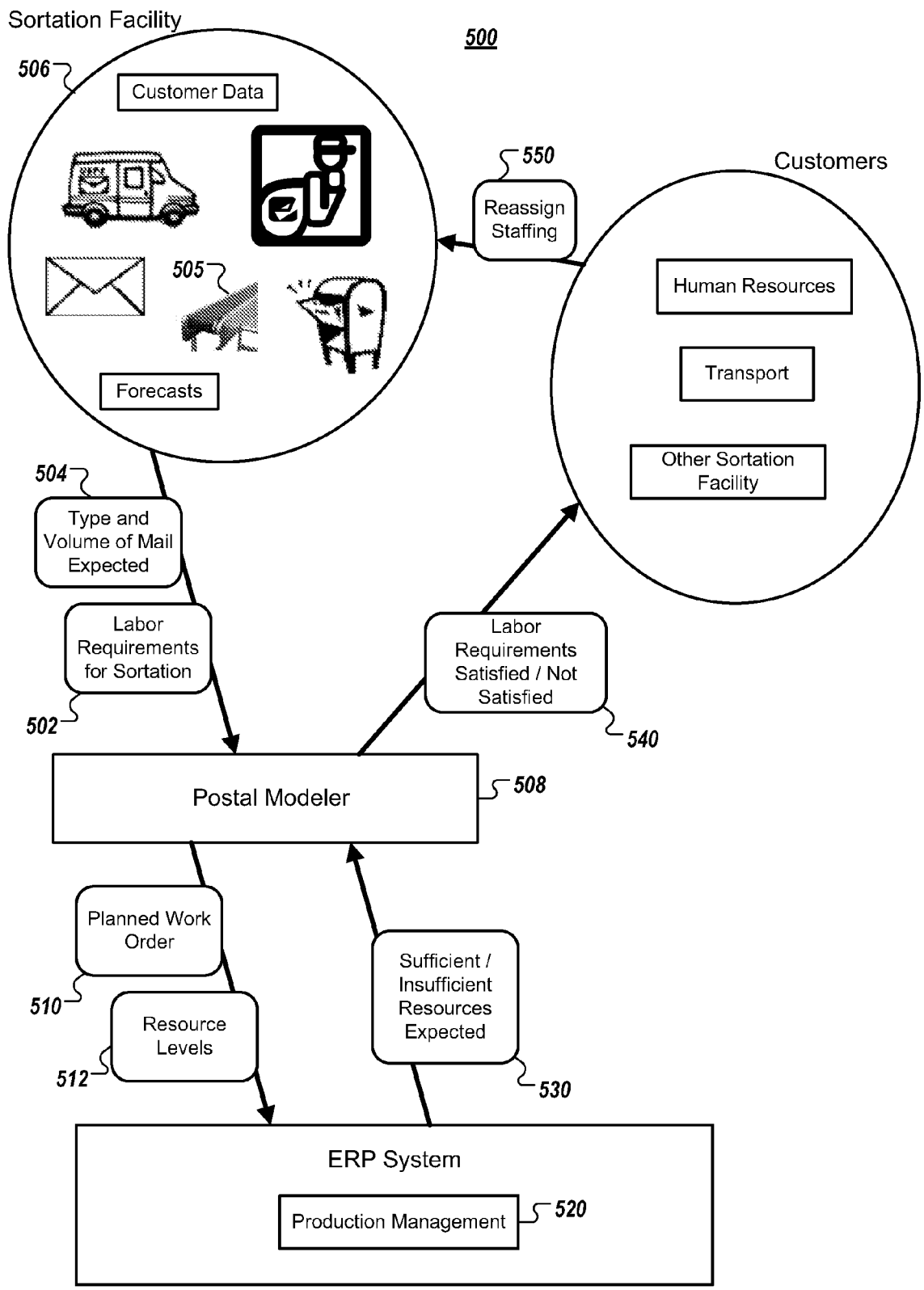
Figure 6:
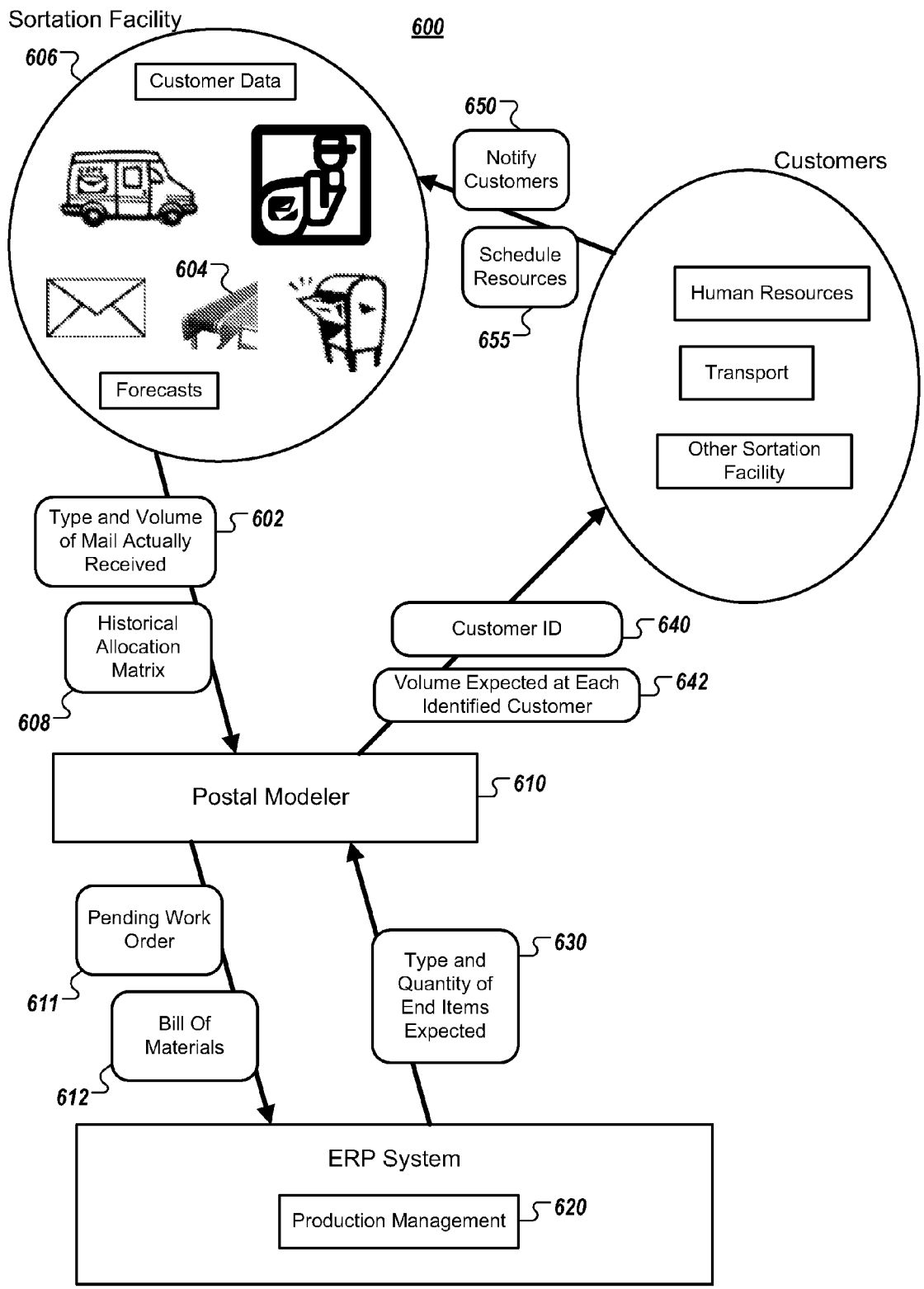

Referring ahead briefly, FIGS. 4-6 illustrate example environments 400, 500, and 600, respectively, for accessing postal data. For example, FIG. 4 illustrates postal data including mechanized sortation capabilities 402 and type and volume of mail 404 expected to be processed at one or more sorting stations 405 of a mail sortation facility 406. As other examples, FIG. 5 illustrates labor requirements for sortation 502 and type and volume of mail 504 expected to be processed at one or more sorting stations 505 of a sortation facility 506 and FIG. 6 illustrates type and volume of mail 602 actually received at one or more sorting stations 604 of a sortation facility 606 and a historical allocation matrix 608 generated based on a historic distribution of mail previously processed by one or more sorting stations 604.

Returning to FIG. 3, after the postal data is accessed, the postal data is mapped to production management data (S304), where the production management data describes characteristics of a model production management process in an initial state and is capable of being processed by a production management application. For example, forecast deposits and collections of mail may be mapped to planned work orders of a model production management process, actual deposits and collections of mail may be mapped to pending work orders of the model production management process, mail sortation area characteristics may be mapped to work center characteristics of the model production management process, a forecast allocation matrix may be mapped to a bill of materials of the model production management process, characteristics of raw, semi-sorted, and fully sorted mail inducted in the mail sortation process may be mapped to characteristics of raw, semi-finished, and fully finished processing materials of the model production management process, labor requirements may be mapped to resource levels of the model production management process, and mechanized sortation capabilities may be mapped to machine capabilities of the model production process.

In the example of FIG. 4, a postal modeler 408 may map the type and volume of mail expected 404 to a planned work order 410 which specifies a type and a volume of processing materials expected to be processed at one or more machines of a production facility. The postal modeler 408 may also map the mechanized sortation capabilities 402 to production machine capabilities 412. In the example of FIG. 5, a postal modeler 508 may map the type and volume of mail expected 504 to a planned work order 510 which specifies a type and a volume of processing materials expected to be processed at one or more machines of a production facility and may map the labor requirements for sortation 502 to work center resource levels 512. In the example of FIG. 6, a postal modeler 610 may map the type and volume of mail actually received 602 to a pending work order 611 which specifies a type and volume of processing materials ready to be processed at one or more machines of a production facility and may map the historical allocation matrix 608 to a bill of materials 612 for each of the one or more production facility machines.

Mapping postal data to production management data may also include mapping each class of mail to a processing material of type "MAIL", where the processing material is identified by one or more identifiers. For example, raw or semi-sorted mail may be mapped to a processing material of type "MAIL", identified by a first identifier having at least one character string that identifies the processing material as a raw or semi-finished processing material, respectively. In another example, an identifier may have, for example, three character strings that each identify different characteristics of the class of mail. For example, a first character string may identify a type of mail selected from the group consisting of short/long lettermail, oversized lettermail, and unknown lettermail. For example, "SL" may represent short/long lettermail, "OS" may represent oversized lettermail, and "UK" may represent unknown lettermail. A second character string may identify a location to which the particular class of mail has been sorted to, if any. For example, "TOR" may represent a destination location of Toronto and "WIN" may represent a destination location of Winnipeg. A third character string may identify a next mail process. In some implementations, a fourth character string may identify whether the particular class of mail is delivery points sequenced or non-sequenced (e.g., "DPS" may represent delivery points sequenced and "NS" may represent non-sequenced).

In the third character string, for example, "CFC" may represent a culler facer canceller process, "MLC" may represent a multi-line cancellation and optical character recognition (OCR) process, "MLV" may represent a multi-line optical character recognition process, "MLS" may represent a multi-line sort process, "MAN" may represent a manual sort process, "MAN" followed by a depot number (e.g., "MAND01") may represent a manual final sort to a specific delivery depot process, "FSM" may represent a flat sorting machine process, "BCS" followed by a forecast allocation matrix identifier (e.g., "BCS101") may represent a barcode sort machine process which identifies a forecast allocation matrix, "BCS" followed by a city abbreviation (e.g., "BSC-TOR", where "TOR" is an abbreviation for Toronto) may represent a barcode sort machine process which identifies a city, "BCSFWD" may represent a barcode sort machine process which identifies a forward area, "DPS" followed by a sequencing sorting pass number (e.g., "DPS1", "DPS2") may represent a sorting process which identifies sequenced delivery points, and "LC" followed by a route identifier (e.g., "LC0001") may represent a sorting process which identifies a letter carrier route.

Returning to FIG. 3, the production management data is inputted for processing by the production management application (S306) to produce forecasted production management data which predicts characteristics of the model production management process in a subsequent state. For instance, in the example of FIG. 4, the type and the volume of the processing materials specified by the planned work order 410 and the production machine capabilities 412 may be inputted to and processed by a production management ERP module 420 to predict whether one or more of the production machines are over-utilized or under-utilized, as represented by an "under/over-utilized processing state expected" forecasted production management data 430. In the example of FIG. 5, the type and the volume of the processing materials expected to be processed at one or more machines of a production facility (e.g., as specified by the planned work order 510) and the work center resource levels 512 may be inputted to and processed by a production management module 520 to predict whether each of the production machines possess sufficient resources to process the type and the volume of the processing materials, as represented by a "sufficient/insufficient resources expected" forecasted production management data 530.

In the example of FIG. 6, the pending work order 611 and the bill of materials 612 may be inputted to and processed by a production management module 620 to predict a type and quantity of end items expected to be produced by one or more production machines, as represented by a "type and a quantity of end items expected" forecasted production management data 630. In some implementations, a first type and a first quantity of first end items produced by a first machine is predicted, and at least a portion of the first type and the first quantity of the end items produced by the first machine is inputted for processing by the production management module 620 to predict a second type and a second quantity of second end items produced by a second machine, and the second type and the second quantity of the second end items is used to predict the type and quantity of the end items.

Returning to FIG. 3, the forecasted production management data is mapped to forecasted postal data which predicts characteristics of the mail sortation process (S308). For instance, in the example of FIG. 4, the "under/over-utilized processing state expected" forecasted production management data 430 may be mapped (e.g., by the postal modeler 408) to an "under/over-utilized sortation state expected" forecasted postal data 440, to determine whether one or more sorting stations are over-utilized or under-utilized. In the example of FIG. 5, the "sufficient/insufficient resources expected" forecasted production management data 530 may be mapped (e.g., by the postal modeler 508) to a "labor requirements satisfied/not satisfied" forecasted postal data 540, to determine whether labor requirements of each sorting station are met. In the example of FIG. 6, one or more customers of the mail sortation facility (e.g., as identified by one or more customer identifiers 640) expected to receive the mail may be identified based on the "type and quantity of end items expected" forecasted production management data 630. Additionally, a volume 642 of the mail expected to be delivered to each of the customers may be identified, based on the "type and quantity of end items expected" forecasted production management data 630.

Returning to FIG. 3, at least a portion of the forecasted postal data is provided to a user (S310), thereby ending the process 300 (S312). The provided forecasted postal data may be used to alter postal operations. For instance, in the example of FIG. 4, as represented by an "alter intra/extra sorting facility routings" feedback item 450, a routing between one or more sorting stations may be altered based on determining that one or more sorting stations are over-utilized or under-utilized, or, as another example, mail actually received at the mail sortation facility may be reassigned to a different sorting station or to a different mail sortation facility based on determining that one or more sorting stations are over-utilized or under-utilized. In the example of FIG. 5, as represented by a "reassign staffing" feedback item 550, staffing of the mail sortation facility may be reassigned based on determining that one are more sorting stations are predicted to not possess sufficient resources.

In the example of FIG. 6, as represented by a "notify customers" feedback item 650, one or more customers may be notified of the type and the volume of mail expected to be delivered. As another example, as represented by a "schedule resources" feedback item 655, resources to transport the expected volume of mail to each of the identified customers may be scheduled. Also, the historical allocation matrix 608 may be updated based on the type and the volume of the mail actually received at the sorting stations of the mail sortation facility.

Figure 7A:
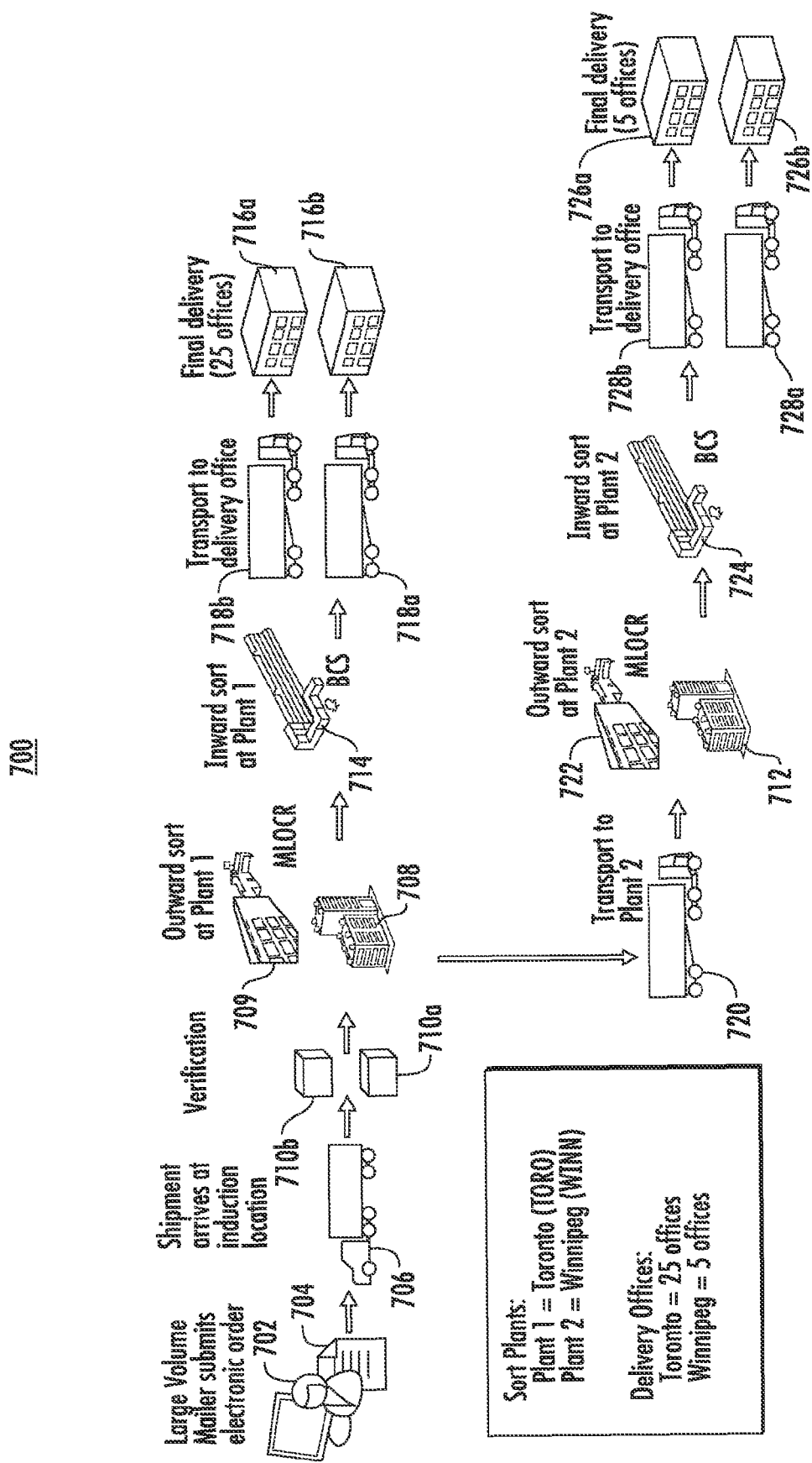
FIGS. 7A and 7D illustrate systems for sorting mail.

FIG. 7A illustrates a system 700 for sorting mail. A mailer 702 submits an electronic order 704 for a large volume mailing. A mail shipment may be transported (e.g., using one or more trucks 706) and may arrive at a receiving dock at a plant 708 (e.g., a plant located in Toronto). The mail shipment may be verified, such as verifying one or more containers 710a-b against an inspection checklist. An outward sort may be performed at the plant 708, for example, using one or more MLOCR (Multi-Line Optical Character Recognition) machines 709.

Some of the sorted mail may be sorted for delivery to a second plant 712 (e.g., a plant located in Winnipeg), and some of the sorted mail may be targeted for an inward sort process at the plant 708. An inward sort process may be performed at the plant 708 using, for example, one or more barcode sort machines 714. Mail that has gone through the inward sort process may be transported to one or more delivery offices 716a-b using, for example, one or more trucks 718a-b. For example, a mail district in Toronto served by the plant 708 may have 25 delivery offices. Mail may be unloaded at the delivery offices 716a-b, may be further sorted, and may be processed for final delivery.

Mail sorted for the plant 712 may be transported to the plant 712 using one or more trucks 720. An outward sort may be performed at the plant 712, for example, using one or more MLOCR machines 722. An inward sort process may be performed at the plant 712 using, for example, one or more barcode sort machines 724. Sorted mail may be transported to one or more delivery offices 726a-b using, for example, one or more trucks 728a-b. For example, a mail district in Winnipeg served by the plant 712 may have 5 delivery offices. Mail may be unloaded at the delivery offices 726a-b, may be further sorted, and may be processed for final delivery.

Figure 7B:
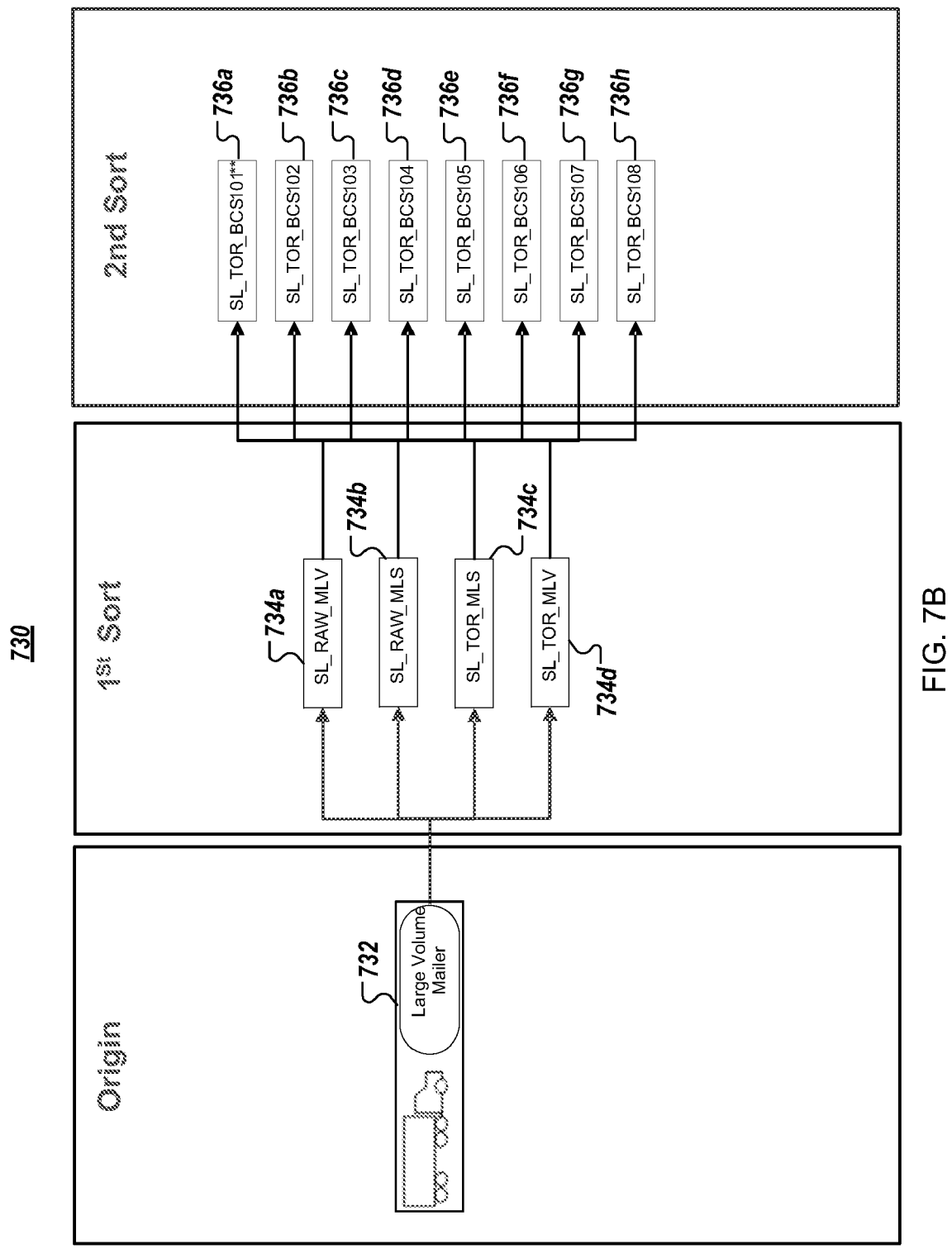
FIGS. 7B and 7C illustrate systems for routing mail between multiple sort processes.

FIG. 7B illustrates a system 730 for routing mail between multiple sort processes. A shipment of short/long lettermail may be received, for example, from a large volume mailer (LVM) 732. The shipment may arrive in multiple containers, and containers may include, for example, unsorted mail with identifier "SL_RAW_MLV" 734a targeted for a multi-line optical character recognition process, unsorted mail with identifier "SL_RAW_MLS" 734b targeted for a multi-line sort process, mail with identifier "SL_TOR_MLS" 734c sorted to Toronto for a multi-line optical character recognition process, and mail with identifier "SL_TOR_MLV" 734d sorted to Toronto for a multi-line sort process. The mail identified by identifiers 734a-d may, after sorting, be targeted for a second sort process, such as processes represented by identifiers 736a-h. The identifiers 736a-h each represent a barcode sort machine process which may use an identified forecast allocation matrix. For example, the identifier 736b indicates that a forecast allocation matrix with matrix identifier "102" may be used.

Figure 7C:
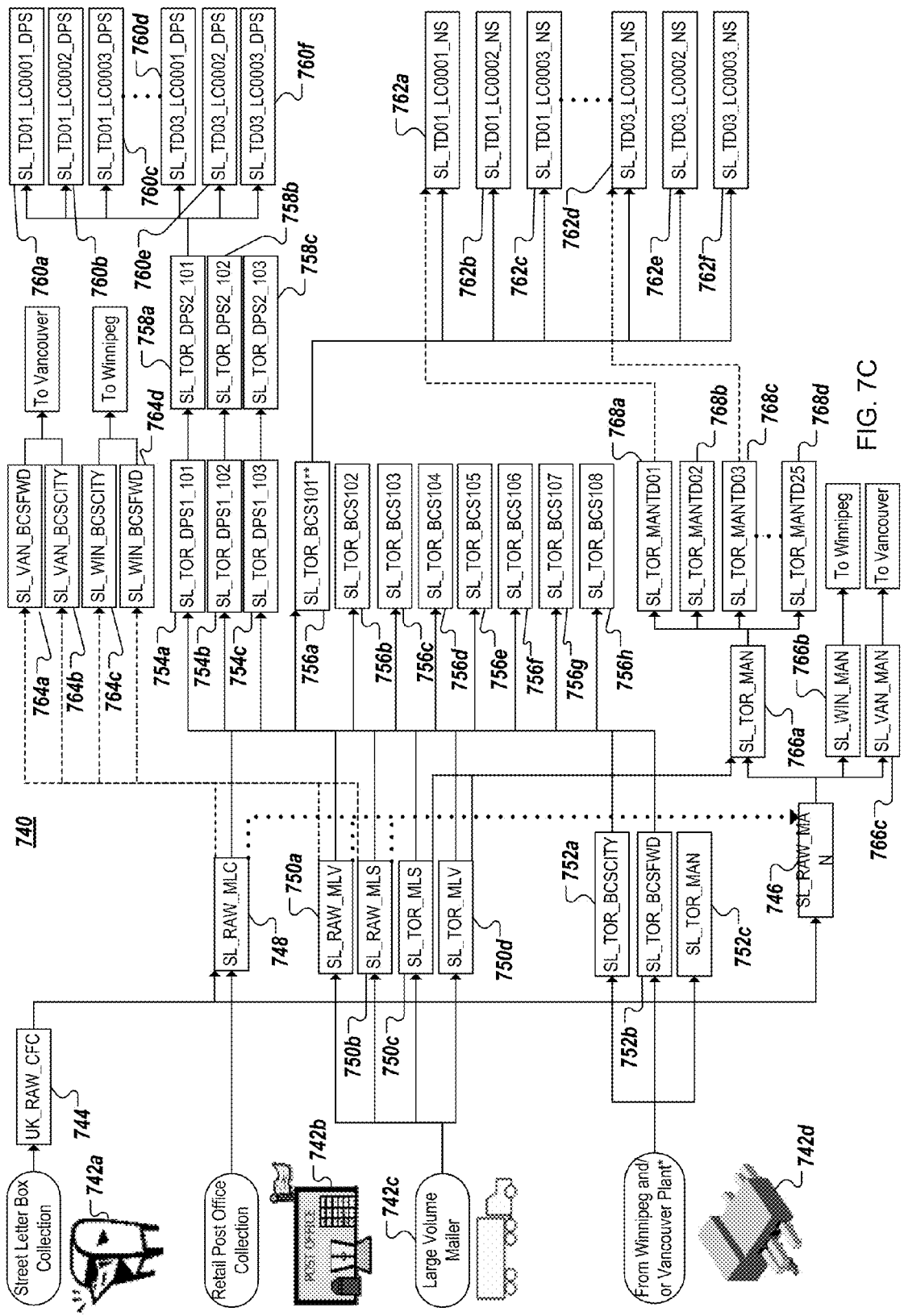

FIG. 7C illustrates a system 740 for routing mail between multiple sort processes. The system 740 illustrates sort processes which may occur at a particular sortation facility (e.g., a plant in Toronto). Mail may be received at the sortation facility from one or more street collection boxes 742a, one or more retail post office locations 742b, one or more large volume mailers 742c, or one or more other sortation facilities 742d (e.g., Winnipeg, Vancouver). For incoming mail, a mail type and a next sortation process may be identified. For example, identifier "UK_RAW_CFC" 744 represents unsorted mail received from the collection box 742a which is to be processed by a CFC (Cull Face Canceller) machine. After being processed by the CFC machine, mail may then be either sorted manually (as indicated by identifier "SL_RAW_MAN" 746) or processed by a multi-line canceller (as indicated by identifier "SL_RAW_MLC" 748). The identifier 748 also represents mail received from the retail location 742b and processed on a multi-line canceller.

Mail received from the large volume mailer 742c may be unsorted (as indicated by identifiers "SL_RAW_MLV" 750a and "SL_RAW_MLS" 750b) or sorted to Toronto (as indicated by identifiers "SL_TOR_MLS" 750c and "SL_TOR_MLV" 750d. Mail represented by identifiers 750a and 750d may be processed using a multi-line optical character recognition process and mail represented by identifiers 750b and 750c may be processed using a multi-line sort process.

Mail received from a sortation facility 742d may be identified by identifiers 752a-c. Identifiers 752a and 752b represent mail sorted to Toronto and targeted for a barcode sort process. Identifier 752c represents mail sorted to Toronto that may be further sorted using a manual process.

After being processed by a barcode sort process, the mail identified by identifiers 752a-b may be processed by a process identified by a identifier from the set of identifiers 754a-c or the set of identifiers 756a-h. Similarly, mail identified by the identifier 748 or mail identified by one of the identifiers 750a-d may be processed by a process identified by the identifiers 754a-c or 756a-h. The identifiers 754a-d represent mail sorted to Toronto which may be further sorted to a street address level using a delivery points sequencing sort plan. The identifiers 756a-h represent mail sorted to Toronto which may be further sorted to a delivery route level using a barcode sorter.

Mail sorted on a delivery points sequencing sort plan may be processed using a second delivery points sequencing sort pass, as indicated by identifiers 758a-c. Identifiers 760a-f represent mail that has been sequenced to delivery points for a particular delivery office and for a particular letter carrier route. For example, identifier 760b represents mail for delivery office "TD01" and letter carrier route "LC0002".

Mail sorted to a delivery route level (e.g., mail represented by identifiers 756a-h) may be targeted for a specific delivery office and/or letter carrier route, as indicated by identifiers 762a-f. For example, identifier 762c represents mail for delivery office "TD01" and letter carrier route "LC0003". Mail sorted to a delivery route level may be sequenced by delivery office personnel before delivery.

Mail that has not been sorted to a destination (e.g., mail identified by identifiers 748, 750a, or 750b) may be manually sorted with a manual prime sort (as indicated by identifier 746), or may be targeted for a barcode sort to be performed at another sort facility (e.g., Vancouver or Winnipeg, as indicated by identifiers 764a-d). For example, mail processed and rejected by a multi-line machine (e.g., identifiers 750a and 750b) may be manually sorted. Identifiers 766a ("SL_VAN_MAN"), 766b ("SL_WIN_MAN"), and 766c ("SL_TOR_MAN") represent mail processed by a manual city sort to Vancouver, Winnipeg, and Toronto, respectively. Identifiers 768a-d represent mail processed with a manual final sort to a specific Toronto delivery office. For example, identifier 768b represents mail targeted to a "TD02" delivery office.

Figure 7D:
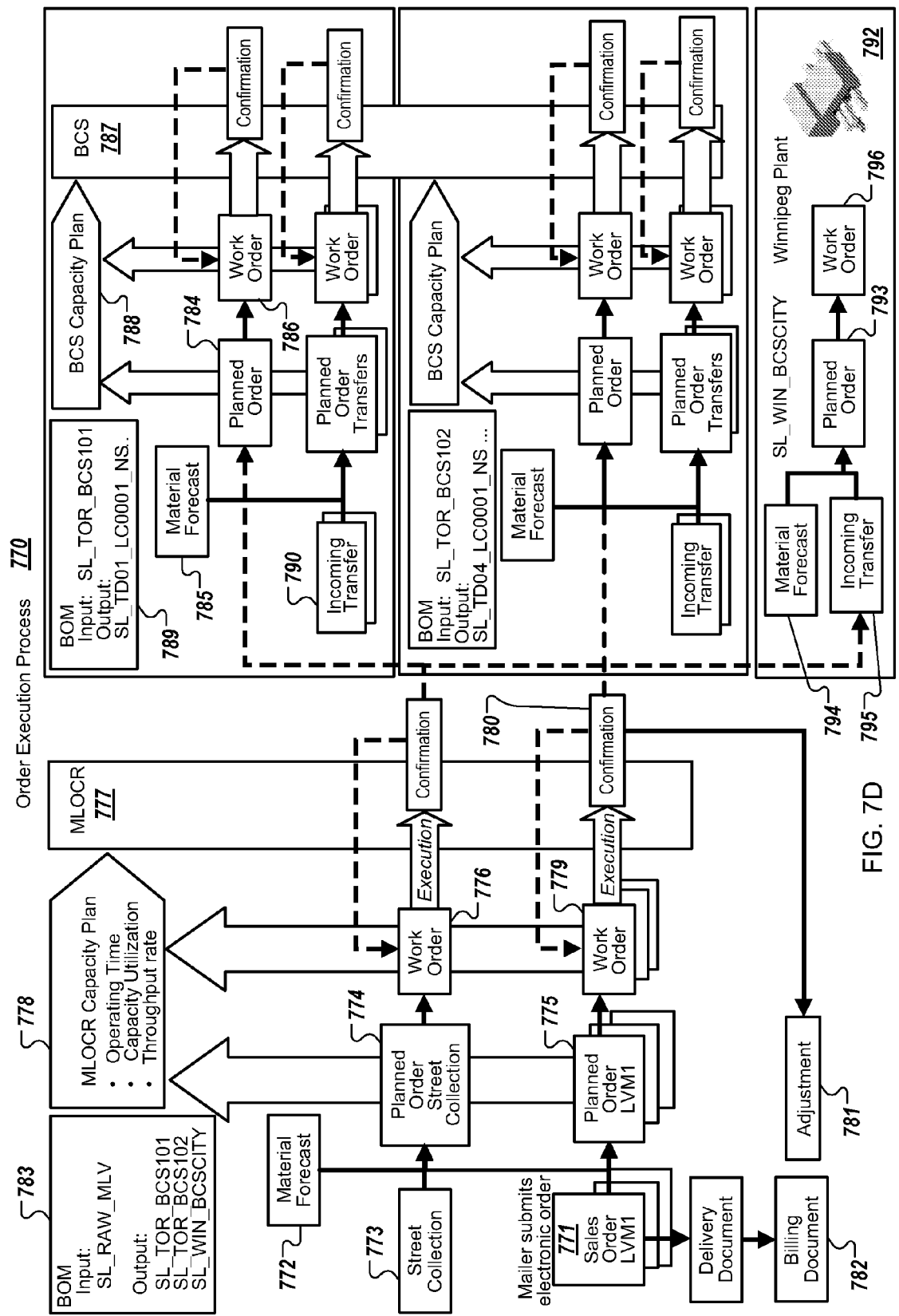

FIG. 7D illustrates a system 770 for sorting mail. For example, the system 770 may be used at a mail sortation facility (e.g., a facility in Toronto). A mailer (e.g., "LVM1") submits an electronic order for a mailing and a sales order 771 is created. A volume forecast for the LVM1 customer is obtained (e.g., based on historical data), and a material forecast 772 is created based on the LVM1 forecast and on a volume forecast for retail and street collections 773.

A planned order 774 for the street collection 773 is created and is scheduled based on the material forecast 772. Similarly, a planned order 775 for the LMV1 customer is also created and is scheduled based on the material forecast 772. Upon receipt of the street collection 773, a work order 776 is created based on the planned order 774. The work order 776 is executed. For example, mail may be outward sorted on a MLOCR machine 777. A capacity plan 778 may be used for capacity planning for a work center that includes the MLOCR machine 777.

A work order 779 is created based on the planned order 775. The work order 779 is executed, and volumes processed are confirmed with a confirmation 780. If the actual volumes processed differ from those specified on the work order 779, then an adjustment 781 may be made to a billing document 782. A bill of materials 783 may be associated with the work order 779. The bill of materials 783 may list an input and one or more sort outputs. For example, the bill of materials 783 lists an input of short/long lettermail to be processed using a multi-line optical character recognition process, with two outputs sorted to Toronto for a second barcode sort process, and a third output sorted to a Winnipeg facility for a barcode sort process.

Mail with an identified output of "SL_TOR_BCS101" is sorted to a barcode sort process using a sort plan with an identifier of "BCS101". Similarly, mail with an identified output of "SL_TOR_BCS102" is sorted to a barcode sort processing using a sort plan with an identifier of "BCS102". A planned order 784 may be created based on a material forecast 785, where the material forecast 785 predicts volume of "SL_TOR_BCS101" mail, for example, based on historical data. A work order 786 may be created based on the planned order 784. The work order 786 may be executed. For example, mail may be processed using a barcode sorter 787. A capacity plan 788 may be used for capacity planning for a work center that includes the barcode sorter 787.

A bill of materials 789 specifies an output of "SL_TD01_LC0001_NS", which indicates that mail is to be sorted to a delivery office with identifier "TD01". The "NS" indicates that further sorting may be performed at the delivery office. An incoming transfer 790 may be used to receive input mail of type "SL_TOR_BCS101" from other sortation facilities. Mail of type "SL_TOR_BCS_102" may be processed in a similar fashion as for mail of type "SL_TOR_BCS_101".

Output mail of type SL_WIN_BCSCITY specified on the bill of materials 783 may be processed at a Winnipeg sortation facility 792. A planned order 793 may be created based on a material forecast 794. An incoming transfer 795 may be used to receive the incoming mail. A work order 796 may be created, scheduled and executed at the Winnipeg facility 792.

Figure 8:
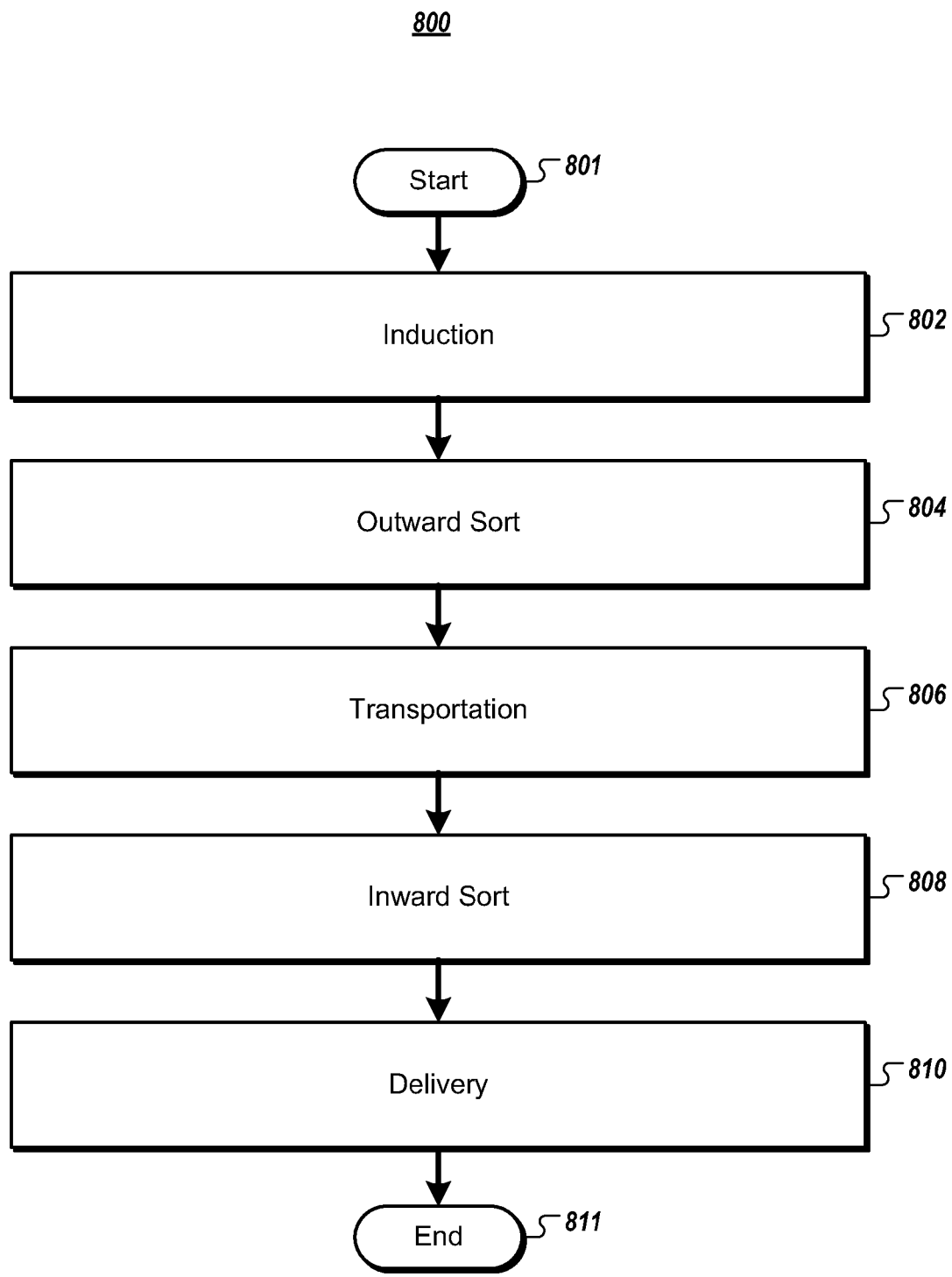

FIG. 8 is a flowchart illustrating a computer-implemented process 800 for sorting mail. Briefly, the process 800 includes induction, outward sort, transportation, inward sort, and delivery. In further detail, when the process 800 begins (S801), an induction stage is performed (S802). The induction stage may include a number of steps.

Figure 9A:
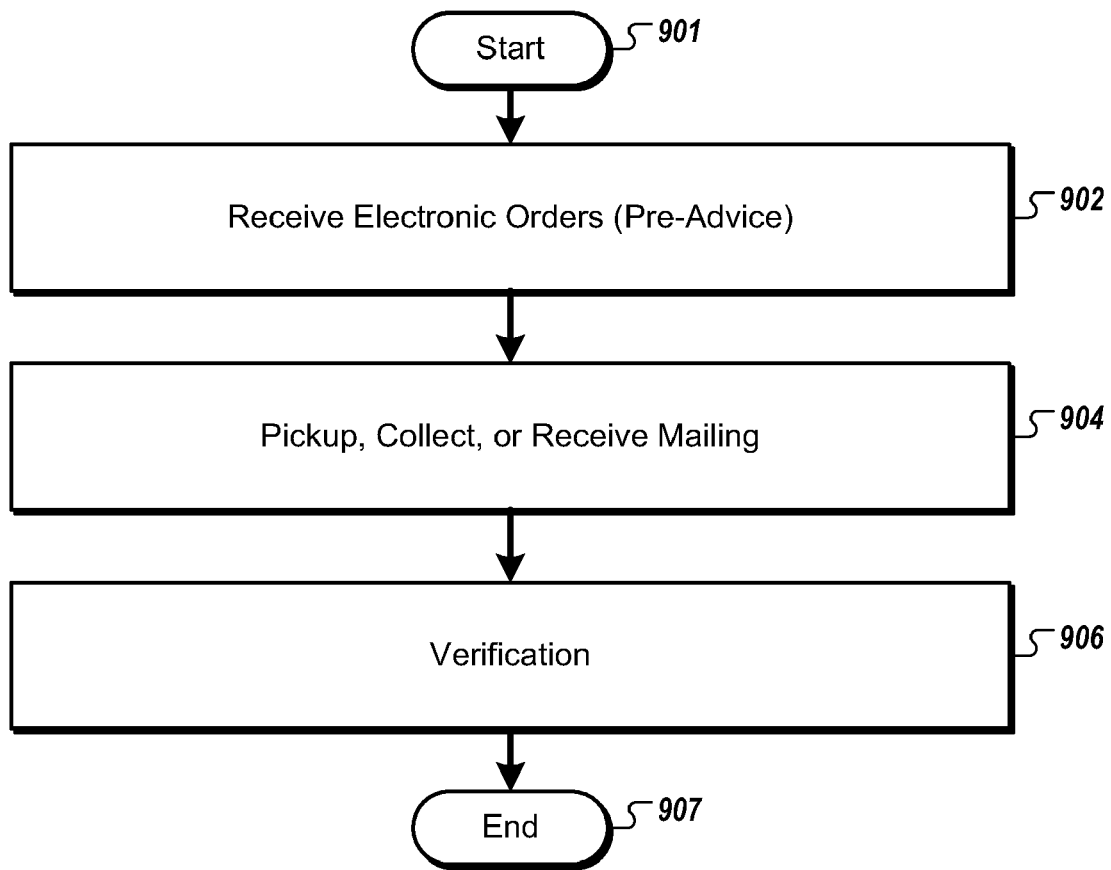

For example, referring ahead briefly, FIG. 9A illustrates an example computer-implemented process 900 for performing an induction process (e.g., process 900 may be used to implement S802 of the process 800). Briefly, the process 900 includes receiving an electronic order, picking-up, collecting, or otherwise receiving a mailing, and verification. For the induction stage, it may be assumed that no machines are used, and therefore capacity planning may or may not be used for this stage.

In further detail, when the process 900 begins (S901), an electronic order (e.g., pre-advice) is received (S902). Mailers may send a notification that they will be submitting a mailing. An order may be completed and submitted electronically through an order capture system (e.g., web application). The order may be a pre-advisement that a shipment may be expected on a specific date/time. The mailer may specify the order volume by mail type and pre-sortation level, which may allow the induction facility as well as other downstream facilities to start capacity planning processes.

Figure 9B:
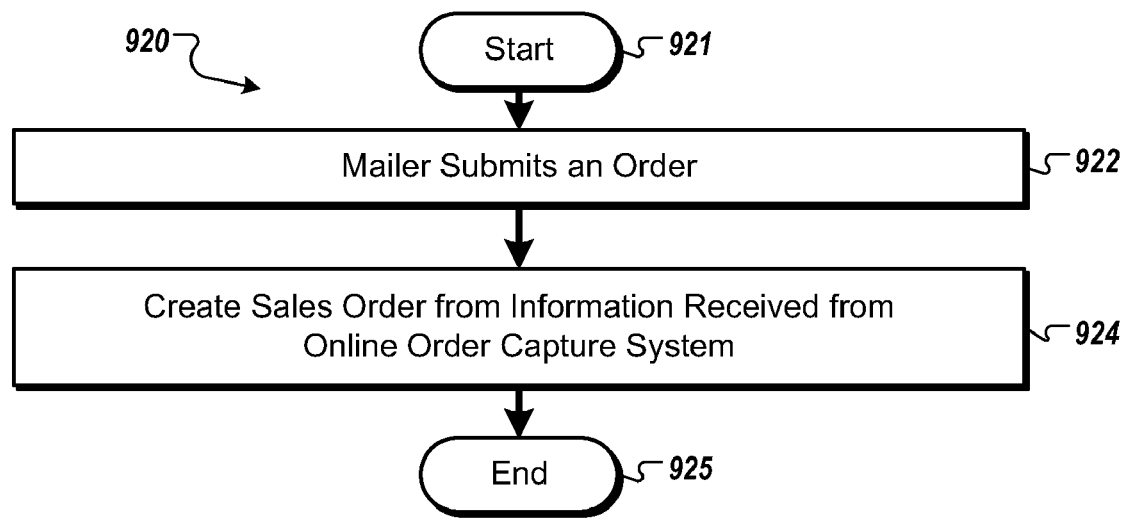

Referring ahead briefly, FIG. 9B illustrates a computer-implemented process 920 for receiving an order (e.g., process 920 may be used to implement further details of S902 of the process 900). Briefly, the process 920 includes a mailer submitting an order, and creating a sales order from information received from an online order capture system.

In further detail, when the process 920 begins (S921), a mailer submits an order (S922). A mailer may complete, for example, an online application form which captures customer and shipment information and calculates postage cost. The postage cost may be calculated based on variables, such as mail class, mail type and sortation level. When submitted, the order form may have information used to start the next step in the sortation process. The electronic order may serve as the mailer's pre-advice.

Mailer-supplied information may include, for example, a customer number (which identifies a customer account), a mailer identifier (e.g., if the mailer presenting shipment is different than the mailer paying for the shipment), a contract number, and an induction facility with postal code. The mailer may also supply a date and time of mailing (e.g., a date and time that the mailing is to be inducted, assuming that the appointment slot is available), number and types of containers (mono, pallet, bag, etc.), number of pieces per container type (e.g., by mail type), weight per piece (e.g., by mail type), a cost center reference, and a pre-sort level (e.g., by container, including destination information).

After the mailer submits an order, a sales order is created from information received from an online order capture system (S924), thereby ending the process 920 (S925). Once the mailer submits their online order through the online order capture system, the information may be received into an ERP environment through an interface and may be created as a sales order object in a sales and distribution module. A sales order number may be assigned. Using sales order information, the expected number of orders and expected total volume for each mail type for an induction location on a particular date and time may be determined.

Figure 9C:
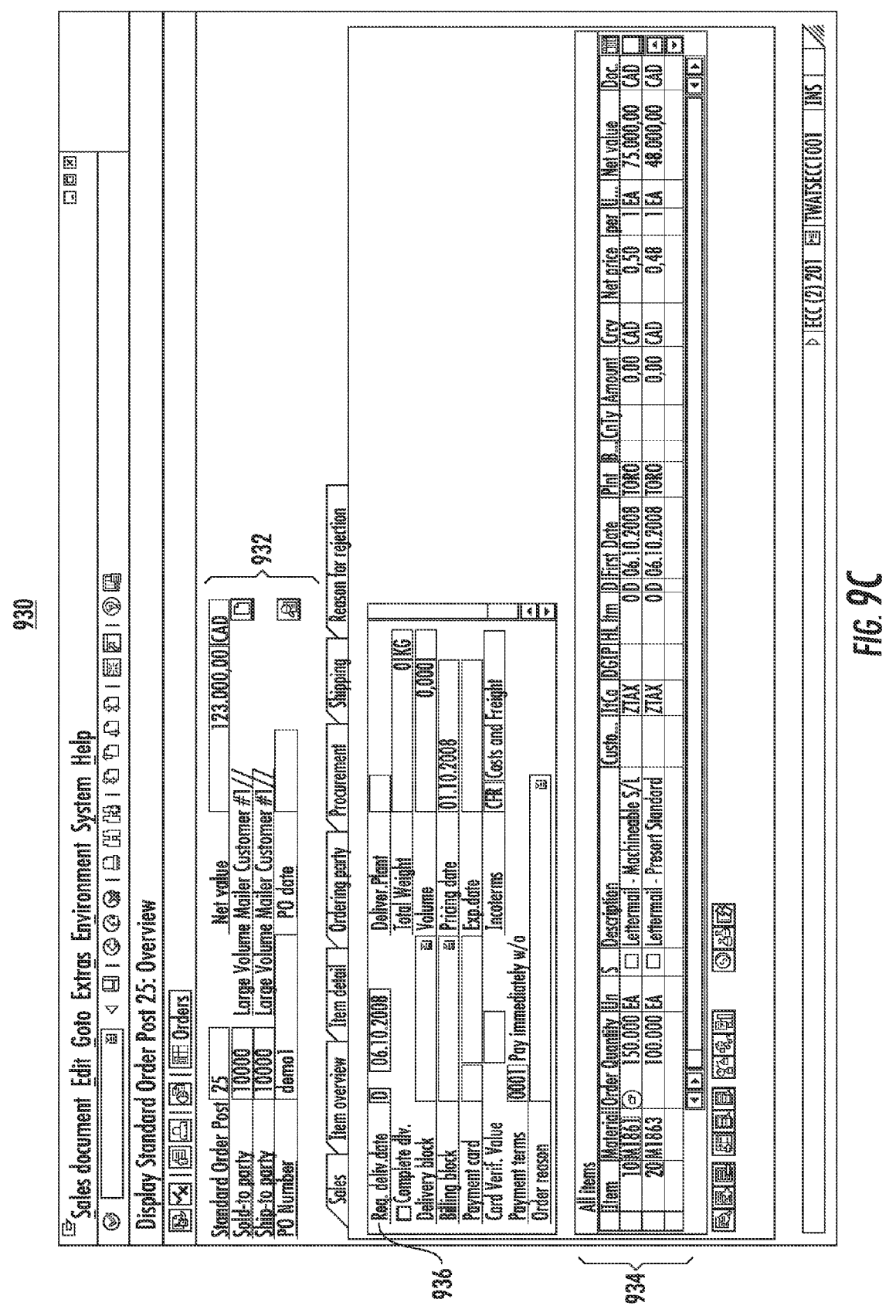

For example, FIG. 9C illustrates an example user interface 930 for creating a sales order. An area 932 may be used for specifying a sold-to party, shipped-to party, and other customer information. An area 934 may be used to display items included in the order, including item descriptions, quantities and prices. A requested delivery date may be specified and displayed in a control 936.

Returning to FIG. 9A, a mailing is picked-up, collected, or received (S904). As a brief overview, a shipment may arrive at an induction facility and may be received at a receiving dock and the shipment may be entered into an ERP system to mark that it has been received.

Figure 9D:
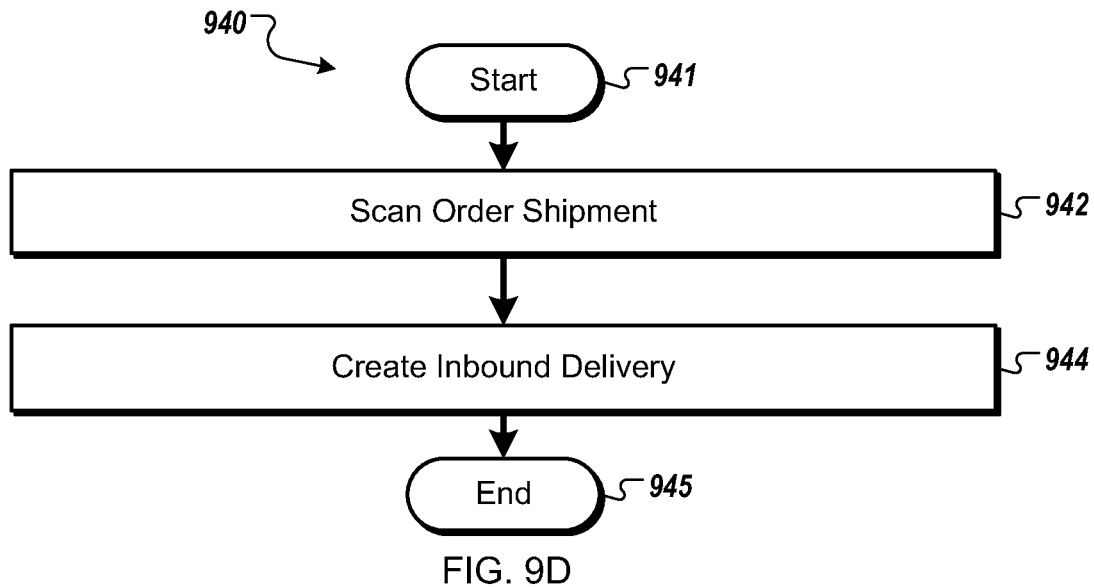

Referring ahead briefly, FIG. 9D illustrates a computer-implemented process 940 for picking-up, collecting, or receiving a mailing (e.g., process 940 may be used to implement further details of S904 of the process 900). Briefly, the process 940 includes scanning an order shipment and creating an inbound delivery.

In further detail, when the process 940 begins (S941), an order shipment is scanned (S942). The order may arrive at an induction location. A sales order number on a paper order manifest may be provided by a driver and each container within the shipment piece may be scanned by dock personnel. A date-received time stamp may be stored in an event management module. The event management module may also store barcode scan information for each container, with each container marked as "received" and also identified as an event handler. A received event may be triggered in the ERP system.

After the order shipment is scanned, an inbound delivery is created (S944), thereby ending the process 940 (S945). In the ERP system, when an order is received at an induction facility, an inbound delivery may be created to signify that the order has been received. An inbound delivery for incoming order may be created automatically or manually.

Figure 9E:
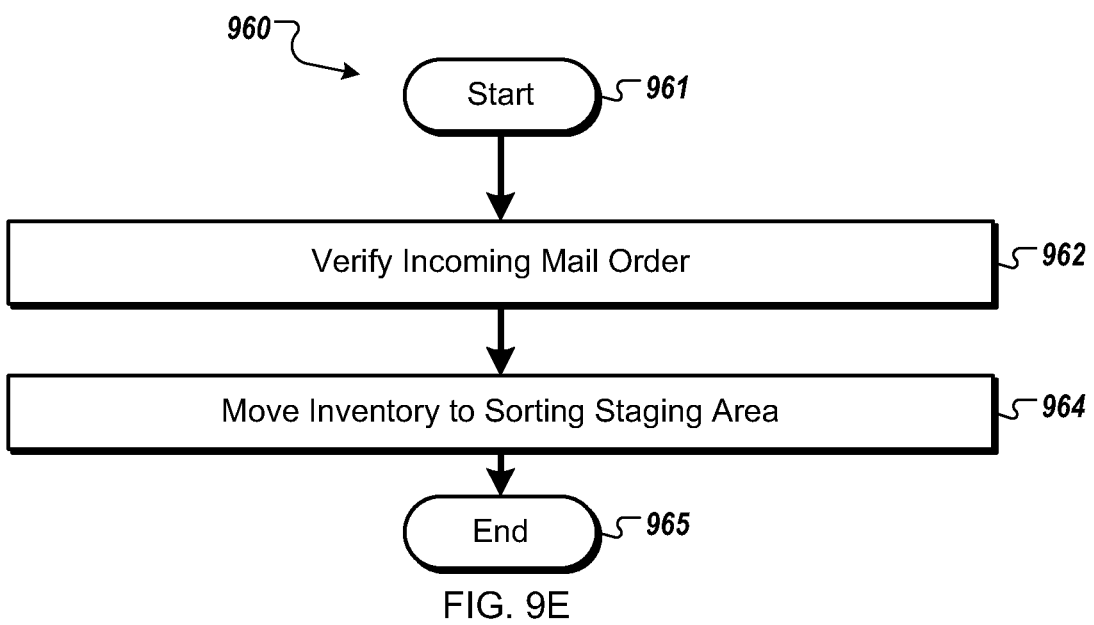

Returning to FIG. 9A, the mail order is verified (S906), thereby ending the process 900 (S907). Referring ahead briefly, FIG. 9E illustrates a computer-implemented process 960 for mail order verification (e.g., process 960 may be used to implement further details of S906 of the process 900). Briefly, the process 960 includes verifying an incoming mail order and moving inventory to one or more sorting staging areas.

In further detail, when the process 960 begins (S961), an incoming mail order is verified (S962). A verification process may verify a mail order. For example, once a delivery is created from a sales order, an inspection checklist, with an assigned inspection lot number, may be created automatically based on mailing type (e.g., material number).

After the mail order is verified, inventory is moved to one or more sorting staging areas (S964), thereby ending the process 960 (S965). An expected event may be created in the ERP system to move inventory to one or more sorting staging areas. For mail that is pre-sorted, a generated work order may be a stock transfer order, which may be created based on one or more planning materials and one or more routing assignments. Pre-sorted mail may bypass a later outward sort processing step.

Figure 10A:
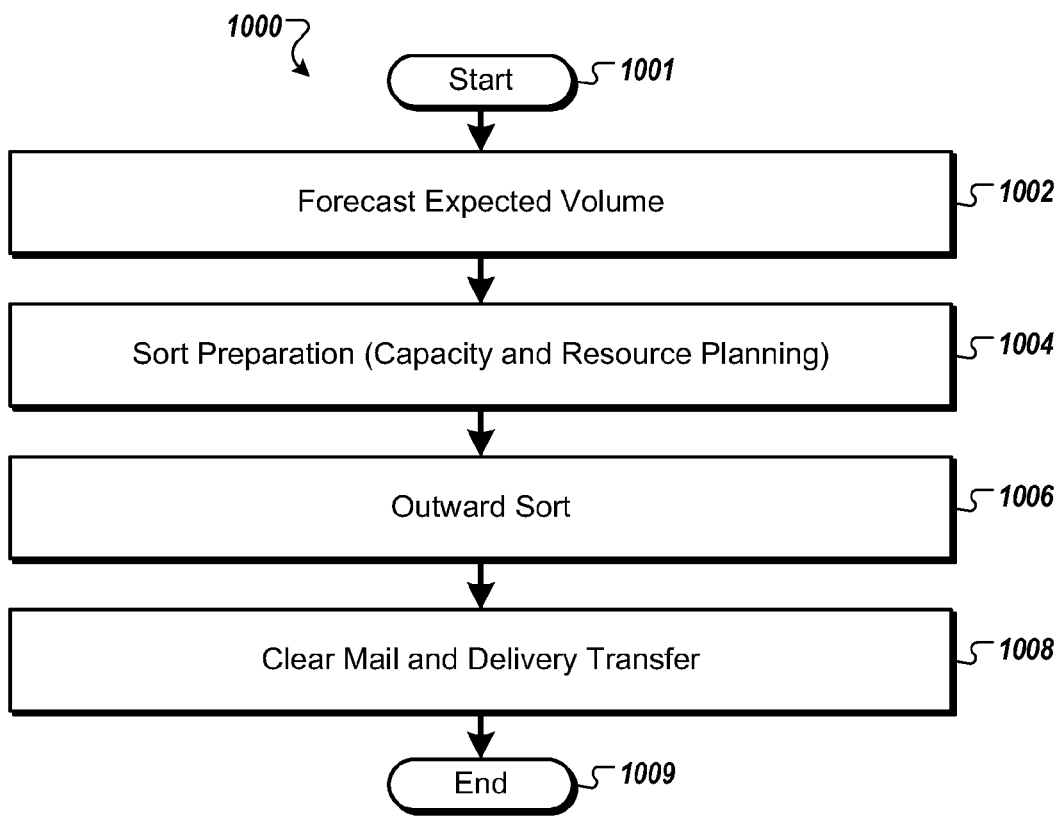

Returning to FIG. 8, an outward sort stage is performed (S804). The outward sort stage may include a number of steps. For example, referring ahead briefly, FIG. 10A illustrates a computer-implemented process 1000 for performing an outward sort process (e.g., process 1000 may be used to implement S804 of the process 800). Briefly, the process 1000 includes forecasting expected volume, sort preparation (capacity and resource planning), outward sorting, and clearing mail and transferring delivery.

In further detail, when the process 1000 begins (S1001), expected volume is forecasted (S1002). Forecasting mail volumes for each planning material may help sort facilities schedule machine and labor work. A planning material represents a mail piece through a sorting process stage. Mail items may be associated with a material type. Defined planning materials may have a material type of "MAIL", where the "MAIL" material type may be based, for example, on a non-valuated stock material type.

Planning materials may be used to schedule capacities and to track mail through and between sort facilities. Forecasting may be done for each sorting process step and may or may not be done for the route level. Forecasts may include historical data for past customer mailings, retail collections and street letter box collections. Customer forecasts may help to forecast materials for the outward sort process. A forecast allocation matrix may be used to estimate the percent allocation per output type for each planning material.

The sortation facility may obtain an estimate for retail and street collections based on historic information. The historic information may be stored in a data warehouse tool. A forecast may include historical information for a shift, hour, day of the week, month, and year, such as for a corresponding period for the previous week, the previous month, or the previous year.

Figure 10B:
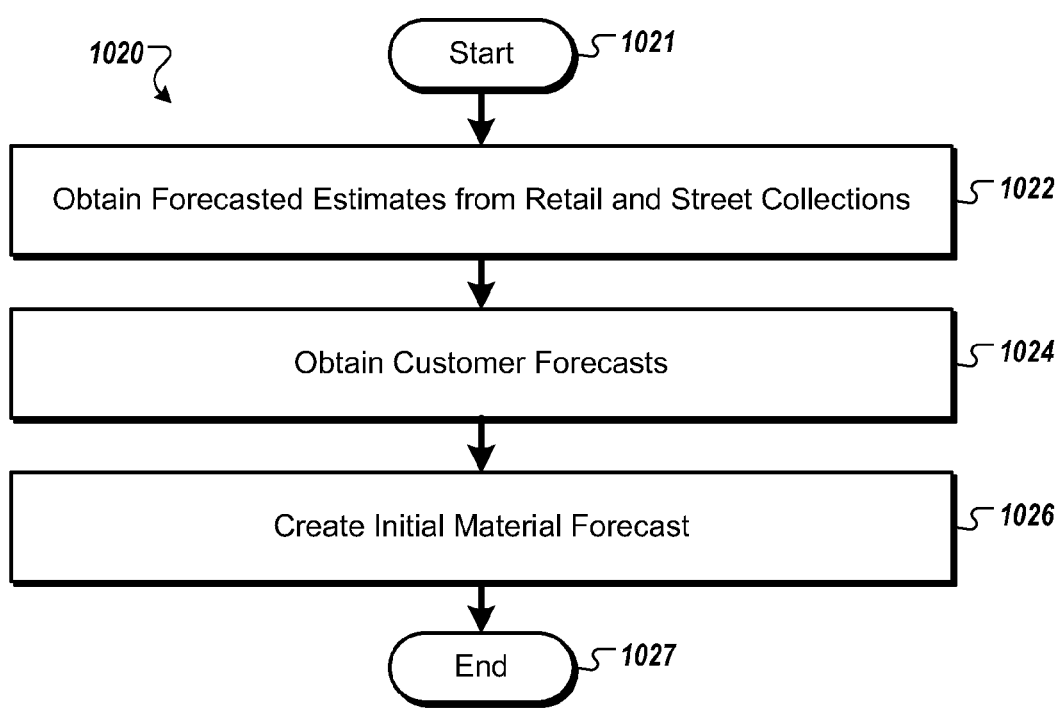
Figure 10C:
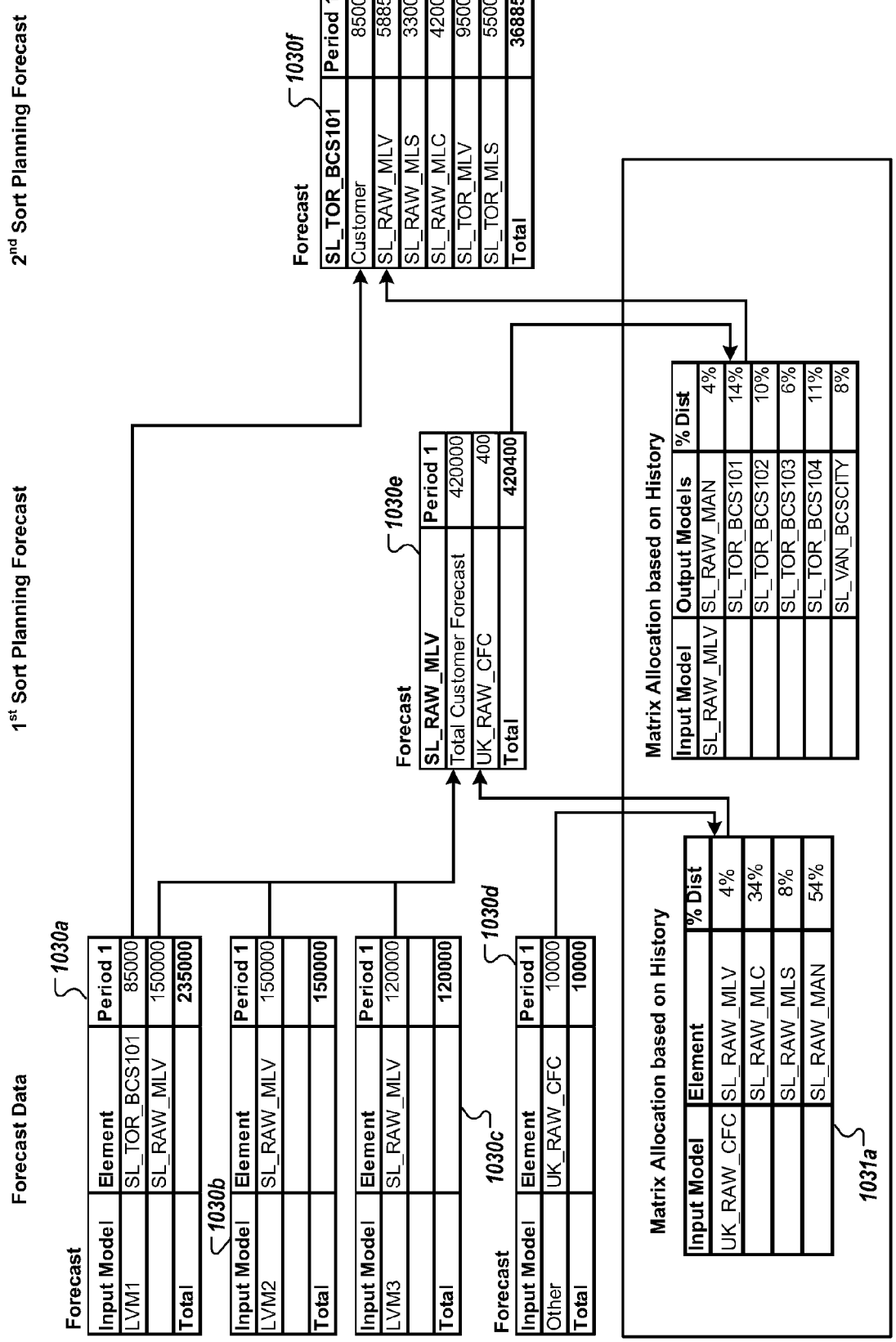
FIG. 10C illustrates example forecast data and example historical allocation matrices.

Referring ahead briefly, FIG. 10B illustrates a computer-implemented process 1020 for forecasting expected volume (e.g., process 1020 may be used to implement further details of S1002 of the process 1000). Briefly, the process 1020 includes obtaining forecasted estimates from retail and street collections, obtaining customer forecasts, and creating an initial material forecast.

In further detail, when the process 1020 begins (S1021), forecasted estimates from retail and street collections are obtained (S1022). The sortation facility can obtain an estimate for retail and street collections based on historic information, which may be obtained, for example, from a data warehouse tool. Inputs provided to a query supplied to a data warehouse may include date information, a sortation facility number, and a planning material identifier. A data warehouse query may output, for example, historical information for a shift, hour, day of the week, month, and year, such as for a corresponding period for the previous week, the previous month, or the previous year.

After retail forecasted estimates are obtained, customer forecasts are obtained (S1024). The sortation facility may obtain a customer level forecast by planning material based on historic information. The customer level forecast may be used for the outward sort process. The historic information may be stored, for example, in a data warehouse tool. Inputs provided to a query supplied to a data warehouse may include date information, a sortation facility number, and a planning material identifier. A data warehouse query may output customer level historic information.

After customer forecasts are obtained, an initial material forecast is created (S1026), thereby ending the process 1020 (S1027). By using the estimates from retail and street collections, as well as customer forecasts for a planning material, a material forecast is generated. An output determination for the material forecast may be determined using one or more forecast allocation matrices. A historical allocation matrix specifies percent allocation by output type based on historic trends.

For example, FIG. 1C illustrates example forecast data and example historical allocation matrices. Customer forecast data 1030a indicates that for a first large volume mailer (LVM1), eighty five thousand pieces of short/long lettermail sorted to Toronto are expected and one hundred fifty thousand pieces of short/long unsorted lettermail targeted for a multi-line optical character recognition process are expected. Customer forecast data 1030*b* indicates that one hundred fifty thousand pieces of unsorted short/long lettermail targeted for a multi-line optical character recognition process are expected for a second LVM (LVM2). Customer forecast data 1030*c* indicates that one hundred twenty thousand pieces of unsorted short/long lettermail targeted for a multi-line optical character recognition process are expected for a third LVM (LVM3). Forecast data 1030*d* indicates that ten thousand pieces of unsorted mail targeted for a culler face canceling process are expected from other sources (e.g., retail locations and street collections).

A historical allocation matrix 1031*a* specifies historical output type allocations for an input type of "UK_RAW_CFC". For example, historically, fifty four percent of mail of an input type of "UK_RAW_CFC" is short/long lettermail requiring manually sorting (output type "SL_RAW_MAN"), thirty four percent is short/long lettermail to be sorted with a multi-line sort with stamp cancellation (output type "SL_RAW_MLC"), four percent is commercial mail to be sorted with a multi-line sort without stamp cancellation (output type "SL_RAW_MLV"), and eight percent is commercial mail to be sorted using a multi-line sort leveraging a customer barcode (output type "SL_RAW_MLS).

A forecast 1030*e* may be created for an input type of "SL_RAW_MLV" by adding together input sources of mail of type "SL_RAW_MLV". For example, the expected "SL_RAW_MLV" inputs of one hundred fifty thousand from LMV1, one hundred fifty thousand from LMV2, and one hundred twenty thousand from LMV3 may be summed for a sub total of four hundred twenty thousand. The four hundred twenty thousand may be added to the percent of "SL_RAW_MLV" mail expected from the forecast data 1030*d* based on the matrix 1031*a*. Four percent of the ten thousand pieces of unsorted mail expected by the forecast data 1030*d* (i.e., four hundred pieces) is predicted to be of type "SL_RAW_MLV". A total of four hundred twenty thousand four hundred pieces of "SL_RAW_MLV" mail is expected.

A forecast 1030*f* for a barcode sort process for Toronto may be created. For example, the forecast 1030*f* may include the eighty five thousand pieces of mail from LMV1 sorted to Toronto. Also, a matrix 1031*b* may be used to predict, for an input of "SL_RAW_MLV", an output volume of mail sorted to Toronto for the barcode sort process. For example, the matrix 1031*b* indicates that, historically, fourteen percent of "SL_RAW_MLV" mail is output as mail sorted to Toronto for a bar code sort process using a sort plan of "101". Fourteen percent of the forecasted four hundred twenty thousand four hundred pieces of "SL_RAW_MLV" mail is fifty eight thousand eight hundred fifty six, as shown in the second row of the forecast 1030*f*. Other forecast allocation matrices may be referenced to predict volumes of mail corresponding to other mail types which are targeted for the Toronto barcode sort process using sort plan "101".

Returning to FIG. 1A, after expected volume is forecasted, capacity and resource planning are performed to prepare for outward sort (S1004). Planning based on pre-advised orders and upstream processing activities may generate advanced notification about what volumes are expected and therefore what level of machine and labor utilization may be required to sort and clear the mail from the facility. A work center consists of a machine or multiple machines and its labor requirements. The number of man hours (both full-time resources and casuals) available by cost center may be defined in a work center definition. The work center definition includes the operating time, capacity utilization and number of individual capacities.

For example, FIG. 10D illustrates an example user interface 1033 for configuring a work center. An area 1034*a* specifies the plant the work center is associated with, and a work center description. For example, the work center information displayed in the interface 1033 corresponds to a work center for a MLOCR machine located in a Toronto facility. An area 1034*b* displays capacity information for the work center, indicating that 500 pieces of mail may be processed per minute per machine, one machine is available in the work center, and the machine is available for 8 hours per day.

A routing provides instructions to the planned order and/or the work order to indicate which machine the planning material should be sorted on. The routing also specifies throughput rate as well as set-up or clearing requirements. Using the routing information along with the work center (machine) definition, the planned orders and work orders can be scheduled accordingly.

Figure 10E:
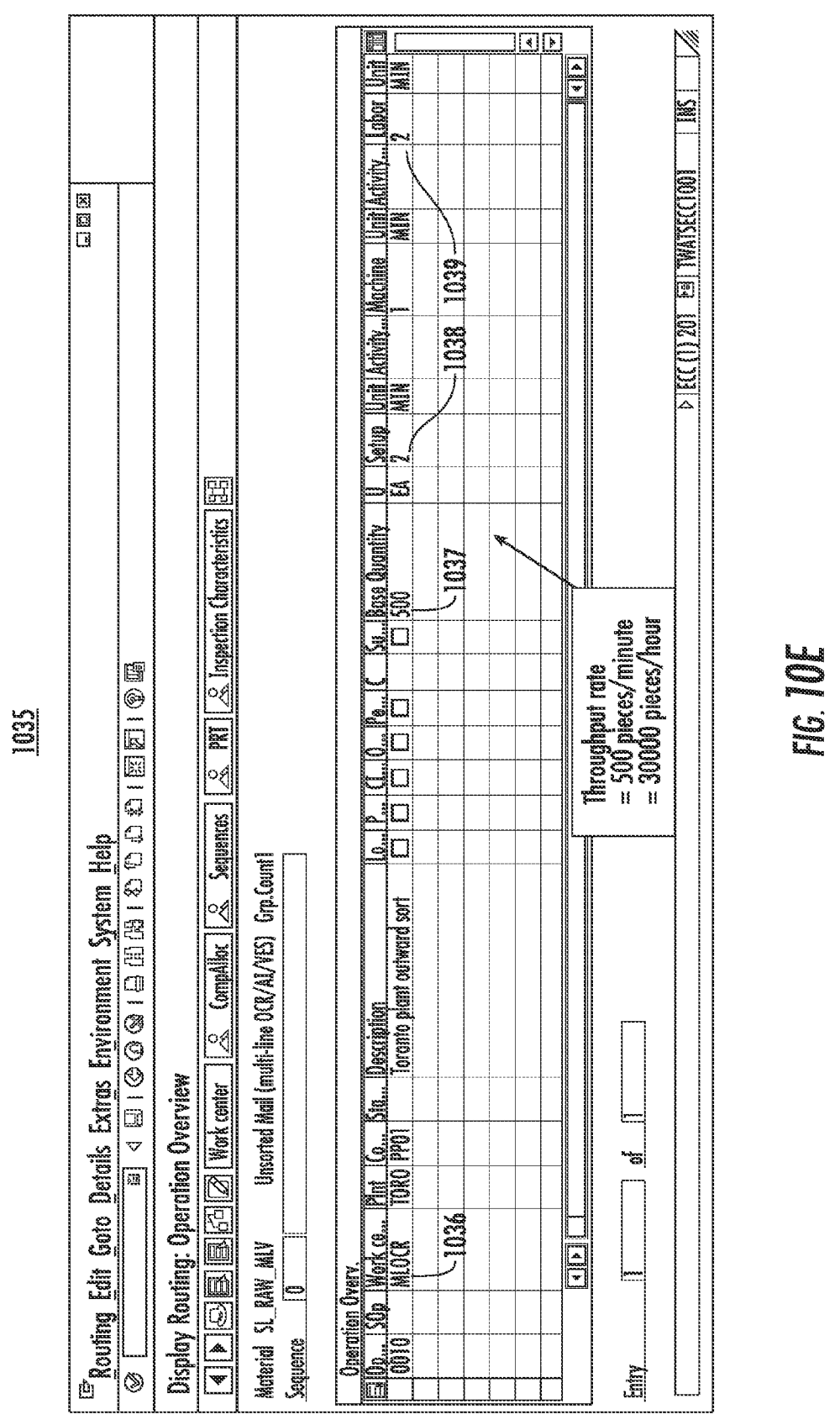

For example, FIG. 10E illustrates an example user interface 1035 for configuring a routing. The user interface 1035 includes a reference 1036 to an associated work center. The user interface 1035 displays a throughput rate 1037 of five hundred units per minute, and setup time 1038 and tear-down time 1039 requirements of two minutes each.

Figure 10F:
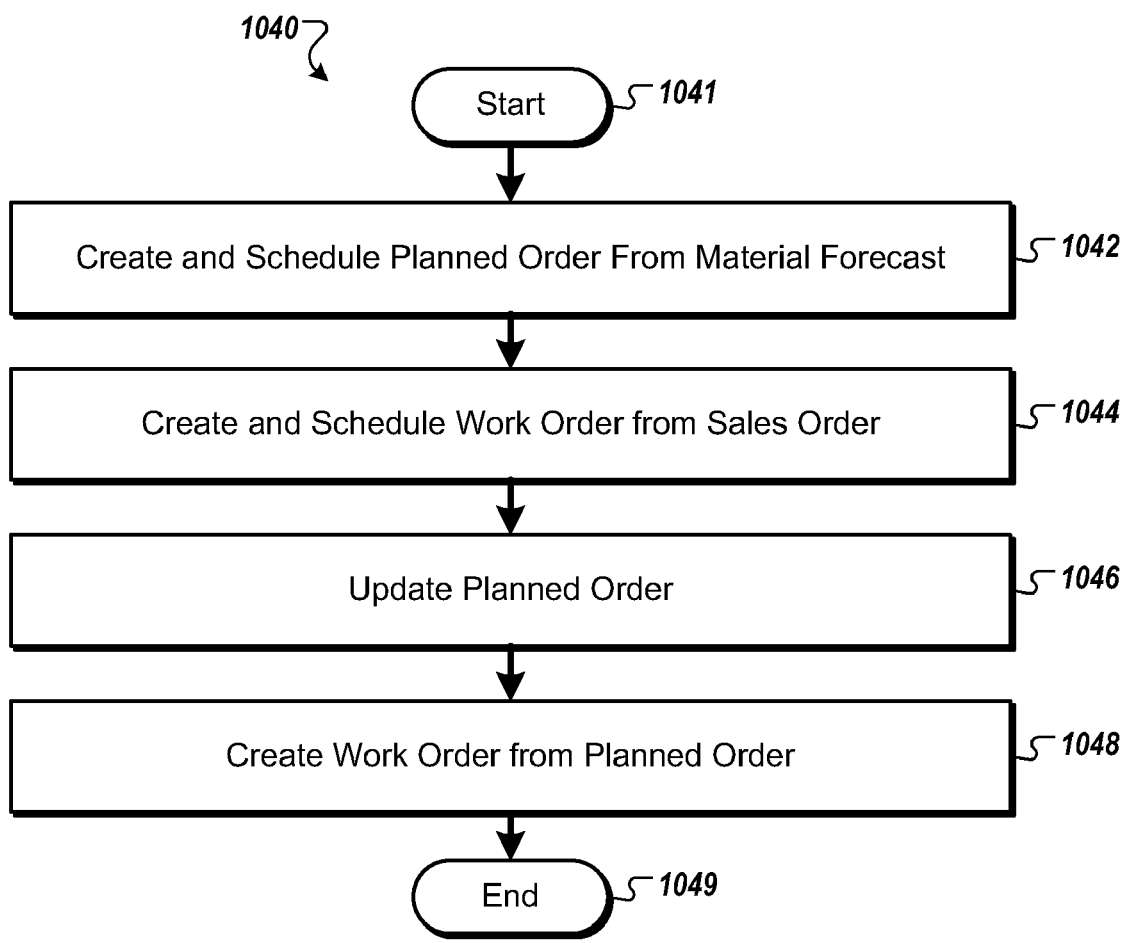

Referring ahead briefly, FIG. 10F illustrates a computer-implemented process 1040 for capacity and resource planning (e.g., process 1040 may be used to implement further details of S1004 of the process 1000). Briefly, the process 1040 includes creating and scheduling a planned order from a material forecast, creating and scheduling a work order from a sales order, updating the planned order, and creating a work order from the planned order.

In further detail, when the process 1040 begins (S1041), a planned order is created from a material forecast and is scheduled (S1042). A material forecast may drive a planned order for a planning material, and a planned order may be created, for example, on a daily basis. The planned order may specify the volume expected for the planning material on the associated date and location. The planned order may take the final material forecast quantity from the cutoff date of the planning time fence. The planned order may be used to develop an initial outward sort capacity scheduling. A planned order defines what planning material and volume are planned to be processed. When scheduling the planned order, the routing may provide instructions to a work order to indicate on which machine the material should be sorted. Once the planned order is scheduled, the start and finish date/time may be updated in the planned order.

Figure 10G:
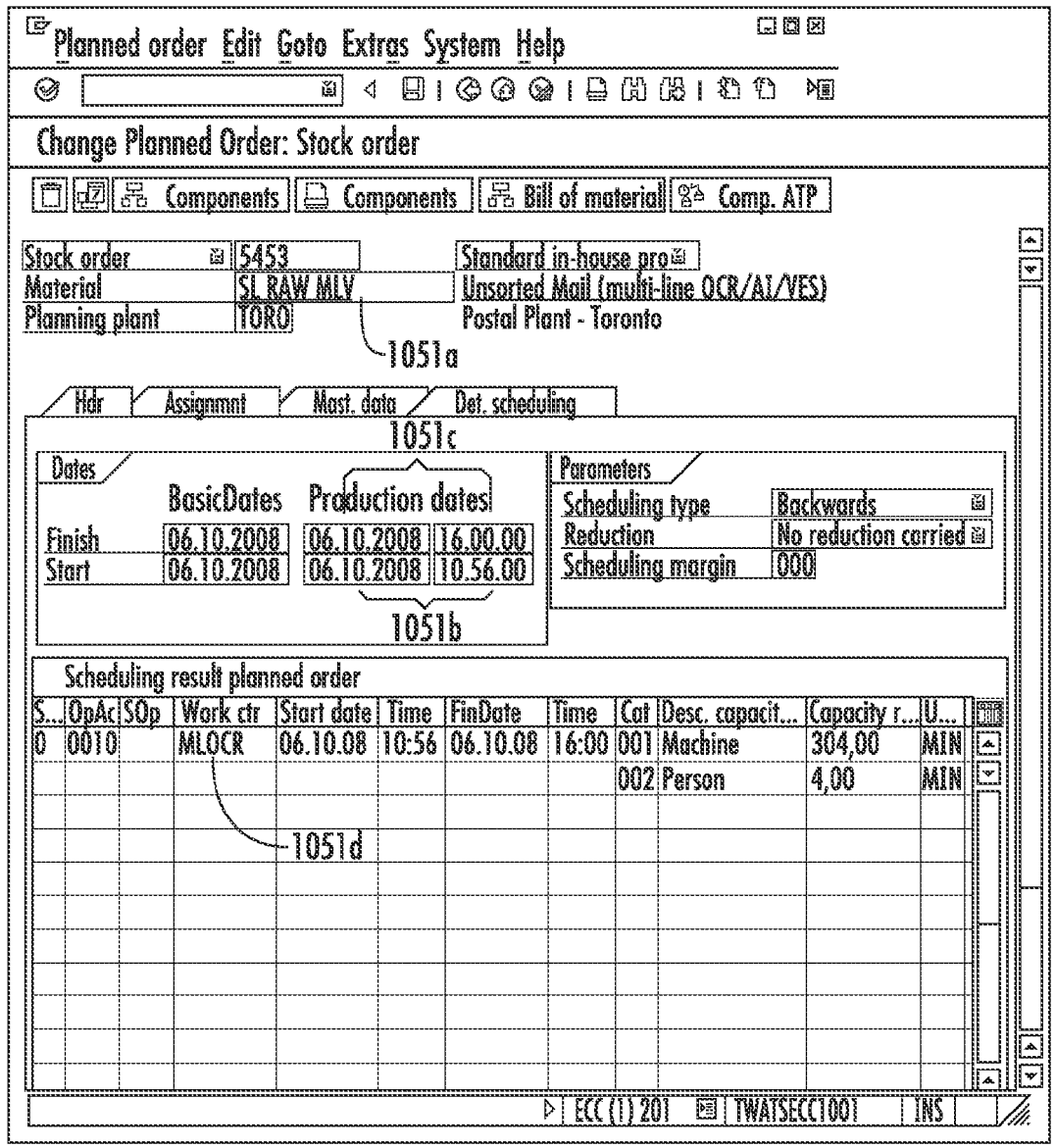
FIG. 10G illustrates an example user interface for configuring a planned order.

For example, FIG. 10G illustrates an example user interface 1050 for configuring a planned order. The interface 1050 includes a control 1051*a* for configuring the material associated with the planned order. A start date and time 1051*b* and finish date and time 1051*c* may be specified. The finish date and time 1015*c* may be calculated using the throughput rate on the routing and operating time of an associated work center.

An associated work center reference 1051*d* is displayed in the user interface 1050. If the associated work center machine is over capacity, the planned order may be reassigned to a different routing (i.e. a routing with multiple machines).

Returning to FIG. F. a work order is created from a sales order and is scheduled (S1044). A production work order may be created for each mail type recorded in a sales order. For example, if a mailer specifies two different mail types on one sales order, then two separate work orders may be created that reference the sales order. An article may be used to identify mail types. An article is an item used for retail customers and is synonymous to a material. Articles may be based on a non-valuated service material type. Each mail type may be converted to a planning material using a mapping table.

For example, FIG. 10H illustrates a mapping table 1052 which maps articles 1053a-e to one or more planning materials. For example, the article 1053a representing machinable, short/long lettermail is mapped to a planning material type 1054a of "SL_RAW_MLV" representing short/long unsorted mail targeted for a multi-line optical character recognition process. As another example, the article 1053b representing machinable, short/long advertisement mail is mapped to a planning material type 1054b of "SL_RAW_MLS" representing unsorted, short/long mail targeted for a multi-line sort process.

Several mail types may be mapped to one planning material. For example, the article 1053c representing machinable, oversized lettermail and the article 1053d representing machinable, oversized advertisement mail are both mapped to a planning material type 1054c of "OS_RAW_FSM" representing unsorted, oversized lettermail targeted for a flat sorting machine process. A single article may be mapped to several planning materials. For example, the article 1053e representing presorted, standard lettermail is mapped to planning material types 1054d-f. The planning material types 1054d-f represent short/long lettermail targeted for a multi-line optical character recognition process and sorted for Toronto, Winnipeg, or Vancouver, respectively.

A work order may determine the routing the mail pieces will follow (outward sort, cross-dock to next facility, etc). The work order may help to schedule the machine and labor capacity in the outward sort process. When scheduling the work order, the process may be similar to that of a planned order. Once the work order is scheduled, the start and finish date/time may be updated in the work order.

A work order defines what planning material is to be processed, where the planning material may be processed, when the planning material should be processed, and how much work is required. When a work order is created, a routing is selected. The routing provides instructions to the work order to indicate on which machine the material should be sorted. A routing may also specify the machine capacity as well as additional times to consider (e.g., set-up time). Planned costs for the order may be generated and capacity requirements may be generated for associated work centers.

The routing may include a work center with one or more associated machines. A planned order and a work order may be assigned to the same routing or to a different routing. If a work center becomes over capacity, a work order may be reassigned to a different routing using another work center that uses the same type of machine. As another example, the utilization of a single machine may be extended if hours remain on that machine before clearance time.

Figure 10I:

For example, FIGS. 10I-L illustrate capacity planning scenarios. FIG. 10I illustrates planned order information 1056 which indicates that one hundred fifty thousand pieces of unsorted short/long lettermail are expected to be processed on a MLOCR machine. Work center information 1057 indicates that one MLOCR is available, with a capacity of five hundred pieces per minute (thirty thousand pieces per hour) and eight hours of availability. A capacity evaluation interface 1058 indicates that three hundred and four minutes may be required to process the planned order. For example, the total quantity of one hundred fifty thousand pieces divided by the machine throughput of five hundred pieces per minute results in a processing time of three hundred minutes. Setup and tear down time add an additional four minutes. The required run time of three hundred four minutes is less than the available run time of four hundred eighty minutes, so, in this example, the work center is under capacity.

FIG. 10J illustrates an over-capacity scenario. Order information 1060 indicates that four hundred twenty four thousand pieces of short/long lettermail are expected to be processed on an MLOCR machine, with one hundred fifty thousand pieces for a first planned order, one hundred fifty thousand pieces for a second planned order, and one hundred twenty four thousand pieces for a production order. Work center information 1062 indicates that one MLOCR machine is available, with a capacity of five hundred pieces per minute (thirty thousand pieces per hour) and eight hours of availability.

A capacity evaluation interface 1063 indicates that processing time (including setup and teardown) may include three hundred and four minutes for the first planned order, three hundred and four minutes for the second planned order, and two hundred fifty two minutes for the production order, for a total of eight hundred sixty minutes of required run time. The available run time is four hundred eighty minutes, which is three hundred eight minutes short of the required run time.

The two planned orders and the production order may be switched to a different routing that has a higher capacity, such as a routing that may use two MLOCR machine capacities. For example, as shown in FIG. 10K, work center information 1064 indicates that the work center includes two MLOCR machines, each with a capacity of 500 pieces per minute, for a total work center capacity of sixty thousand pieces per hour. A capacity evaluation interface 1065 indicates that the available run time of nine hundred sixty minutes exceeds the required run time of eight hundred sixty minutes by one hundred minutes, indicating that the work center is under capacity.

Figure 10L:
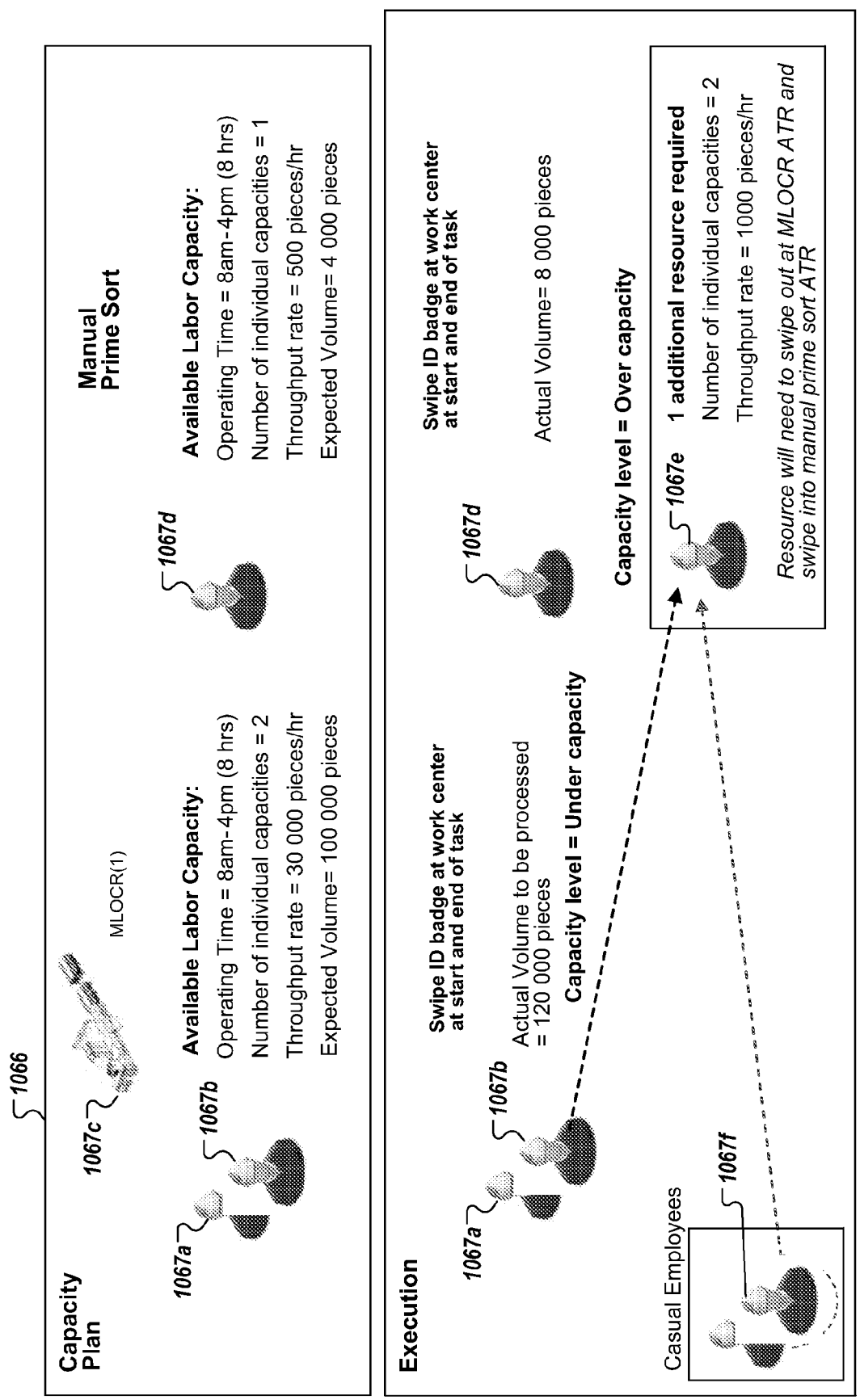

FIG. 10L illustrates a capacity planning scenario involving a multi-line sort and a manual sort. A capacity plan 1066 includes two employees 1067a-b working eight hours each in a work center which includes an MLOCR machine 1067c with a capacity of thirty thousand pieces per hour. The total capacity of the work center for the shift is two hundred forty thousand pieces. A volume of one hundred thousand pieces is expected.

The capacity plan 1066 also references a work center for performing a manual prime sort. The manual sort work center includes one employee 1067d working eight hours, with a throughput rate of five hundred pieces per hour (or a total throughput of four thousand pieces). A volume of four thousand pieces is expected.

Upon execution of a work order, actual volumes may differ from expected volumes. For example, the actual volume to be processed on the MLOCR machine 1067c may be one hundred twenty thousand and actual volume to be manually sorted may be eight thousand. With an actual volume of one hundred twenty thousand, the MLOCR work center is still well under capacity, but with an actual volume of eight thousand pieces, the manual sort work center is over capacity. To meet actual manual sort volumes, assuming that one employee 1067a-b working in the MLOCR work center can achieve at least a throughput of fifteen thousand pieces per hour to meet the MLOCR demand, one employee 1067a-b working in the MLOCR work center may sign out of the MLOCR work center and sign in to the manual sort work center (as illustrated by employee 1067e), increasing the hourly throughput rate of the manual sort work center to one thousand pieces per hour, sufficient to meet the actual manual sort volume of eight thousand pieces. As another example, a "casual employee" 1067f, meaning an employee not otherwise assigned to critical sorting tasks, may sign in to the manual sort work center to work as an additional manual sorter.

A bill of materials (BOM) may be associated with a work order and may be "exploded", or expanded, and the items in the bill of material may be transferred to the order. For each planning material, a bill of materials is used to indicate that for a specific input, the input can be sorted to an included list of outputs. The first item on the BOM may be recursive, meaning that it consumes itself. The balance of the BOM items may be considered by-products. For example, a planning material with identifier "SL_RAW_MLV" represents short/long unsorted lettermail that is to be run on an MLOCR machine. A planning material "SL_RAW_MLV" would be recursive on the BOM. When run on the MLOCR machine, the "SL_RAW_MLV" material may be sorted into several different output types (e.g., the by-products). Once the "SL_RAW_MLV" material has been processed on the MLOCR, the "SL_RAW_MLV" input becomes zero and by-products are produced as outputs.

For example, FIG. 10M illustrates an example BOM 1070 which shows an example input 1071 of one hundred thousand pieces of unsorted short/long lettermail and example outputs 1072a-d. The output 1072a is also the material type "SL_RAW_MLV", and the output quantity is set to zero items (representing the consumption of the input 1056). The remaining outputs represent output sort types. For example, output 1072b represents an output of forty thousand pieces of short/long lettermail sorted to Toronto for barcode sorting (where sorting is associated with a forecast allocation matrix having identifier "101"), output 1072c represents an output of fifty thousand pieces of short/long lettermail sorted to Toronto for barcode sorting (where sorting is associated with a forecast allocation matrix having identifier "102"), and output 1072d represents an output of ten thousand pieces of short/long lettermail sorted to Winnipeg for barcode sorting. The piece count associated with the input 1071 (e.g., one hundred thousand) is equal to the sum of the piece counts of the outputs 1072b-d (e.g., forty thousand plus fifty thousand plus ten thousand).

Figure 10N:
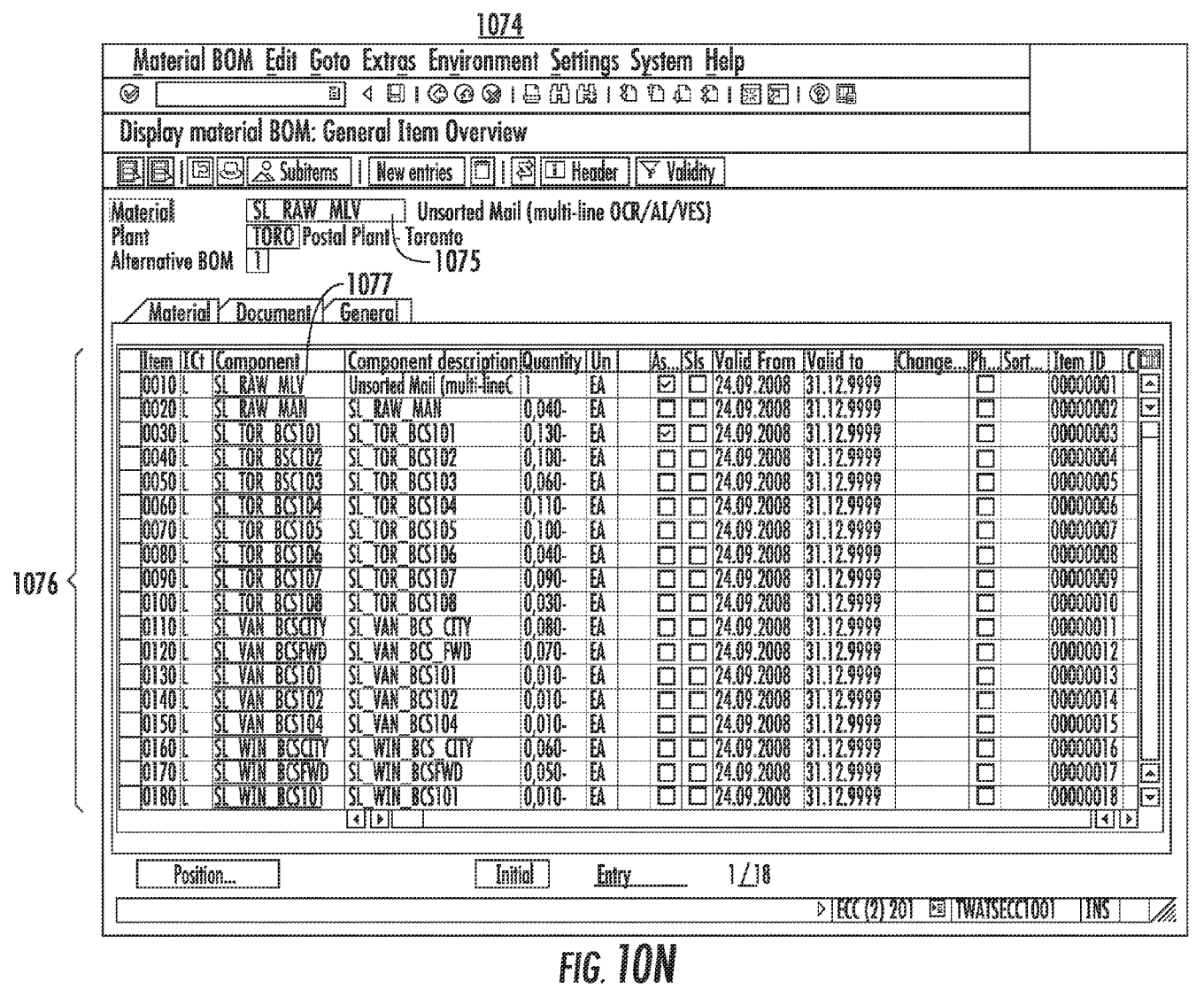

FIG. 10N illustrates an example user interface 1074 for configuring a BOM. The interface 1074 displays a material input 1075 of type "SL_RAW_MLV" of short/long unsorted lettermail targeted for a multi-line character optical recognition process. An area 1076 displays a list of outputs. An output 1077 is also of material type "SL_RAW_MLV", and represents the consumption of the input 1075. The remaining outputs listed in the area 1076 represent output sort types.

Returning to FIG. 10F, the planned order is updated (S1046). If a work order is created from a customer sales order, the associated order amount may decrease the planned order amount as actual volume from the customer.

A work order is created from the planned order (S1048), thereby ending the process 1040 (S1049). For example, the planned order may be converted into a production work order on the day the run is scheduled to be executed. A work order can be created from either a sales order or a planned order.

For example, FIG. 10O illustrates an example user interface 1078 for configuring a production order. The interface 1078 specifies a material type 1079a of "SL_RAW_MLV", and a quantity 1079b of one hundred fifty thousand pieces. A start date and time 1079c and a finish end date and time 1079d are also specified. The production order displayed in the interface 1078 may be created, for example, from the planned order displayed in the interface 1050 (FIG. 10G).

Figure 10P:
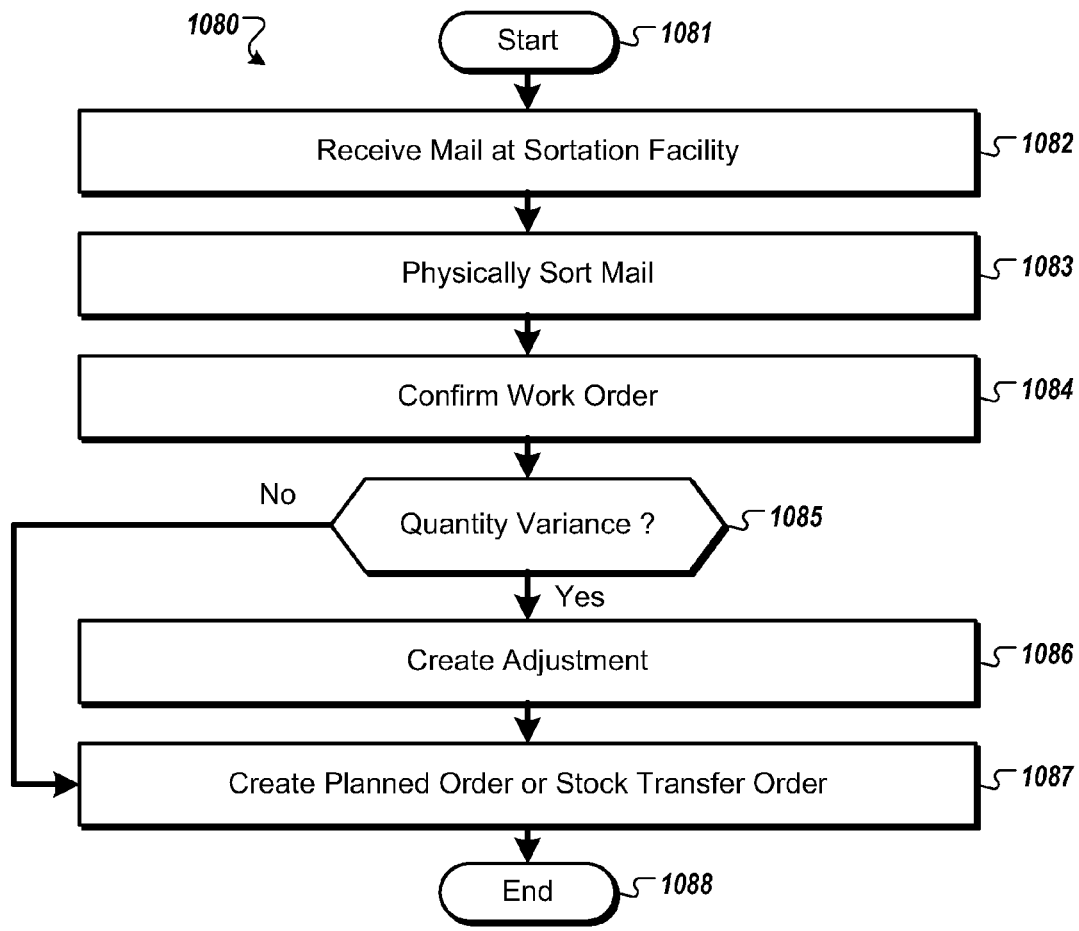

Returning to FIG. 10A, an outward sort process is performed (S1006). In outward sorting, mail is sorted according to mail destination. Outward sorting may involve a number of steps. For example, referring ahead briefly, FIG. 10P illustrates a computer-implemented process 1080 for outward sorting (e.g., process 1080 may be used to implement further details of S1006 of the process 1000). Briefly, the process 1080 includes receiving mail at a sortation facility, physically sorting the mail, confirming a work order, determining whether a quantity variance exists, creating a billing adjustment if a quantity variance exists, and creating a planned order or stock transfer order.

In further detail, when the process 1080 begins (S1081), mail is received at a sortation facility (S1082). Dock personnel may scan all containers upon arrival. Each container scan may be identified as an event handler, and a "ready for sort" event may be generated. Mail may be merged and staged according to a sort plan and mail may be moved to one or more sortation areas. The received mail may correspond to a work order number (e.g., either a work order created from a customer sales order or a work order created from a planned order).

After mail is received, the mail is physically sorted (S1083). For example, mail may be sorted by one or more sorting machines. A task identifier may be scanned by a machine before the sorting of an order occurs. The task identifier may denote the beginning of an order. The next task identifier scanned may denote the end of the previous order and the beginning of a new order. The task identifier may be, for example, an escort card that may be fed into the sorting machine at the beginning of the order. The escort card data may be read by the machine, and may include information such as work order number, customer number, and other information.

Based on the planning material type, the mail may follow a routing process. When the mail runs through a sorting machine according to the sort plan, the data captured from the machine may be transferred to the ERP system. An alert monitor may be used to notify the sortation facility if a machine is over capacity (e.g., as compared to the original sort capacity plan) and a sorting task may be reassigned to another machine. As mail is sorted, output volumes organized by sort plan may be calculated.

After the sort has been performed, the sorted mail may be put in trays labeled with destination identifiers. The sort machine may interface with the ERP system and may provide data, such as volume per destination and sortation facility. After mail pieces staged at a particular machine have been processed, the mail volume per sort plan and each destination within the sort plan may be determined.

The original inducted containers received at the sorting facility may be disassembled and "re-created" in the ERP system after sorting is completed. A new container with a new label may be created and may be tracked as containers. Containers can be nested into a handling unit. Containers that are scanned can be recorded in the ERP system as handling units. A handling unit may include, for example, the following characteristics: source, destination, material type, volume, and service level commitment. The handling unit may be defined according to a route level. A route level may be used by the delivery office to perform demand planning.

After mail is sorted, a work order associated with the mail is confirmed (S1084). Once a work order has been processed on the outward sort work center (e.g., a next task identifier has been read), the actual volumes that have been processed may be updated on a corresponding work order, for example, by using a confirmation.

After the work order is confirmed, it is determined whether a quantity variance exists (S1085). For example, a quantity specified on a sales order may differ from an actual processed quantity.

If a quantity variance exists, a billing adjustment is created (S1086). For example, a quantity may be updated in a sales order, and pricing may be adjusted.

Next, a planned order or stock transfer order is created (S1087), thereby ending the process 1080 (S1088). For example, using work order confirmations, a planned order may be created for each planning material to be used for a later inward sort process. As new confirmations are created, the planned order may be updated with additional volumes. Stock transfer orders may also be created at this time for planning materials for the inward sort process at another sortation facility. The stock transfer orders may be created and updated using work order confirmations.

Returning to FIG. 1A, mail is cleared and transferred for delivery (S1008), thereby ending the process 1000 (S1009). Once mail has been processed through the sorting machine, the mail is cleared from the machine. The processed mail may be taken from the sorting machine and may be collected by trays and put into new containers based on their destination.

Figure 10Q:
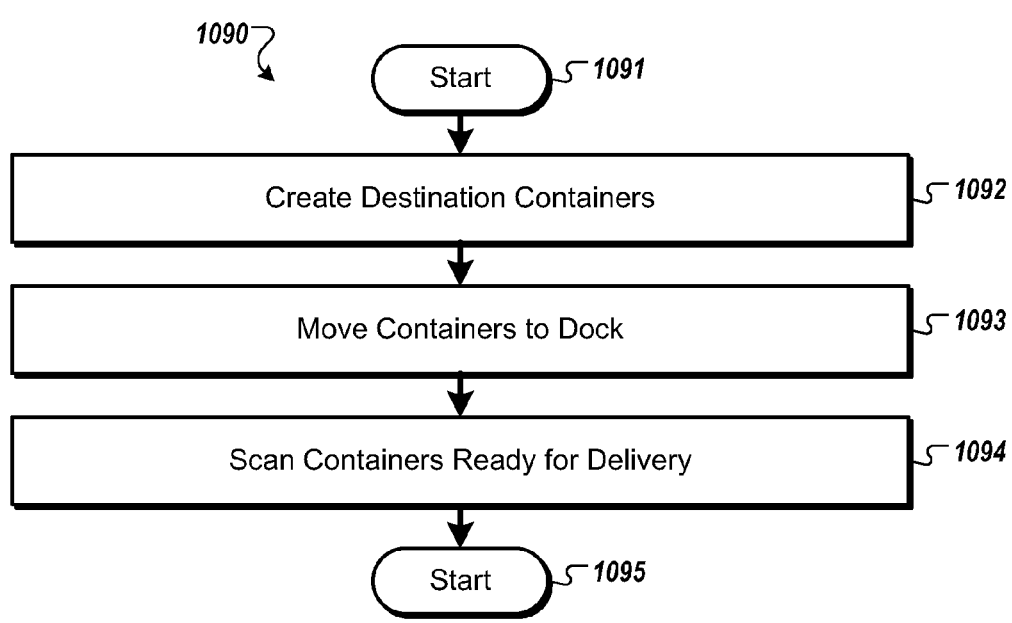

Referring ahead briefly, FIG. 10Q illustrates a computer-implemented process 1090 for clearing and transferring mail for delivery (e.g., process 1090 may be used to implement further details of S1008 of the process 1000). Briefly, the process 1090 includes creating destination containers, moving containers to a dock, and scanning containers as ready for delivery.

In further detail, when the process 1090 begins (S1091), destination containers are created (S1092). Sorted mail may be put in destination containers. A destination container may be based on the final destination of the mail. Once mail has been put into a destination container, the container may be scanned and material information may be stored as sorted inventory in the ERP system. A shipping unit (e.g., "monotainer") may be created from multiple containers that are destined for the same destination location. Pre-sorted material may be included in a shipping unit. A shipping unit can include material that has gone through outward sort, as well as pre-sorted materials. Containers may be nested in a shipping unit. A shipping unit tag or barcode identifier may be created. All the containers holding mail for a particular destination may be scanned and may be loaded into a shipping unit. The shipping unit barcode identifier may be scanned and the shipping unit may be marked as closed in the ERP system.

After destination containers are created, containers are moved to a dock (S1093). For example, mail may be cleared from the sorting area and moved to one or more staging areas within a delivery dock area.

Next, containers are scanned as ready for delivery (S1094), thereby ending the process 1090 (S1091). Scanned containers may appear in the ERP system as ready for transportation. The number of shipping units and mail volume that is ready for delivery may be available from the ERP system, and this information may be used by downstream processes (e.g., transportation, inward sortation) to perform capacity planning.

Figure 10R:
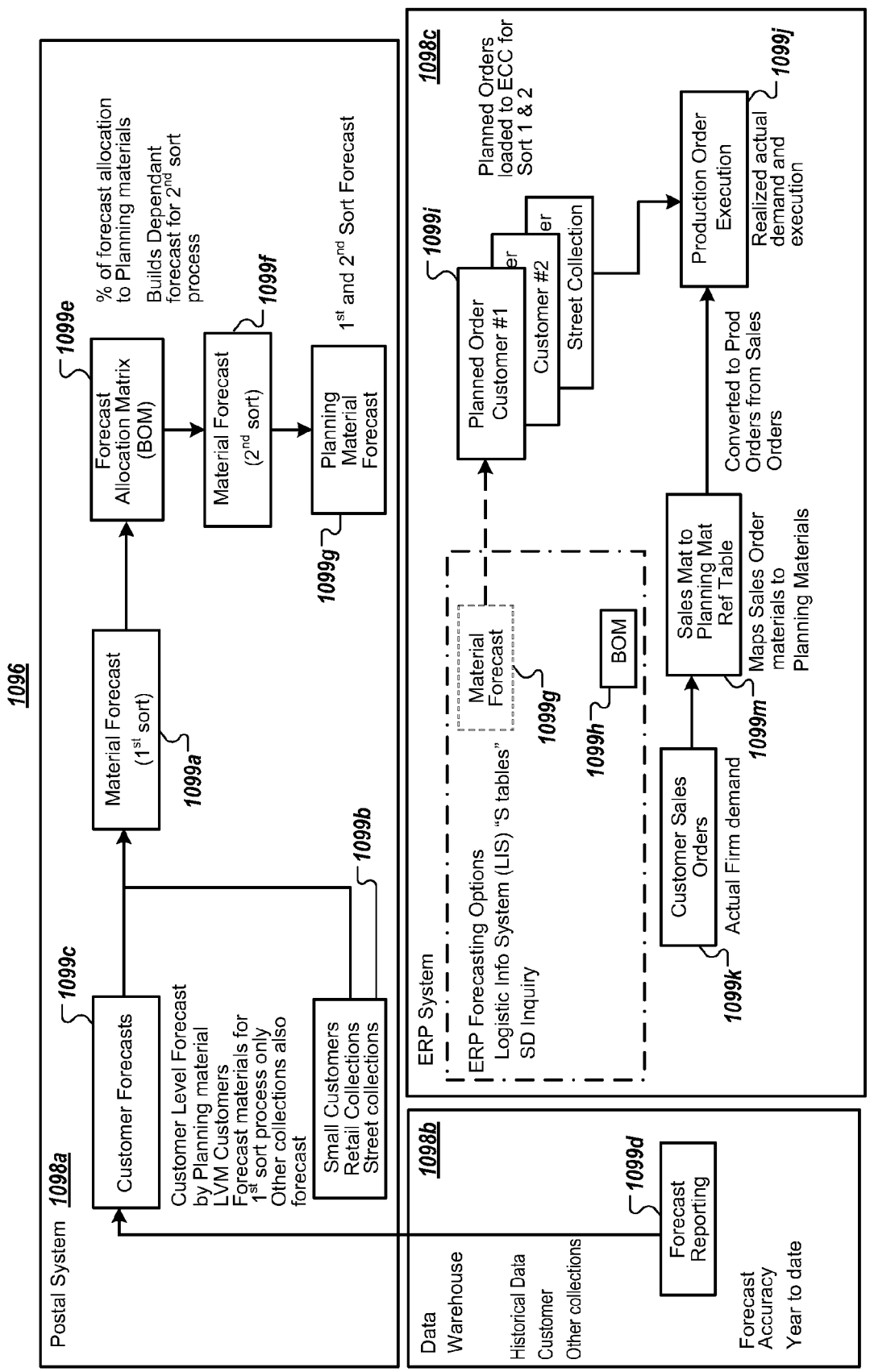
FIG. 10R illustrates a system for forecasting and capacity planning.

FIG. 10R illustrates a system 1096 for forecasting and capacity planning. The system 1096 includes a postal system 1098a, a data warehouse 1098b and an ERP system 1098c. An initial material forecast 1099a for a first sort may be created from forecasted estimates 1099b from small customers, retail and street collections and from one or more forecasted estimates 1099c from one or more large volume mailer customers. The forecasts 1099c may be obtained by retrieving historical information from a forecast reporting component 1099d of the data warehouse 1098b. An output determination for the material forecast 1099a may be determined using one or more forecast allocation matrices. Forecasting may be done for each sorting process step. For example, a material forecast 1099f may be created for a second sort step, and a planning material forecast 1099g may be created by combining the forecasts 1099a and 1099f. A bill of materials 1099h may list an input material type and sort output material types.

One or more planned orders 1099i may be created from the material forecast 1099g. One or more production orders 1099j may be created based on the one or more planned orders 1099i. A customer sales order 1099k may be created when a customer places an order, and a reference table 1099m may be used to map sales order materials to production planning materials. When the production order 1099j is executed, the reference table 1099m may be used.

Figure 11A:
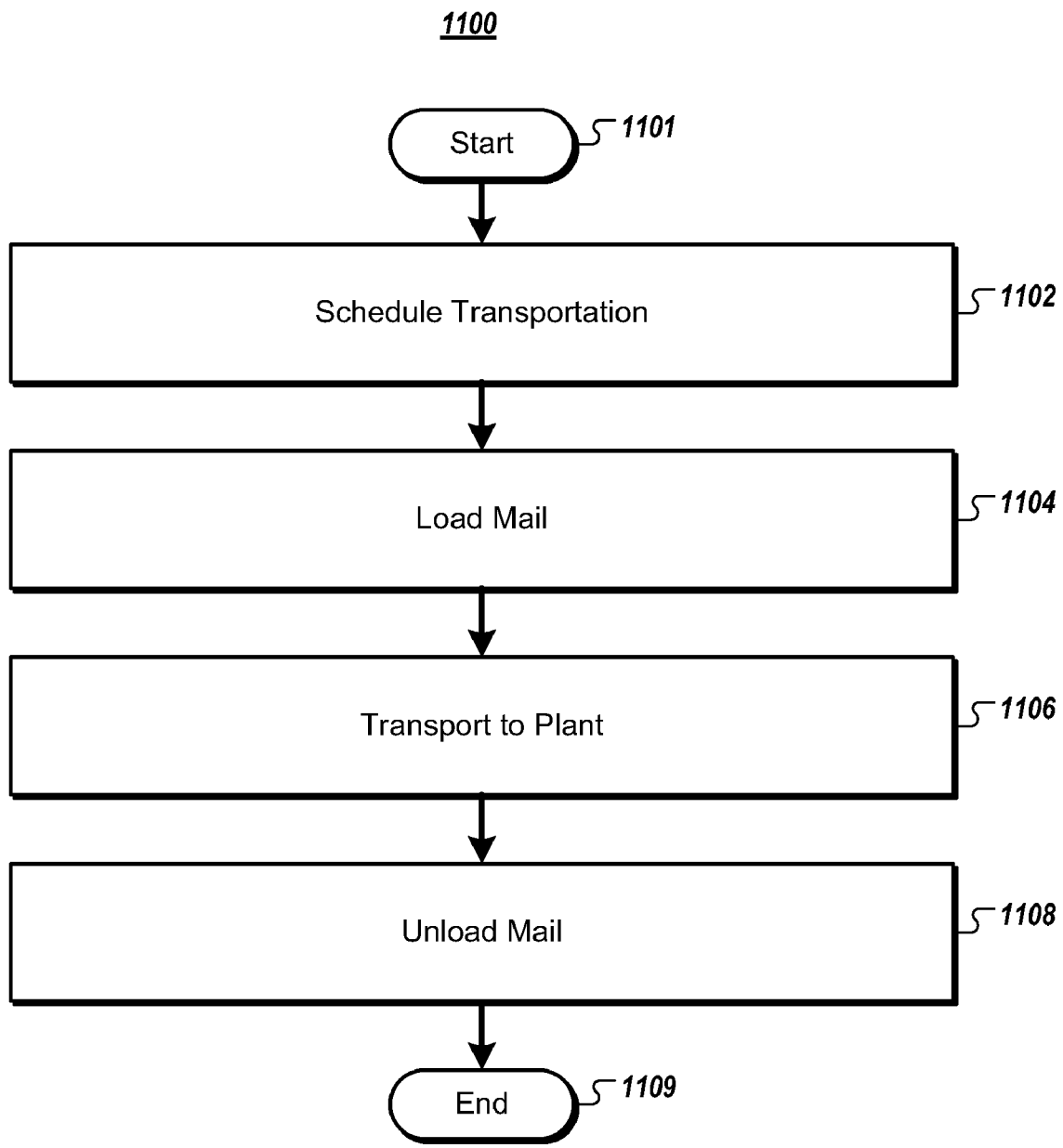

Returning to FIG. 8, after the outward sort stage is completed, a transportation stage is performed (S806). In general, transportation may be managed using a transportation module of the ERP system, or may be integrated, for example, with a yard management module. The transportation stage may include a number of steps. For example, referring ahead briefly, FIG. 11A illustrates an example computer-implemented process 1100 for performing a transportation process (e.g., process 1100 may be used to implement S806 of the process 800). Briefly, the process 1100 includes scheduling transportation, loading mail, transporting to a plant, and unloading mail.

Figure 11B:
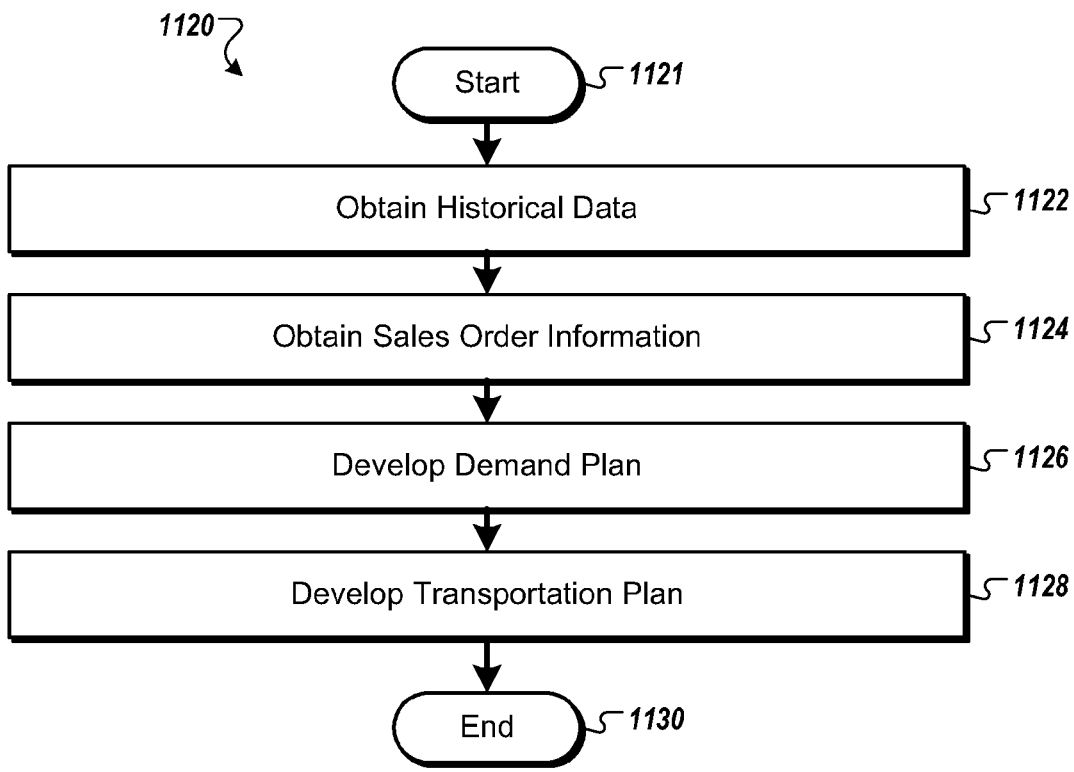

In further detail, when the process 1100 begins (S1101), transportation is scheduled (S1102). Scheduling transportation may involve a number of steps. For example, referring ahead briefly, FIG. 11B illustrates an example computer-implemented process 1120 for scheduling transportation (e.g., the process 1120 may be used to implement S1102 of the process 1100). Briefly, the process 1120 includes obtaining historical data, obtaining sales order information, developing a demand plan, and developing a transportation plan.

In further detail, when the process 1120 begins (S1121), historical data is obtained (S1122). For example, historical data may include information such as historical volumes per truck, for periods such as for the previous hour, day, day of the week, month, or year. Historical data may be used, for example, to forecast a transportation demand plan.

Next, sales order information is obtained (S1124). Sales order information may be obtained, for example, from a sales order created and received through an online shipping tool in an earlier induction step. Sales order information may be used to determine transportation scheduling needs.

After sales order information is obtained, a demand plan is developed (S1126). For example, a transportation demand plan may be developed using historical data and expected order volume, to help schedule transportation needs.

After a demand plan is developed, a transportation plan is developed (S1128), thereby ending the process 1120 (S1130). Using the demand plan, a transportation schedule may be created to track execution against the demand plan. Comparing actual execution against the demand plan may give visibility to capacity variances, such as over or under capacity.

Figure 11C:
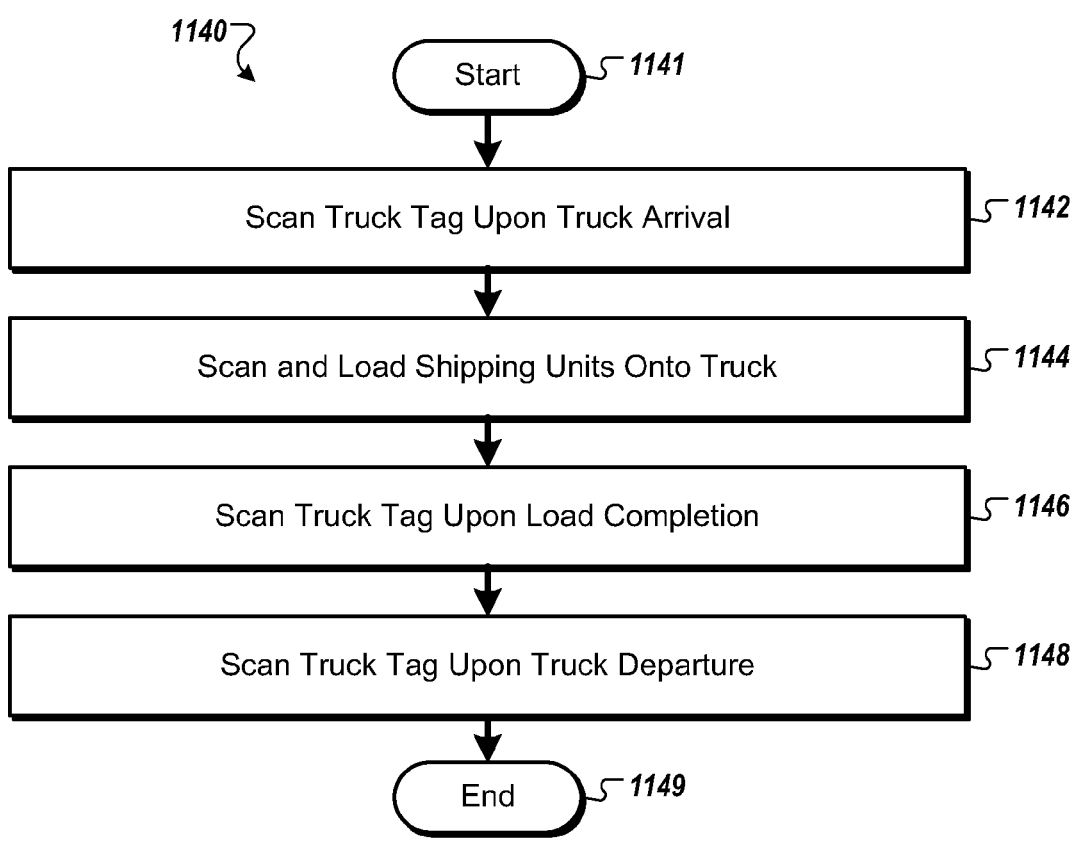

Returning to FIG. 11A, mail is loaded (S1104). Loading mail may involve a number of steps. For example, referring ahead briefly, FIG. 11C illustrates a computer-implemented process 1140 for loading mail (e.g., the process 1140 may be used to implement S1104 of the process 1100). Briefly, the process 1140 includes scanning a truck tag upon truck arrival, scanning and loading shipping units onto one or more trucks, scanning a truck tag upon load completion, and scanning a truck tag upon departure.

In further detail, when the process 1140 begins, a truck tag is scanned upon a truck arrival (S1142). The truck in which the shipping units are being transported has an associated truck tag, and the tag is scanned and may be associated to a level of service commitment. In response to the scanning of the truck tag, a truck arrival scan event may be created. The truck arrival time, a trip number, and other information may be stored.

Next, shipping units are scanned and loaded onto one or more trucks (S1144). As shipping units are being loaded onto the truck, they may be scanned and marked with their position on the truck. Validation of shipping units may be performed to verify that each shipping unit is on the correct truck. As containers are being scanned and the truck is almost at capacity, an event management module may send an alert to notify that another truck may be needed. Shipping load time and trailer utilization may be calculated and stored.

The truck tag is scanned upon load completion (S1146). Once a truck has been loaded with a complete shipment or has reached capacity, the truck tag is scanned and the truck status is marked as loaded. A truck loaded event may be generated.

The truck tag is scanned upon load departure (S1148), thereby ending the process 1140 (S1149). The truck status is marked as departed, and trailer departure time is recorded. A trailer departure event may be generated.

Returning to FIG. 11A, mail is transported to an inward sort facility plant (S1106). The status of a truck in transit may be changed to and may appear in an event module as "Departed—In transit". A truck's GPS (Global Positioning Satellite) information may be monitored in order to alert downward facilities if there is a delay and also to monitor route performance.

Figure 11D:
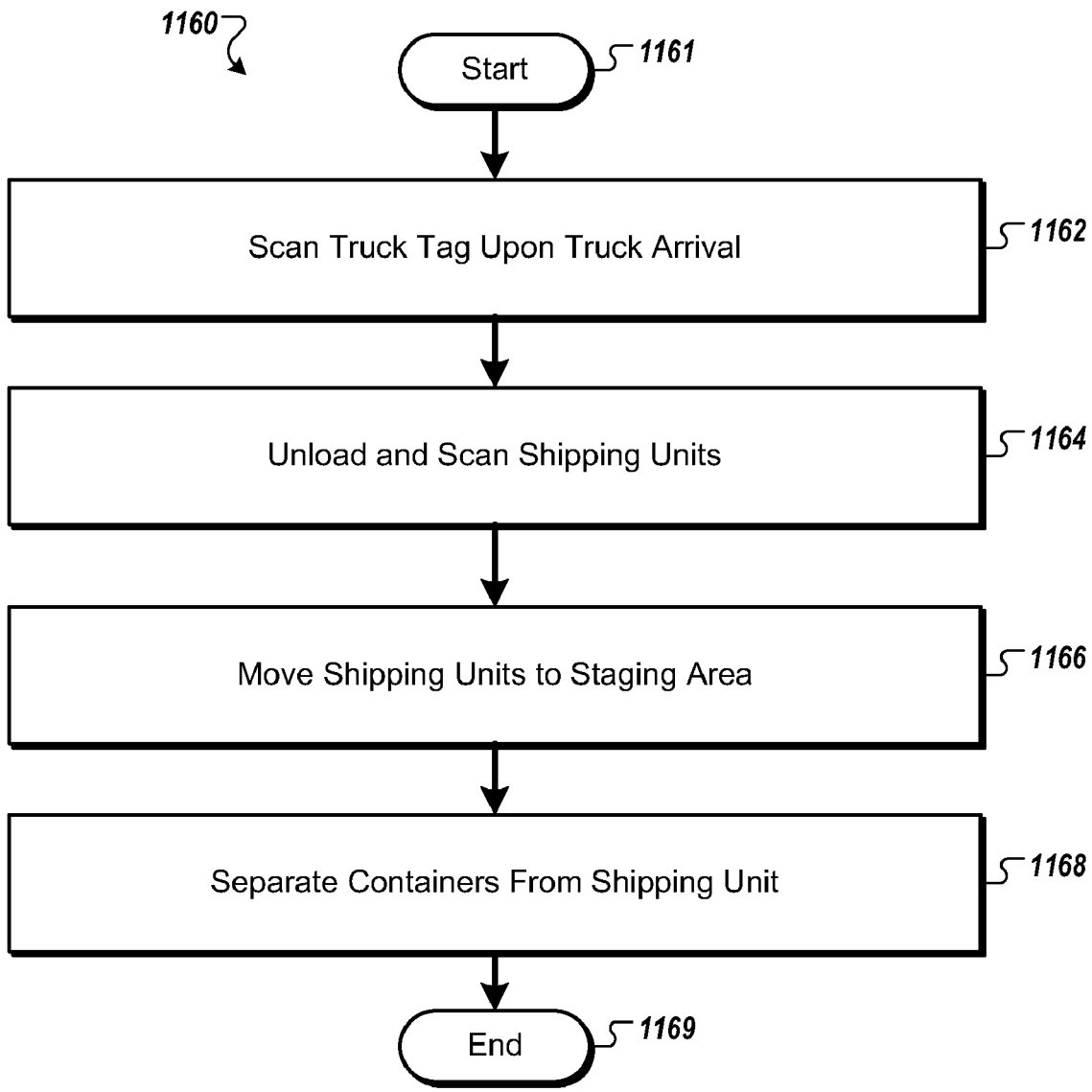

After mail has been transported, the mail is unloaded (S1108), thereby ending the process 1100 (S1109). Unloading mail may include a number of steps. For example, referring ahead briefly, FIG. 11D illustrates a computer-implemented process 1160 for unloading mail (e.g., the process 1160 may be used to implement S1108 of the process 1100). Briefly, the process 1160 includes scanning a truck tag upon truck arrival, unloading and scanning shipping units, moving shipping units to a staging area, and separating containers from the shipping unit.

In further detail, when the process 1160 begins (S1161), a truck tag is scanned upon truck arrival (S1162). Once a truck has arrived, the truck tag is scanned and the truck status is marked as arrived. Truck arrival time is recorded and a truck arrival event may be generated.

Next, shipping units are unloaded and scanned (S1164). As shipping units are being unloaded off of the truck, the shipping units are scanned and are marked in the ERP system as unloaded. Receipt of shipping units confirms the work order schedule, and the work order may be updated to reflect the arrival of the shipping units. Shipping unit unload time may be calculated and stored.

After shipping units are unloaded, shipping units are moved to one or more staging areas (S1166). The shipping units are moved from an unloading dock area to one or more staging areas (e.g., work centers). Shipping unit movement may be verified via a barcode scan. A truck unloaded event may be generated.

Next, containers are separated from the shipping unit (S1168), thereby ending the process 1160 (S1169). Shipping unit barcode identifiers may be scanned and containers may be scanned as they are unloaded from the shipping unit. Shipping unit dock time and shipping unit stage time may be calculated and stored.

Figure 11E:
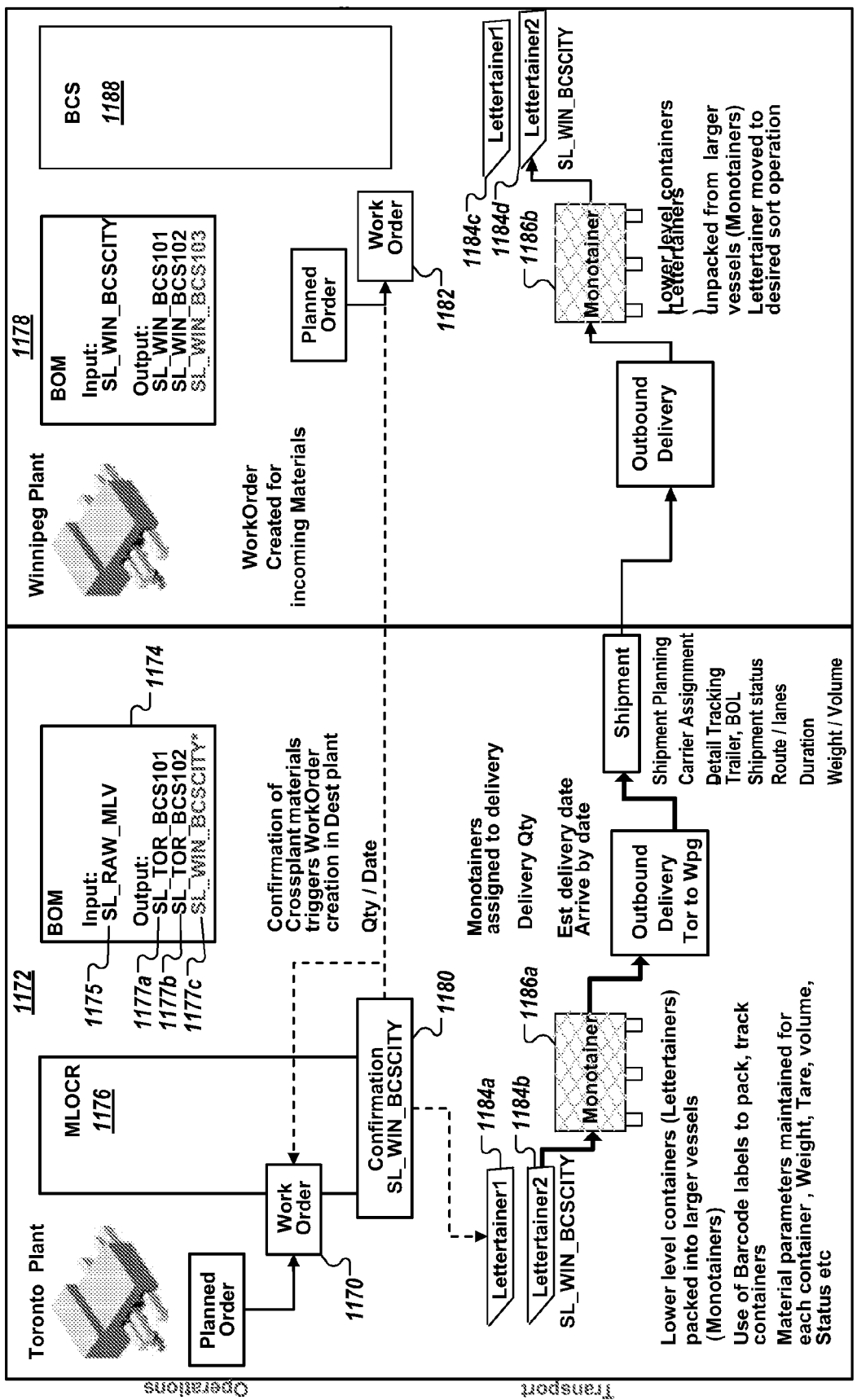
FIG. 11E illustrates transportation between sortation facilities.

FIG. 11E illustrates transportation between sortation facilities. A work order 1170 executed at a Toronto sortation facility 1172 may be associated with a bill of materials 1174. The bill of materials 1174 specifies an input 1175 of short/long lettermail (e.g., to be processed on an MLOCR machine 1176) and outputs 1177*a-c*. The outputs 1177*a-b* represent mail sorted to the Toronto facility for further sorting using a barcode scanner. The output 1177*c* represents mail sorted to a Winnipeg sortation facility 1178.

A confirmation 1180 of cross plant materials may trigger the creation of a work order 1182 in the Winnipeg sortation facility 1178. Mail sorted to the Winnipeg sortation facility 1178 may be loaded into one or more "lettertainers" 1184*a-b*. The lettertainers 1184*a-b* may be loaded into one or more larger "monotainer" containers 1186*a*. Barcode labels may be scanned and used to track containers. Material parameters such as weight, tare, volume, and status may be maintained for each container. The monotainers 1186*a* may be loaded onto one or more trucks and delivered to the Winnipeg sortation facility 1178. Monotainers 1186*a* may be unloaded from truck(s) (e.g., as illustrated by monotainer 1186*b*) and the lettertainers 1184*a-b* may be unpacked from the monotainer 1186*b* (e.g., as illustrated by lettertainers 1184*c-d*). The lettertainers 1184*c-d* may be moved to the location of a scheduled sort operation. For example, the lettertainers may be moved to a work center to be processed by a barcode sorter 1188.

Figure 12A:
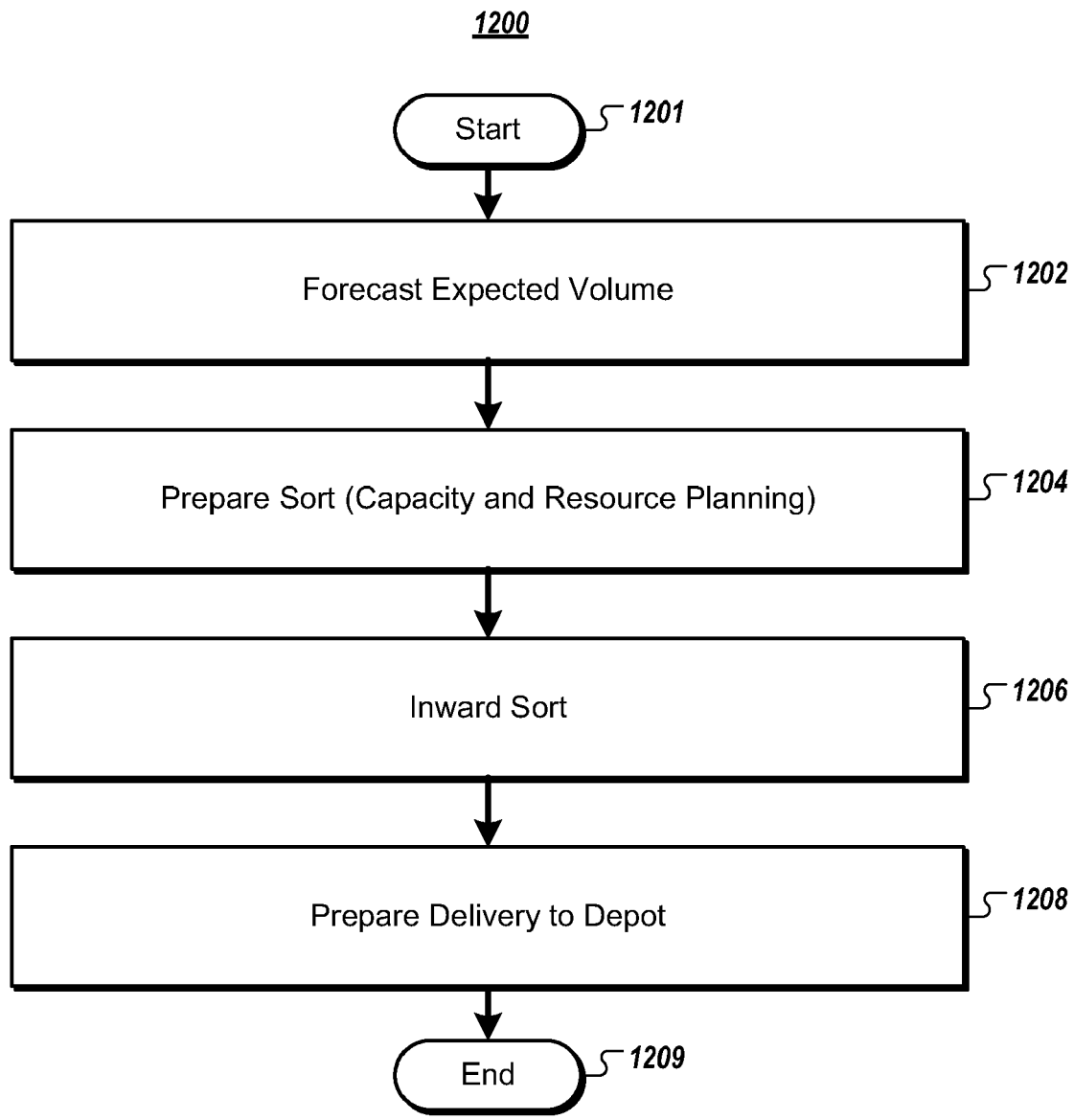

Returning to FIG. 8, an inward sort process is performed (S808). The inward sort process may be similar to the outward sort process. The inward sort process may include a number of steps. For example, referring ahead briefly, FIG. 12A illustrates an example computer-implemented process 1200 for performing an inward sort (e.g., process 1200 may be used to implement S808 of the process 800). Briefly, the process 1200 includes forecasting expected volume, capacity and resource planning, inward sorting, and preparing delivery to a depot.

In further detail, when the process 1200 begins (S1201), expected volume is forecasted (S1202). Forecasting expected volume in an inward sort process may be slightly different than forecasting expected volume in an outward sort process. For example, a first step including obtaining forecasted estimates from retail and street collections may not be required for the inward sort process, since actual mail volumes may have been recorded from outward sort processing. As in an outward sort process, in an inward sort process, a material forecast may be created using historical customer information. A new material forecast may be generated for the inward sort process and may be based on a material forecast created earlier. The new forecast may be a dependent forecast which is built for the inward sort process using a forecast allocation matrix. The forecast allocation matrix determines the percent allocation per output type for each planning material.

Figure 12B:
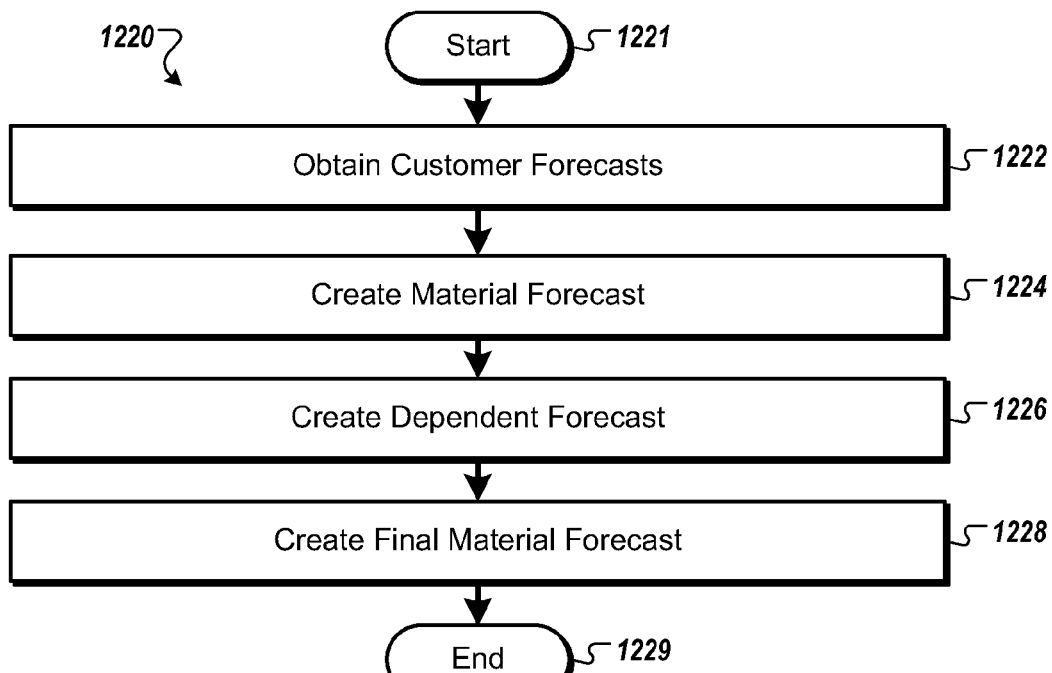

Referring ahead briefly, FIG. 12B illustrates a computer-implemented process 1220 for forecasting expected volume (e.g., the process 1220 may be used to implement S1202 of the process 1200). Briefly, the process 1220 includes obtaining customer forecasts, creating a material forecast, creating a dependent forecast, and creating a final material forecast.

In further detail, when the process 1220 begins (S1221), customer forecasts are obtained (S1222). The sortation facility may obtain a customer level forecast for planning materials sorted to the inward sort level. The historical information may be stored in a data warehouse tool.

After customer forecasts are obtained, a material forecast is created (S1224). A material forecast may be generated by using the customer forecasts for an inward sort planning material. The output determination for the material forecast may be determined using a forecast allocation matrix which specifies percent allocation by output type based on historic trends.

Next, a dependent forecast is created (S1226). A dependent forecast may be created using a forecast created earlier for the outward sort process. Using an initial material forecast and the forecast allocation matrix for the inward sort step, a dependent material forecast may be generated.

After a dependent forecast is created, a final material forecast is created (S1228), thereby ending the process 1220 (S1229). The material forecast and dependent forecasts created in preceding steps may be combined to create a final material forecast for the inward sort process.

Returning to FIG. 12A, capacity and resource planning is performed to prepare for sorting (S1204). The sort preparation process step for inward sort processing may be similar to that for outward sort processing. In the inward sort process, stock transfer orders may be received from other sort facilities. Planning based on pre-advised orders and upstream processing activities may generate advanced notification about what volumes are expected and therefore what level of machine and labor utilization may be required to sort and clear the mail from the facility.

Figure 12C:
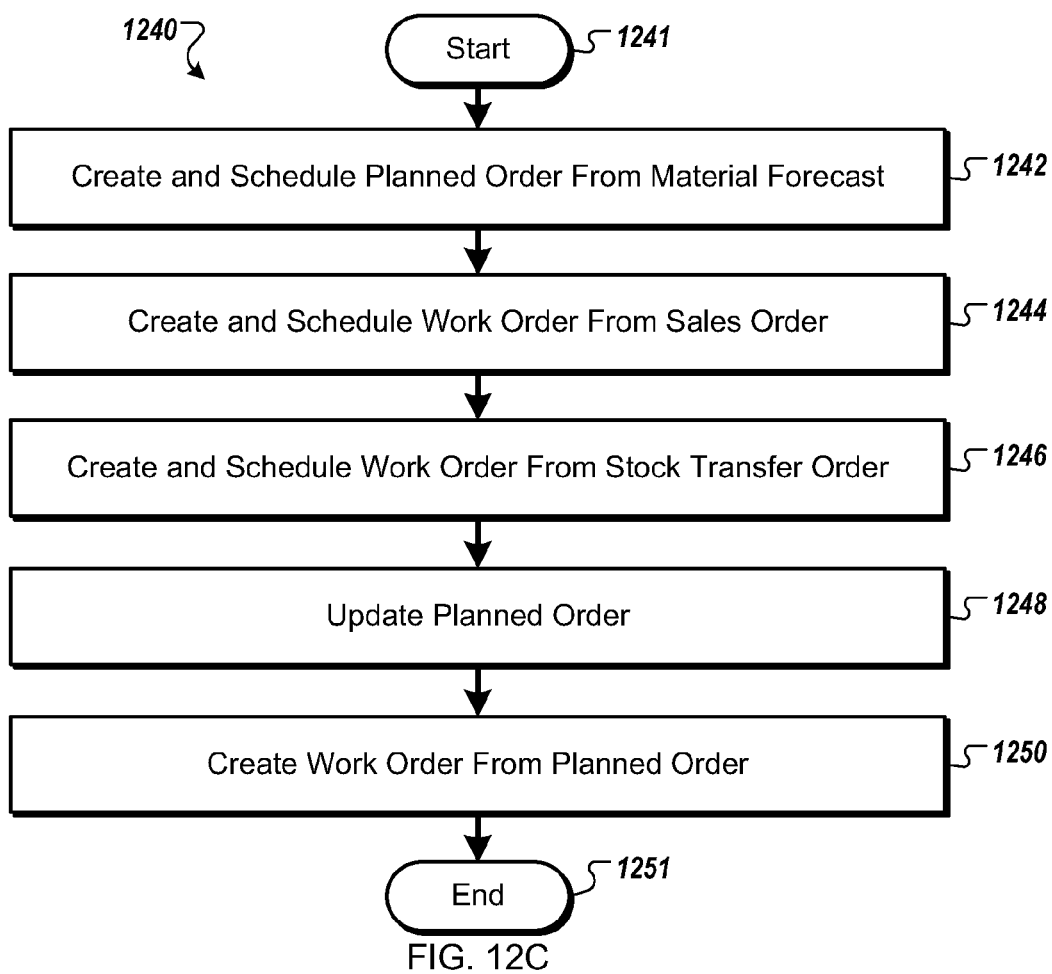

Referring ahead briefly, FIG. 12C illustrates a computer-implemented process 1240 for capacity and resource planning (e.g., the process 1240 may be used to implement S1204 of the process 1200). Briefly, the process 1240 includes creating and scheduling a planned order from a material forecast, creating and scheduling a work order from a sales order, creating and scheduling a work order from a stock transfer order, updating a planned order, and creating a work order from a planned order.

In further detail, when the process 1240 begins (S1241), a planned order is created and scheduled from a material forecast (S1242). A material forecast may drive a planned order for a planning material, and the planning order may be created, for example, on a daily basis. The planned order specifies the volume expected for the planning material on an associated date and location. The planned order may use the final material forecast quantity from the cutoff date of the planning time fence. The planned order may be used to develop an initial outward sort capacity scheduling. A planned order defines what planning material is planned to be processed. When scheduling the planned order, routing information may provide instructions to the work order to indicate which machine the material may be sorted on. Once the planned order is scheduled, the start and finish date/time may be updated in the planned order. The finish time may be calculated using the throughput rate on the routing and the operating time of the work center. If the work center (e.g., machine) is over capacity, the planned order may be reassigned to a different routing (i.e. a routing with multiple machines).

After the planned order is created, a work order is created and scheduled from the sales order (S1244). A production work order may be created for each mail type recorded in a sales order. Each mail type may be converted to a planning material using a mapping table.

The work order may help to schedule machine and labor capacities in the inward sort process. When scheduling the work order, the process may be similar to that of a planned order. Once the work order is scheduled, the start and finish date/time may be updated in the work order.

Next, a work order is created and scheduled from a stock transfer order (S1246). A production work order may be created for each material that is identified in a stock transfer order from another sortation facility to the receiving sortation facility. The work order may help to schedule machine and labor capacity in the inward sort process. When scheduling the work order, the process may be similar to that of a planned order. Once the work order is scheduled, the start and finish date/time may be updated in the work order.

After work orders have been created, the planned order is updated (S1248). If a work order is created from a customer sales order, the order amount may decrease the planned order amount as actual volume from the customer as being confirmed. If a work order is created from a stock transfer order, the order amount may decrease the planned order amount as the actual volume from another sortation facility as confirmed.

Next, a work order is created from the planned order (S1250), thereby ending the process 1240 (S1251). For example, the planned order may be converted to a production work order on the day the run is scheduled to be executed.

Figure 12D:
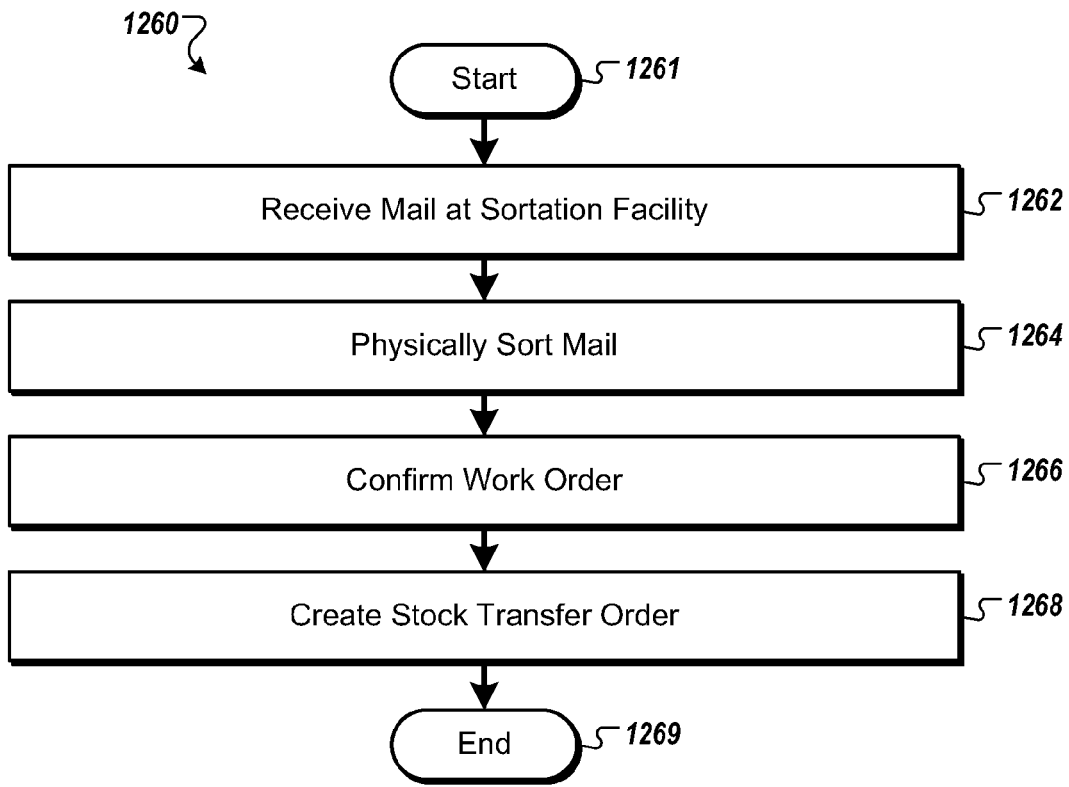

Returning to FIG. 12A, an inward sort process is performed (S1206). The inward sort process may be similar to the outward sort process. The inward sort process may include a number of steps. For example, referring ahead briefly, FIG. 12D illustrates a computer-implemented process 1260 for inward sorting (e.g., the process 1260 may be used to implement S1206 of the process 1200). Briefly, the process 1260 includes receiving mail at a sortation facility, physically sorting the mail, confirming a work order, and creating a stock transfer order.

In further detail, when the process 1260 begins (S1261), mail is received at a sortation facility (S1262). Dock personnel may scan all containers upon container arrival. Each container scan may be identified as an event handler, and one or more "ready for sort" events may be generated. Mail may be merged and staged according to a sort plan, and mail be moved to one or more sortation areas. Received mail may correspond to a work order number (either a work order created from the planned order from a customer sales order, or a stock transfer order).

After mail has been received, mail is physically sorted (S1264). A task identifier may be scanned by a sorting machine before the sorting of an order occurs. The task identifier may denote the beginning of an order. The next task identifier scanned may denote the end of the previous order and the beginning of a new order. Based on the planning material type, the mail may follow a routing process. When the mail runs through a sorting machine according to a sort plan, the data captured from the machine may be transferred to the ERP system. An alert monitor may be used to notify the sortation facility if a machine is over capacity (as compared to the original sort capacity plan) and may reassign a task to another machine. Volume by sort plan outputs may be calculated and stored.

Next, a work order is confirmed (S1266). Once a work order has been processed on an outward sort work center (e.g., a next task identifier has been read), the actual volumes that have been processed may be updated on the original work order, such as through a confirmation.

After the work order has been confirmed, a stock transfer order is created (S1268), thereby ending the process 1260 (S1269). Using work order confirmations, stock transfer orders are created for planning materials for transfer to delivery depots. The stock transfer orders may be created and updated using work order confirmations.

Figure 12E:
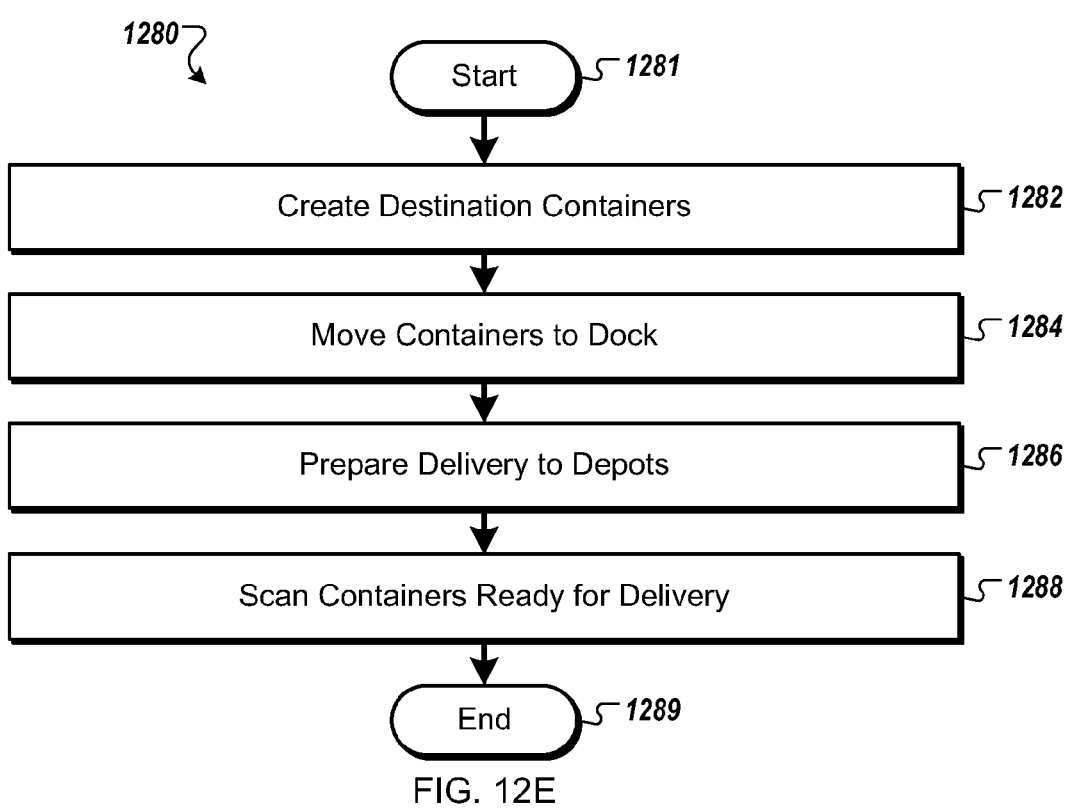

Returning to FIG. 12A, mail is prepared for delivery to the depot (S1208), thereby ending the process 1200 (S1209). When mail is cleared after the inward sort, the mail may be put into containers destined for a delivery office (e.g., mail may be organized at the route level), rather than for a sortation facility destination. Preparing mail for delivery may include a number of steps. For example, referring ahead briefly, FIG. 12E illustrates a computer-implemented process 1280 for preparing mail for delivery (e.g., the process 1280 may be used to implement S1208 of the process 1200). Briefly, the process 1280 includes creating destination containers, moving containers to a dock, preparing for delivery to one or more depots, and scanning containers as ready for delivery.

In further detail, when the process 1280 begins (S1281), destination containers are created (S1282). After the sort has been performed, the sorted mail may be put in containers organized by delivery route. Once mail has been put into a delivery route container, the container is scanned and material information may be stored as sorted inventory in the ERP system. The route information may determine which mail depot mail may be transported to. A shipping unit may be created from multiple containers that are destined for same destination location. Pre-sorted material may be included in a shipping unit. A shipping unit may include material that has gone through outward sort, as well as pre-sorted materials. Containers may be nested in a shipping unit. A shipping unit tag/barcode identifier may be created and scanned. All the containers holding mail for a destination that are loaded into a shipping unit may be scanned, and the shipping unit barcode identifier may also be scanned and the shipping unit status may be marked as closed. Shipping unit stage time, shipping unit build time, and shipping unit utilization may be calculated and stored.

After destination containers are created, containers are moved to one or more docks (1284). Mail may be cleared from the sorting area and moved to one or more staging areas within one or more delivery dock areas.

Next, mail is prepared for delivery to one or more depots (S1286). A stock transfer order (or event) may be created to perform a plant-to-plant transfer of sorted and pre-sorted inventory. Physical transfer of sorted inventory to various depots may be prepared for final delivery.

Containers are scanned as ready for delivery (S1288), thereby ending the process 1280 (S1289). Scanned inventory may appear in the ERP system with a status of "ready for transportation". Once mail is cleared, the actual volume per inward sort plan is known, along with the actual volume per delivery route, and this information may be used at the delivery office to perform capacity planning. The number of shipping units and delivery containers, as well as the total volume per depot and actual volume per delivery route that is ready for delivery to a delivery office may be calculated and stored.

Figure 13:
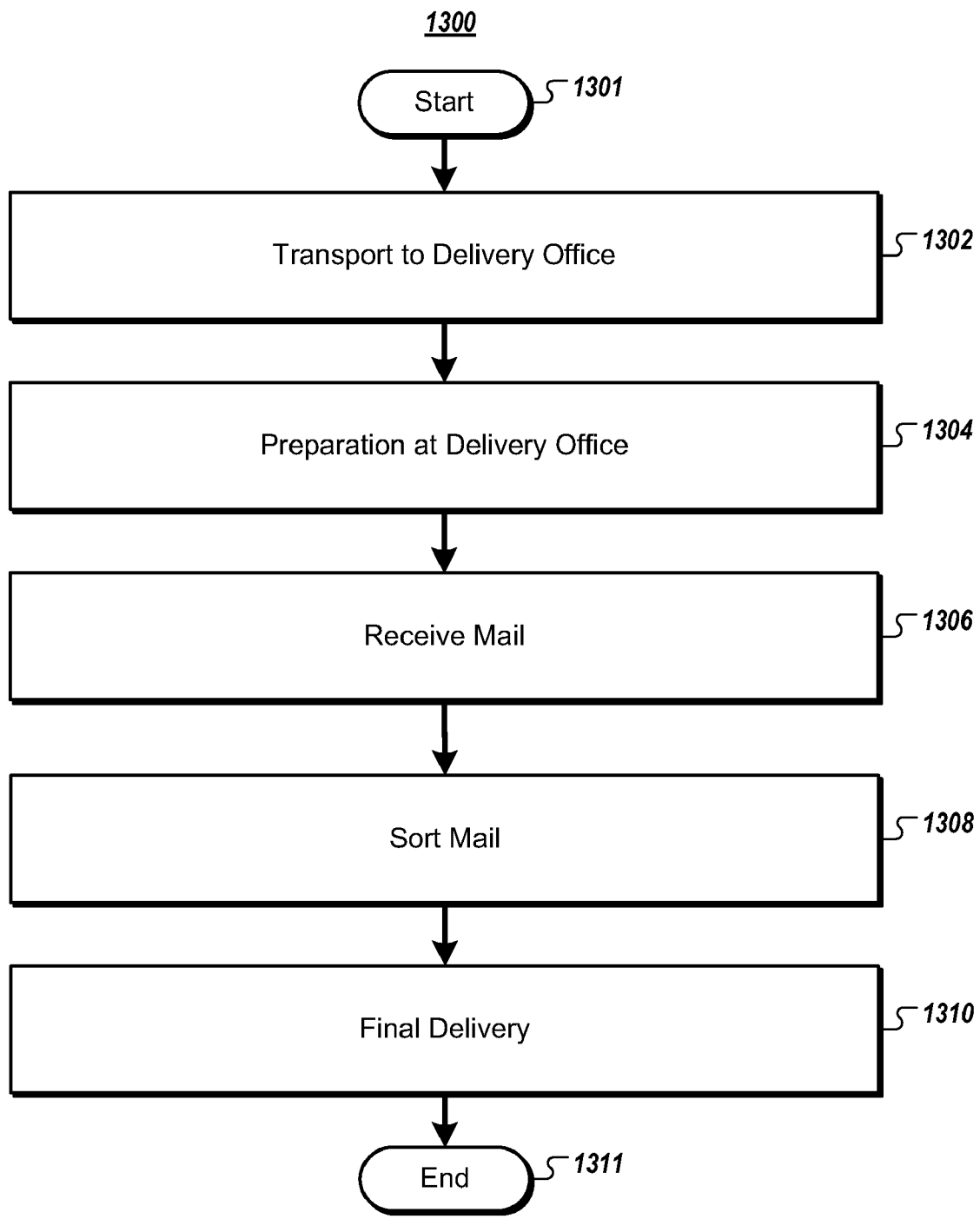

Returning to FIG. 8, after inward sort is completed, a delivery stage is performed (S810), thereby ending the process 800 (S811). A delivery stage may include a number of steps. For example, referring ahead briefly, FIG. 13 illustrates a computer-implemented process 1300 for performing mail delivery (e.g., the process 1300 may be used to implement S810 of the process 800). Briefly, the process 1300 includes transporting mail to a delivery office, preparing mail at the delivery office, sorting mail, and performing a final delivery.

In further detail, when the process 1300 begins (S1301), mail is transported to a delivery office (S1302). The processing steps for this step may be similar to the processing steps for the processes 1120, 1140, and 1160 (FIGS. 11B, 11C, and 11D, respectively). Particularly, mail may be loaded, transported, and unloaded. Loading may include scanning a truck tag upon truck arrival, scanning and loading shipping units onto one or more trucks, and scanning truck tags upon load completion and upon truck departure, Unloading may include scanning a truck tag upon truck arrival, unloading and scanning shipping units, moving shipping units to one or more staging areas, and separating containers from shipping units.

After mail has been transported to a delivery office, sort preparation is performed at the delivery office (S1304). Delivery offices may have actual volumes available to them with sufficient lead time, therefore, forecasting may not be used in this stage. Walk sort and letter carrier schedules may be developed to determine the number of man hours (both full-time resources and casuals) available. As part of sort and delivery planning, the mail delivery office may know the actual mail volume by route level that has been recorded in the ERP system (e.g., from the inward sort process). The delivery office may determine the estimated mail volume, for example, for a particular day or week.

Next, mail is received from the inward sortation facility (S1306). Dock personnel may scan all containers upon arrival. Each container scan may be marked as an event. Mail handlers may unload containers. In the ERP system, an outbound delivery and shipment object may be created.

After mail has been received, the mail is sorted (S1308). For example, mail may be sorted by mail carrier.

Next, final delivery is performed (S1310), thereby ending the process 1300 (S1311). For example, each mail item may be delivered, for example by a mail carrier driving a mail vehicle or by a mail carrier walking a mail route, to the location specified by the address label on the mail item.

Figure 14:
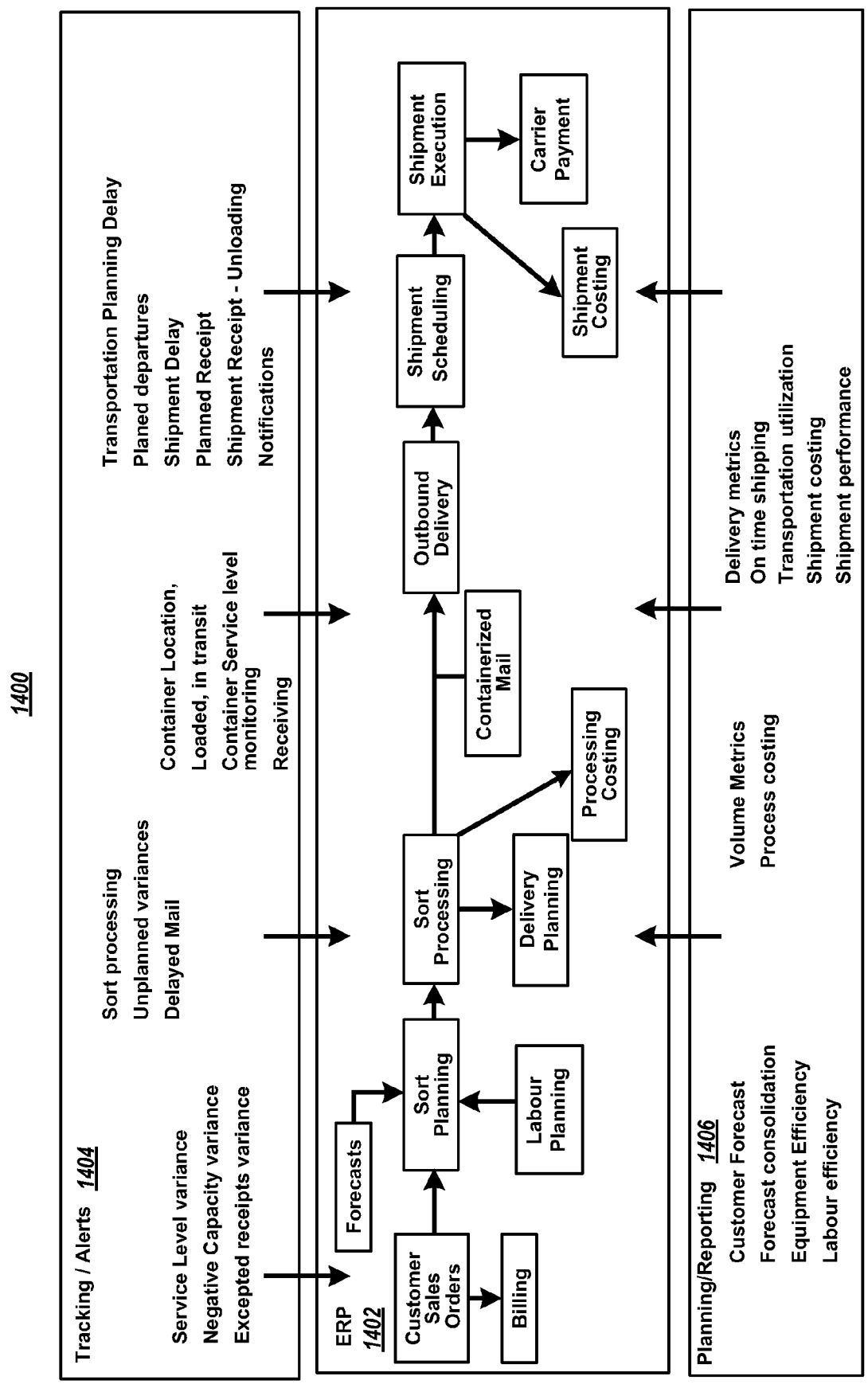
FIG. 14 illustrates component integration.

FIG. 14 illustrates component integration. An ERP system 1402 includes, among other components, components for processing customer sales orders and customer billing, forecasting, sort planning, labor planning, sort processing, delivery planning, managing containerized mail, processing costing, managing outbound delivery, shipment scheduling, shipment execution, carrier payment, and shipment costing. A tracking and alerts subsystem 1404 provides for tracking of service level variance, negative capacity variance, and expected receipts variance. The subsystem 1404 also provides alerts and tracking for sort processing, unplanned variances, and delayed mail. Container location, transport, and receipt may be tracked. Alerts may be provided for transportation delay, planned departures, shipment delay, planned receipts, and shipment unloading.

Figure 15:
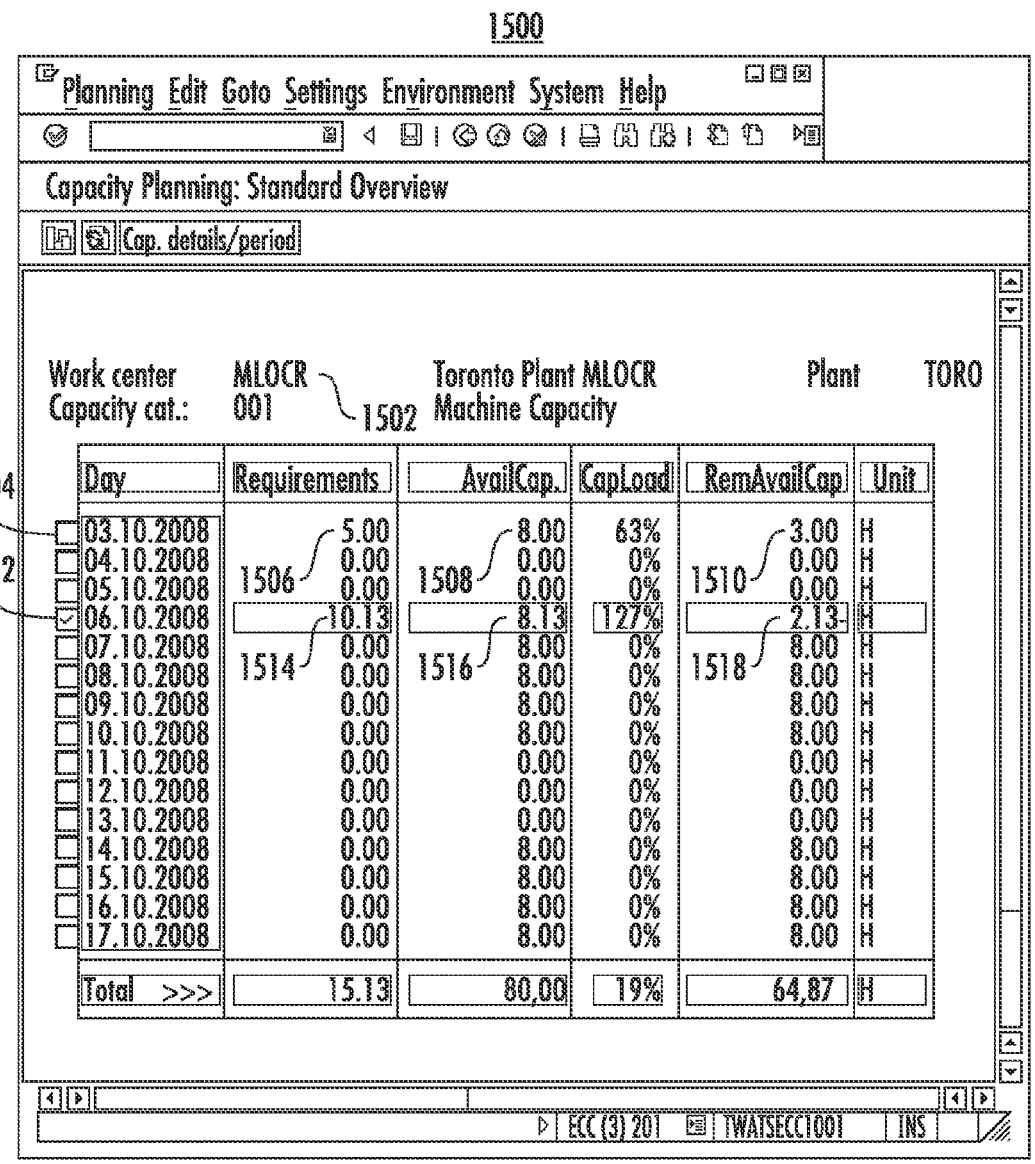
FIG. 15 illustrates an example capacity planning report.

A planning and reporting subsystem 1406 may provide reports and planning tools for forecasting, equipment efficiency, labor efficiency, volume metrics, process costing, delivery metrics, shipping timeliness, transportation utilization, shipment costing, and shipping performance. For example, FIG. 15 illustrates an example capacity planning report 1500. The capacity planning report 1500 shows, for a work center 1502, historical capacity details for various time periods. For example, for a time period 1504 beginning on Mar. 10, 2008, a capacity 1506 of five hours was required, with a capacity 1508 of eight hours available (leaving a capacity 1510 of three hours remaining). As another example, for a time period 1512 beginning on Jun. 10, 2008, a capacity 1514 of approximately ten hours and eight minutes was required, with a capacity 1516 of eight hours available (leaving a capacity shortfall 1518 of approximately two hours and eight minutes). The data for the time period 1512 is shown as highlighted, since the work center 1502 was over capacity during that time.

Figure 16:
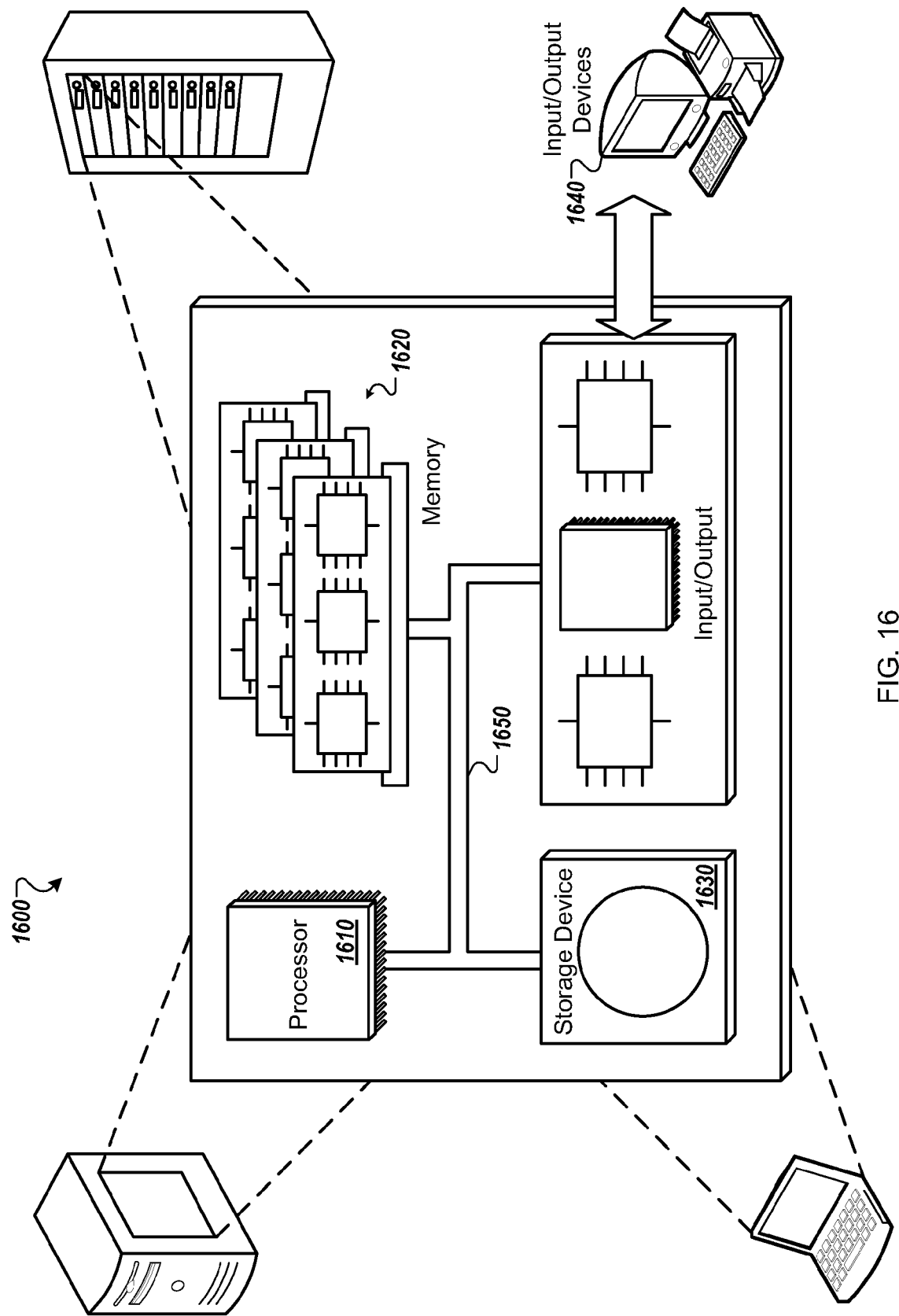
FIG. 16 illustrates an example computing device.

FIG. 16 is a schematic diagram of an example of a generic computer system 1600. The system 1600 includes a processor 1610, a memory 1620, a storage device 1630, and an input/ output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In another implementation, the memory 1620 is a volatile memory unit. In yet another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   accessing postal data which describes characteristics of a mail sortation process;
   accessing production management data which describes characteristics of a model production management process in an initial state and which is capable of being processed by a production management application;
   mapping, by at least one computer, the postal data to the production management data;
   inputting the production management data for processing by the production management application;
   producing, by the at least one computer, forecasted production management data which predicts characteristics of the model production management process in a subsequent state;
   accessing forecasted postal data which predicts characteristics of the mail sortation process;
   mapping, by the at least one computer, the forecasted production management data to the forecasted postal data; and
   controlling, by the at least one computer, the mail sortation process based on at least a portion of the mapped, forecasted postal data.

2. The method of claim 1, wherein the characteristics of the mail sortation process further comprise:
   forecast deposits and collections of mail, mapped to planned work orders of the model production management process,
   actual deposits and collections of mail, mapped to pending work orders of the model production management process, mail sortation area characteristics, mapped to work center characteristics of the model production management process, a forecast allocation matrix, mapped to a bill of materials of the model production management process, characteristics of raw, semi-sorted, and fully sorted mail inducted in the mail sortation process, mapped to characteristics of raw, semi-finished, and fully finished processing materials of the model production management process, labor requirements, mapped to resource levels of the model production management process, and mechanized sortation capabilities, mapped to machine capabilities of the model production process.

3. The method of claim 1, wherein:

mapping the postal data further comprises:

mapping a type and a volume of mail expected to be processed at one or more sorting stations of a mail sortation facility, to a planned work order which specifies a type and a volume of processing materials expected to be processed at one or more machines of a production facility, and mapping mechanized sortation capabilities of the one or more sorting stations to capabilities of the one or more machines;

inputting the production management data further comprises:

inputting the type and the volume of the processing materials and the capabilities of the one or more machines, for processing by the production management application to predict whether the one or more machines are over-utilized or under-utilized; and mapping the forecasted production management data further comprises:

determining the one or more sorting stations are over-utilized or under-utilized when the one or more machines are predicted to be over-utilized or under-utilized, respectively.

4. The method of claim 3, further comprising altering a routing between the one or more sorting stations based on determining that the one or more sorting stations are over-utilized or under-utilized.

5. The method of claim 3, further comprising reassigning mail actually received at the mail sortation facility to a different one or more sorting stations or to a different mail sortation facility based on determining that the one or more sorting stations are over-utilized or under-utilized.

6. The method of claim 1, wherein:

the postal data comprises a forecast allocation matrix for one or more sorting stations of a mail sortation facility, generated based on a historic distribution of mail previously processed by the one or more sorting stations, mapping the postal data further comprises:

mapping a type and a volume of mail actually received at the sorting stations of the mail sortation facility, to a work order which specifies a type and volume of processing materials ready to be processed at one or more machines of a production facility, and mapping the forecast allocation matrix as a bill of materials for each of the one or more machines;

inputting the production management data comprises:

inputting the work order and the bill of materials for processing by the production management application to predict a type and a quantity of end items produced by the one or more machines;

mapping the forecasted production management data further comprises:

identifying one or more customers of the mail sortation facility expected to receive the mail, and a volume of the mail expected to be delivered to each of the one or more customers, a based on the predicted type and quantity of the end items, respectively.

7. The method of claim 6, further comprising:

notifying the one or more customers of the type and the volume of mail expected to be delivered to each of the one or more customers.

8. The method of claim 6, further comprising:

scheduling resources to transport the expected volume of mail to each of the one or more customers.

9. The method of claim 6, further comprising:

updating the forecast allocation matrix based on the type and the volume of the mail actually received at the sorting stations of the mail sortation facility.

10. The method of claim 6, wherein inputting the work order and the bill of materials for processing by the production management application to predict a type and a quantity of end items produced by the one or more machines further comprises:

inputting the work order and the bill of materials for processing by the production management application to predict a first type and a first quantity of first end items produced by a first machine, inputting at least a portion of the first type and the first quantity of the end items produced by the first machine for processing by the production management application to predict a second type and a second quantity of second end items produced by a second machine, and outputting the second type and the second quantity of the second end items as the predicted type and quantity of the end items.

11. The method of claim 1, wherein:

mapping the postal data further comprises:

mapping a type and a volume of mail expected to be processed at one or more sorting stations of a mail sortation facility, to a planned work order which specifies a type and a volume of processing materials expected to be processed at one or more machines of a production facility, and mapping labor requirements associated with the one or more sorting stations of the mail sortation facility to work center resource levels;

inputting the production management data further comprises:

inputting the type and the volume of the processing materials and the work center resource levels, for processing by the production management application to predict whether the one or more machines do or do not possess sufficient resources to process the type and the volume of the processing materials; and mapping the forecasted production management data further comprises:

determining that the labor requirements of the one or more sorting stations are met or are not met when the one or more machines are predicted to possess or not possess sufficient resources, respectively.

12. The method of claim 11, further comprising reassigning staffing of the mail sortation facility based on determining that the one are more sorting stations are predicted to not possess sufficient resources.

13. The method of claim 1, wherein the production management application further comprises an SAP Enterprise Resource Planning Production Planning application.

14. The method of claim 1, wherein mapping the postal data to the production management data further comprise:
mapping each class of mail to a processing material of type MAIL, identified by an identifier having at least first through third character strings that each identify different characteristics of the class,
wherein:
the first character string identifies a type of mail, selected from the group consisting of short/long lettermail, oversized lettermail, and unknown lettermail,
the second character string identifies a location to which the particular class of mail has been sorted to, if any, and
the third character string identifies a next mail process.

15. The method of claim 14, wherein the processing material is identified by a fourth character string identifying whether the particular class of mail is delivery points sequenced or non-sequenced.

16. The method of claim 14, wherein the next mail process is selected from the group consisting of:
a culler facer canceller process,
a multi-line cancellation and optical character recognition (OCR) process,
a multi-line optical character recognition process,
a multi-line sort process,
a manual sort process,
a manual final sort to a delivery depot process,
a flat sorting machine process,
a barcode sort machine process which identifies a forecast allocation matrix,
a barcode sort machine process which identifies a city,
a barcode sort machine process which identifies a forward area,
a sorting process which identifies sequenced delivery points, and
a sorting process which identifies a letter carrier route.

17. The method of claim 14, wherein:
mapping the postal data to the production management further comprises mapping raw or semi-sorted mail to the processing material of type MAIL, identified by a first identifier having at least one character string that identifies the processing material as a raw or semi-finished processing material, respectively; and
mapping the forecasted production management data to the forecasted postal data further comprises mapping the processing material of type MAIL, identified by a different, second identifier having at least one character string that identifies the processing material as a semi-finished or a fully finished processing material to semi-sorted or fully sorted mail, respectively.

18. The method of claim 1, wherein the postal data is incapable of being processed by the production management application.

19. A system comprising:
at least one computer and
a computer-readable medium coupled to the at least one computer having instructions stored thereon which, when executed by the at least one computer, cause the at least one computer to perform operations comprising:
accessing postal data which describes characteristics of a mail sortation process;
accessing production management data which describes characteristics of a model production management process in an initial state and which is capable of being processed by a production management application;
mapping the postal data to the production management data;
inputting the production management data for processing by the production management application;
producing forecasted production management data which predicts characteristics of the model production management process in a subsequent state;
accessing forecasted postal data which predicts characteristics of the mail sortation process;
mapping the forecasted production management data to the forecasted postal data; and
controlling the mail sortation process based on at least a portion of the mapped, forecasted postal data.

20. A computer storage medium encoded with a computer program, the program comprising instructions that when executed by data processing apparatus cause the data processing apparatus to perform operations comprising:
accessing postal data which describes characteristics of a mail sortation process;
accessing production management data which describes characteristics of a model production management process in an initial state and which is capable of being processed by a production management application;
mapping the postal data to the production management data;
inputting the production management data for processing by the production management application;
producing forecasted production management data which predicts characteristics of the model production management process in a subsequent state;
accessing forecasted postal data which predicts characteristics of the mail sortation process;
mapping the forecasted production management data to the forecasted postal data; and
controlling the mail sortation process based on at least a portion of the mapped, forecasted postal data.

* * * * *